(12) United States Patent
Sanmiya et al.

(10) Patent No.: US 6,772,065 B2
(45) Date of Patent: Aug. 3, 2004

(54) GPS RECEIVER AND RECEIVING METHOD

(75) Inventors: Jason Sanmiya, Tokyo (JP); Masayuki Takada, Tokyo (JP); Katsuyuki Tanaka, Kanagawa (JP); Manabu Nitta, Tokyo (JP); Hideki Awata, Kanagawa (JP); Koichiro Teranishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/371,760

(22) Filed: Feb. 21, 2003

(65) Prior Publication Data

US 2003/0187576 A1 Oct. 2, 2003

(51) Int. Cl.⁷ .................................................. G01S 1/00

(52) U.S. Cl. .................................. 701/213; 342/357.12

(58) Field of Search ................................ 701/213, 215; 342/357.12, 357.01, 357.04, 357.06; 455/130, 456.1; 375/147

(56) References Cited

U.S. PATENT DOCUMENTS

| 5,781,156 | A | * | 7/1998 | Krasner | 342/357.12 |
| 6,002,361 | A | * | 12/1999 | Schipper | 342/357.03 |
| 6,259,399 | B1 | * | 7/2001 | Krasner | 342/357.06 |
| 6,400,314 | B1 | * | 6/2002 | Krasner | 342/357.09 |

* cited by examiner

Primary Examiner—Marthe Y. Marc-Coleman
(74) Attorney, Agent, or Firm—Jay H. Maioli

(57) ABSTRACT

A GPS receiver that is capable of acquiring a GPS signal from a plurality of GPS satellites efficiently and at a high speed, and that is capable of performing a positioning calculation with a high degree of accuracy. The FFT processing result of the addition result from the PN code, stored in the memory, is multiplied by the FFT processing result of the IF data (the received data), stored in the memory, and by inverse-diffusing this result, a correlative value is obtained. By repeating this process while changing the combination of the PN codes to be added, and the synchronization acquisition processing, by a plurality of PN codes, is performed quickly with only a small amount of processing based on these results.

14 Claims, 28 Drawing Sheets

FIG.8

[MATHEMATICAL EXPRESSION (1)]
$$F[r(n) * c(n)] \Longleftrightarrow F(k) = R(k)C(k)$$

[MATHEMATICAL EXPRESSION (2)]
$$F(k) = R(k)\overline{C}(k) \quad \text{(WHERE, } ^- \text{ REPRESENTS COMPLEX CONJUGATE)}$$

[MATHEMATICAL EXPRESSION (3)]
$$r(n) = A \cdot d(n) \cdot c(n) \cdot \cos 2\pi n \cdot f_0 + n(n)$$

[MATHEMATICAL EXPRESSION (4)]
$$F[r(n) \cdot \exp(j2\pi n f_0 + \phi_0)] = \exp(j\phi_0) R(k - k_0)$$

[MATHEMATICAL EXPRESSION (5)]
$$F'(k) = R(k - k_0)\overline{C}(k)$$

[MATHEMATICAL EXPRESSION (6)]
$$|f'(n)| = \sqrt{f_R'(n)^2 + f_I'(n)^2}$$

[MATHEMATICAL EXPRESSION (7)]
$$\phi = \tan^{-1}(f_I'(n) / f_R'(n))$$

[MATHEMATICAL EXPRESSION (8)]
$$F'(k) = R(kM - k')\overline{C}(k) = R(kM - k_0)\overline{C}(k)$$

EXPLANATION OF FREQUENCY SEARCH

GPS RECEIVER AND RECEIVING METHOD

CROSS REFERENCES TO RELATED APPLICATIONS

The present document is based on Japanese Priority Document JP 2002-053845, filed in the Japanese Patent Office on Feb. 28, 2002, the entire contents of which being incorporated herein by reference.

BACKGROUND OF THE INVENTION

1. Field of the Invention

The present invention relates to a GPS (Global Positioning System) receiver and a method receiving of a GPS signal to be used for, for example, a portable navigation system and a navigation system of a movable body such as an automobile, an aircraft and a vessel or the like.

2. Description of Related Art

In a GPS system for measuring a position of a movable body or the like by using a satellite (a GPS satellite), according to its basic function, a GPS receiver receives a signal from four or more GPS satellites, calculates a location of the receiver from this received signal and notifies a user of the location thereof.

The GPS receiver demodulates a signal from the GPS satellite and acquires orbit data of the GPS satellite. Then, from an orbit of the GPS satellite and time information, and a delay time of a received signal, the GPS receiver derives a three-dimensional location of itself by using a simultaneous equation. There is an error between the time within the GPS receiver and the time of the satellite. Accordingly, in order to delete an influence due to this error, at least four GPS satellites, from which the received signals are acquired, are required.

A consumer GPS receiver receives an L1 band from the GPS satellite, namely, a spectrum diffusion signal electric wave referred to as a C/A (Coarse/Acquisition) code and carries out a positioning calculation.

The C/A code comprises a code of PN (Pseudorandom Noise) sequence with a transmitted signal rate (chip rate) of 1.023 MHz and a code length of 1023, for example, a Gold code, and also comprises a signal, in which a carrier wave with a frequency of 1575.42 MHz is BPSK (Binary Phase Shift Keying) modulated by a signal in which the data of 50 bps is diffused. In this case, since the code length is 1023, as shown in FIG. 35(A), in the C/A code, the PN sequence code is repeated with 1023 chips as one frequency (namely, one frequency=1 millisecond).

This PN sequence code in this C/A code is varied for each GPS satellite. However, in the GPS receiver, it is possible to detect which GPS satellite uses which PN sequence code in advance. In addition, according to a navigation method to be described later, it is possible for the GPS receiver to know a signal from which GPS satellite can be received at that position and at that time. Accordingly, for example, in a case of performing the three-dimensional positioning, the GPS receiver receives electric waves from four and more GPS satellites available at that position and at that time, performs an inverted spectrum diffusion, and performs a positioning calculation to obtain a location of itself.

As shown in FIG. 35(B), one bit of the satellite signal data is transmitted as 20 periods of the PN sequence code, namely, in a unit of 20 milliseconds. In other words, the data transmission rate is 50 bps. The 1023 chips corresponding to one period of the PN sequence code are inverted when the bit is "1" and when the bit is As shown in FIG. 35(C), in a GPS, 30 bits (i.e., 600 milliseconds) forms one word, and as shown in FIG. 35(D), 10 words forms one sub frame (6 seconds). As shown in FIG. 35(E), in a head word of one sub frame, a preamble is inserted, which always serves as a regular bit pattern even when the data is updated, and after this preamble, the data is transmitted.

Further, one main frame (30 sec) is formed by 5 sub frames. Then, the navigation message is transmitted in a data unit comprising this one main frame. The first three sub frames in the data of this one main frame are the orbit information referred to as ephemeris information, which are peculiar to each satellite. This ephemeris information is repeatedly transferred in one main frame unit (30 sec), and it contains a parameter for obtaining the orbit of the satellite transmitting the foregoing information, and a transmission time of a signal from the satellite.

In other words, the second word of the three sub frames in the ephemeris information contains the time data referred to as Week Number and TOW (Time Of Week). The Week Number is the information for counting up the week for each week starting with Jan. 6, 1980 (Sunday) defined as the 0th week. In addition, the TOW is the time information for counting up the time (counting up in a period of the sub frame) every six seconds providing that the hour of zero a.m. on Sunday is defined as 0.

All GPS satellites are provided with atomic clocks and use the common time data, and the transmission time of a signal from each GPS satellite is synchronized with the atomic clock. By receiving the above-described two time data, the absolute time is obtained. A value not more than 6 seconds comes to be synchronized with the time of a satellite in an accuracy of a reference oscillator provided to the present GPS receiver in the process of synchronous-locking with the electric wave of the satellite.

In addition, the PN sequence code of each GPS satellite is also generated as being synchronized with the atomic clock. Further, from this ephemeris information, a location of the satellite and a rate of the satellite which are to be used for the positioning calculation in the GPS receiver are acquired.

The ephemeris information is an almanac having a high accuracy to be updated with a relative frequency under a control of a control station on the earth. In the GPS receiver, by storing this ephemeris information in a memory, it is possible to use the ephemeris information for the positioning calculation. However, in view of its accuracy, a usable duration of the ephemeris information may be ordinarily about two hours. Accordingly, an elapsed time from a point of time when the ephemeris information is stored in the memory is monitored, and if the monitored elapsed time exceeds this time duration, the GPS receiver may update the ephemeris information in the memory and may rewrite it.

By the way, in order to acquire the new ephemeris information from the GPS receiver and update a content of the memory into this acquired ephemeris information, a minimum of 18 seconds (corresponding to three sub frames) is needed. When the data is acquired from a midstream of the sub frame, consecutive 30 seconds are needed for the updating.

The navigation message in the remaining two sub frames of the data in one frame comprises information referred to as the almanac information, which is to be transmitted in common from all satellites. This almanac information is needed for 25 frames in order to acquire the all information thereof. The almanac information comprises the information for showing a rough location of each GPS satellite and the information for indicating the available GPS satellite.

This almanac information is also updated for every several days as a result of control from the control station on the earth. It is also possible to store the almanac information in the memory of the GPS receiver and to use it. However, its duration of life is about several months, and this almanac information in the memory is normally updated into new information acquired from the GPS satellite for every several months. If this almanac information is accumulated in the memory of the GPS receivers, it is possible to know a suitable channel for a certain satellite, when a power is turned on, by the calculation.

In order to acquire the above described data by receiving the signal from the GPS satellite, at first, after removing the carrier wave, by using a PN sequence code (hereinafter, a PN sequence code is simply referred to as a PN code) prepared in the GPS receiver similar to the C/A code used in the GPS satellite to be received, the phase synchronization of the C/A code is acquired with respect to a signal from this GPS satellite to acquire a signal from the GPS satellite, so that the inverted spectrum diffusion is performed. When the phase synchronization with the C/A code is acquired and the inverted spectrum diffusion is performed, a bit is detected and it becomes possible to acquire the navigation message including the time information or the like from the signal received from the GPS satellite.

The signal is acquired from the GPS satellite by the retrieval of the phase synchronization of the C/A code. In this retrieval of the phase synchronization, a correlation between the PN code of the GPS receiver and the PN code of the signal received from the GPS satellite is detected. For example, when the correlative value of this correlation detection result is larger than a predetermined value, it is determined that the both PN codes are in synchronization. Then, when it is detected that they are not synchronized with each other, controlling the phase of the PN code of the GPS receiver by using some synchronization methods, the PN code of the GPS receiver may be synchronized with the PN code of the signal from the GPS satellite.

By the way, as described above, the signal from the GPS satellite (GPS signal) comprises a signal whose carrier frequency is BPSK-modulated by a signal diffused by the PN code (diffusion code). In order for the GPS receiver to receive this GPS signal, it is required that this GPS signal be synchronized, not only with the diffusion signal, but also with the carrier frequency and the data. However, it is not possible to synchronize the GPS signal with the diffusion signal and the carrier frequency independently.

Then, in the GPS receiver, it is a usual way that a carrier frequency of the GPS signal is converted into an intermediate frequency within several MHz, and by using this intermediate frequency, the above described synchronization detection process is performed with respect to the GPS signal. The carrier wave in this intermediate frequency signal includes a frequency error by the Doppler shift in response to the moving rate of the GPS satellite and a frequency error generated from a local oscillator within the GPS receiver upon converting the GPS signal into the intermediate frequency signal.

Accordingly, due to these frequency error factors, the carrier frequency in the intermediate frequency signal is not given, so that the search of the carrier frequency thereof is required. In addition, a synchronization point within one frequency of the PN code (the synchronized phase) depends on a locational relation between the GPS receiver and the GPS satellite, so that the synchronization point is not also given. Therefore, as described above, some synchronization method is required.

The conventional GPS receiver employs a frequency search with regard to the carrier wave and a synchronization method utilizing a sliding correlator, DLL (Delay Locked Loop) and a costas loop. The explanation of this will be given below.

As a clock for driving a PN code generator of the GPS receiver, a clock obtained by dividing a reference frequency oscillator prepared in the GPS receiver, is generally utilized. As the reference frequency oscillator, a crystal oscillator with a high degree of accuracy is utilized. The reference frequency oscillator generates a local oscillation signal to be used for converting a received signal from the GPS satellite into an intermediate frequency signal from the output of this fundamental frequency oscillator.

FIG. 36 illustrates this frequency search. In other words, when the frequency of the clock signal for driving a generator of the PN code of the GPS receiver is a certain frequency f1, the retrieval of the phase synchronization with respect to the PN code is performed, namely, the phase, with which the PN code can be synchronized, is detected in such a manner that the phase of the PN code is sequentially shifted in increments of one chip, the correlation of the GPS received signal and the PN code in each chip phase is detected and a peak value of the correlation is detected.

In the case that the frequency of the above mentioned clock signal is f1, when no synchronous phase is found as a result of the phase retrieval corresponding to all 1023 chips, for example, by changing the division ratio with respect to the reference frequency oscillator, the frequency of the above mentioned driving clock signal is changed into the frequency f2, and the phase retrieval corresponding to 1023 chips is performed in the similar way. As shown in FIG. 36, this process is repeated while changing the frequency of the above-mentioned driving signal step by step. The above described operation serves as the frequency search.

Then, when the frequency of the driving clock signal, with which the PN code can be synchronized, is detected according to this frequency search, the final phase synchronization of the PN code may be performed at this clock frequency. Thus, even if there is deviance of the oscillated frequency of the crystal frequency oscillator, the satellite signal can be acquired.

SUMMARY OF THE INVENTION

By the way, in late years, a fast Fourier transform (hereinafter, abbreviated to as FFT) operation with a high degree of accuracy has been enabled on a device according to the development of the performance of the hardware represented by a DSP (Digital Signal Processor). Therefore, a method has been in consideration to acquire the code synchronization between the GPS signal as the spectrum diffusion signal and the diffusion code to be generated in the GPS receiver, at a high speed by using FFT.

The above described method utilizes a property that a correlation function c(n) between a signal a(n) and a signal b(n) is equivalent to an inverted Fourier transform result of a multiplication result C(k) [=A(k)·B'(k)] between a Fourier transform result A(k) of the signal a(n) and a complex conjugate B'(k) of a Fourier transform result B(k) of the signal b(n).

For example, as shown in FIG. 37, a case will be considered below, in which a GPS signal as a received signal received from the GPS receiver is defined as a signal a(n), and a diffusion signal to be generated in the GPS receiver is defined as a signal b(n). In this case, the FFT operation is carried out with respect to the signal a(n) in an FFT calculator 101 and this result is written into a memory 102. In the same way, the FFT operation is carried out with respect to the signal b(n) in an FFT calculator 105 and this result is written into a memory 106.

Then, by multiplying the FFT processing result (FFT operation result) of the signal a(n) written in the memory 102 by the FFT processing result (FFT operation result) of the signal b(n) written in the memory 106 in a multiplier 103, and carrying out the inverse FFT operation with respect to this multiplication result in an inverse FFT calculator 107, a correlation function c(n) can be obtained.

In response to whether or not a level of this correlation function c(n) is higher than a predetermined value, it can be determined whether or not the diffusion code in which the GPS signal is spectrum-diffused and the diffusion code generated in the GPS receiver are the same. Then, when these diffusion codes are determined to be the same, by performing the inverse spectrum diffusion by the use of the diffusion signal generated in the GPS receiver, it is possible to demodulate the transmitted data.

The FFT calculators 101, 105, the multiplier 103 and the inverse FFT calculator 107 shown in FIG. 37 can be realized as the functions of the DSP, and a so-called digital matched filter can be configured, so that the phase synchronization can be performed at a higher speed than the case where the above mentioned method is utilized by the use of a so-called sliding correlator.

However, in the case of the digital matched filter by the use of the FFT calculation, the following problems and requirements may be found. At first, in the case of performing the FFT calculation, as shown in FIG. 37, the memories 102 and 106 for storing an FFT processing result are required. This involves a problem that the storage capacity of this memory becomes relatively large. For example, if there are 16-th power of 2 (65536) pieces of data, the required storage capacity of the memory for the FFT calculation becomes about 524-k byte including a real part and an imaginary part of a complex calculation in the 32-bit operation.

According to a calculation algorithm of the FFT, the inputted data is calculated recursively while rewriting it, so that, in a case of maintaining the inputted data to be left, a memory for storing the inputted data and a memory for storing the FFT processing result are required. Therefore, the double memory capacity is required compared to a case that the inputted data is not left.

If the inputted data is a binary signal, only about 65.5-k byte is required as the capacity of the memory for storing the inputted data according to the above-described example. However, since the FFT processing result is not binary, as described before, the storage capacity including the real part and the imaginary part of the complex calculation and corresponding to the number of the inputted data is required. As a result, the storage capacity of a memory for storing the outputted data may not be less than about 524-k byte.

In the frequency analysis according to the ordinary FFT calculation, as the number of data is larger, the frequency resolution may be increased. However, as described above, the required capacity of the memory for performing the FFT calculation may be increased simultaneously. Because the memory capacity has much effect on a LSI chip area, a cost of the memory capacity becomes higher upon making the circuit into a LSI. Thus, it is required that a predetermined frequency resolution can be obtained even by a small memory capacity.

In addition, it is demanded to perform the synchronization acquisition more promptly. By using the FFT calculation, the synchronization acquisition can be performed at a high speed with respect to the GPS signal from the GPS satellite, however, as described above, only the GPS signal from one GPS satellite does not allow the positioning calculation. In order to perform the three-dimensional positioning, the synchronization of the GPS signal from at least four GPS satellites should be acquired. Further, the GPS signal from each GPS satellite may also include an effect of a so-called Doppler shift such that the frequency is shifted due to an influence of the Doppler effect.

Thus, with respect to the GPS signal from a plurality of GPS satellites, it is required to perform the synchronization acquisition more promptly as well as to perform the effective synchronization acquisition further in view of the influence of the Doppler shift.

In addition, the synchronization acquired with respect to the GPS signal should be maintained, and various data to be offered as the GPS signal should be demodulated to be used. However, in a case where there is a plurality of GPS signals whose synchronization are acquired and maintained, this involves a problem that which GPS signal should be used in order to perform the positioning calculation with a higher degree of accuracy.

The present invention is proposed taking the foregoing problems into consideration and provides a GPS receiver and a method of receiving a GPS signal, capable of solving the above described problems, acquiring a GPS signal from a plurality of GPS satellites effectively and at a high speed, and performing a positioning calculation at a higher degree of accuracy.

In order to achieve what is described above, a GPS receiver according to an aspect of the present invention may include: first fast Fourier transform means for fast-Fourier transforming a GPS signal as a received signal, of which carrier frequency is modulated by transmitted data, which is spectrum-diffused by using a diffusion code that is different for each satellite; a diffusion code generator for generating a plurality of the diffusion codes that is different for each signal; a diffusion code adder for adding at least two or more different diffusion codes from among the plural diffusion codes to be generated by the diffusion code generator; second fast Fourier transform means for fast-Fourier transforming an addition result from the diffusion code adder; a multiplier for multiplying a fast Fourier transform result of the first fast Fourier transform means by complex conjugate of a fast Fourier transform result of the second fast Fourier transform means; inverse fast Fourier transform means for inverse-fast Fourier transforming a multiplication result from the multiplier; a correlation point detector for detecting a correlation point between the GPS signal and the at least two or more different diffusion codes on the basis of a transform result from the inverse fast Fourier transform means; and a detector for detecting the carrier frequency of the received GPS signal and a diffusion code used for the spectrum diffusion on the basis of a detection result from the correlation point detector.

In the GPS receiver according to an embodiment of the present invention, the diffusion code generator may generate a plurality of diffusion codes having various code patterns, and at least two or more diffusion codes from among these plural diffusion codes may be added by the diffusion code adder to be fast Fourier transformed by the second fast Fourier transform means.

Then, the fast Fourier transform result of the GPS signal from the first fast Fourier transform means is multiplied by the fast Fourier transform result of two and more diffusion codes from the second fast Fourier transform means, which are added by the diffusion code adder, and this multiplication result is inverse-fast Fourier transformed by the inverse fast Fourier transform means, so that a correlative value between the GPS signal and the diffusion code may be obtained.

On the basis of this correlative value obtained as a result of the inverse fast Fourier transform, the correlation point detector may detect a correlation point, and on the basis of this detection result, a carrier frequency and a diffusion code may be specified.

Thus, simultaneously using a plurality of diffusion codes, and specifying the carrier frequency and the diffusion code with respect to the GPS signal from a plurality of satellites at the same time, the synchronization of the carrier frequency of this GPS signal and the phase synchronization of the diffusion code are maintained to enable to perform the positioning operation. In other words, it is possible to perform the synchronization acquisition with respect to a plurality of GPS signals at the same time.

In addition, compared to a case where the fast Fourier transform is performed for each of the plural diffusion codes having various code patterns, it is possible to decrease the number of the fast Fourier transform process. Accordingly, many memories are not required to be prepared in order to effectively perform the fast Fourier transform, so that it is possible to perform the synchronization acquisition of the GPS signal from a plurality of satellites.

In addition, the GPS receiver according to another aspect of the present invention may further include, in addition to the above mentioned elements: a combination changer for changing a combination of at least two or more different diffusion codes to be added by the diffusion code adder; and a controller for controlling the combination changer so as to change the combination of the diffusion codes to be added by the diffusion code adder and to repeat the detection of the correlation point, which is performed by the multiplier, the inverse fast Fourier transform means, and the correlation point detector; wherein the detector detects the carrier frequency and the diffusion code on the basis of a plurality of detection results of the correlation point.

According to the GPS receiver of the embodiment of the present invention, the controller controls the combination changer is controlled by the control means so that the combination of the diffusion codes to be added by the diffusion code adder is appropriately changed. Then, on the basis of the detection results of a plurality of correlation points, the detector detects the carrier frequency and the diffusion code.

Thus, even in a case where the carrier frequencies and the diffusion codes of the GPS signals from a plurality of satellites can not be specified by the detection process of the correlation point at a time, compared to a case where the detection process of the correlation point including the fast Fourier transform operation and the inverse fast Fourier transform operation is performed separately with respect to each of the diffusion codes having various code patterns, the carrier frequencies of the GPS signals from many satellites and the used diffusion codes may be specified in the less number of times of the correlation point detection processes.

In addition, the GPS receivers according to the above-mentioned aspects of the present invention may include a diffusion code shifter for shifting phases of diffusion codes to be added by the diffusion code adder by a certain amount.

According to the GPS receivers of the present invention, by the diffusion code shifter, the phases of the diffusion codes of the addition targets are shifted and then, they are added. Thus, even in the diffusion codes having various code patterns, the chips of the diffusion codes to be added are prevented from being balanced out, and the detection accuracy of the correlative value and the detection level are raised, so that it is possible to perform the synchronization acquisition process with rapidity and with a high degree of accuracy.

In addition, the GPS receivers according to the above-mentioned aspects of the present invention may further include: storage means having written therein the fast Fourier transform result of the GPS signal from the first fast Fourier transform means; and a read out address controller for controlling a read out address of the data from the storage means, wherein the multiplier uses the fast Fourier transform result of the GPS signal to be read out from the storage means by the control of the read out address controller as the fast Fourier transform result of the first fast Fourier transform means; and the read out address controller, in the case where the correlation point can not be detected by the correlation point detector, changes the read out address of the data from the storage means.

According to the GPS receiver of the embodiment of the present invention, the fast Fourier transform result from the first fast Fourier transform means is stored and maintained in the storage means. In the multiplication means, the data, which is read out from the storage means, is used as the fast Fourier transform result of the first fast Fourier transform means.

Then, when the correlation point has not been detected by the correlation point detector, for example, it is considered that an influence of the Doppler shift may be a factor, so that the read out address controller changes the read out address and the data is read out from the storage means, the read out data is supplied to the multiplier and then, the correlation point is detected once again. In other words, by using the fast Fourier transform result of the first fast Fourier transform means, of which frequency is to be shifted, and the fast Fourier transform result of the diffusion code, the correlation point is detected once again.

Thus, even if the GPS signal is affected by the Doppler shift, by performing the correlation point detection by means of the fast Fourier transform result of the first fast Fourier transform means, of which frequency is to be shifted, it is possible to eliminate the influence due to the Doppler shift with rapidity and to perform the synchronization acquisition with rapidity.

Furthermore, since the fast Fourier transform result from the first fast Fourier transform means and the fast Fourier transform result from the second fast Fourier transform means can be used, it is not necessary to repeat the fast Fourier transform itself. As a result, the processing may not be complicated, and the required storage capacity of the memory for the fast Fourier transform may not be large.

In addition, the GPS receiver according to another aspect of the present invention may further include, in addition to the above GPS receiver: a processing target controller for controlling a GPS signal which is newly received so as to be a processing target when the change of the read out address by means of the read out address controller exceeds a unit interval of a predetermined frequency.

According to the GPS receiver of the aspect of the present invention, when the correlation point can not be detected even if the read out address is changed during an interval of a predetermined frequency by the read out address controller, the fast Fourier transform is carried out with respect to the GPS signal which is newly received so that the correlation is detected once again.

Thus, in a case where the synchronization acquisition is not active, by using the GPS signal that is newly received and is fetched in, the correlation detection may be performed once again, and in response to the change of the reception environment, the synchronization acquisition may be performed as soon as possible.

In addition, the GPS receiver according to still another aspect of the present invention comprises: fast Fourier transform means for fast-Fourier transforming a GPS signal as a received signal, of which carrier frequency is modulated by transmitted data, which is spectrum-diffused by using a diffusion code that is different for each satellite; storage means in which the fast Fourier transform result of the GPS signal from the fast Fourier transform means is written; a multiplier for multiplying a fast Fourier transform result of the GPS signal to be read out from the storage means by each of fast Fourier transform results of different plural diffusion codes to be used by each of the plural satellites, individually; inverse fast Fourier transform means for inverse-fast Fourier transforming a multiplication result from the multiplication means; a correlation point detector for detecting a correlation point from a transform result from the inverse fast Fourier transform means; and a detector for detecting the carrier frequency of the received GPS signal and a diffusion code used for the spectrum diffusion on the basis of a detection result from the correlation point detector.

According to the GPS receiver of the aspect of the present invention, the fast Fourier transform result of the GPS signal is stored in the storage means, and this is multiplied by each of the fast Fourier transform results of a plurality of diffusion signals in the multiplier to be inverse-fast Fourier transformed. As a result, the correlative value between the GPS signal and each diffusion code is obtained.

In this case, since the fast Fourier transform result of the GPS signal to be multiplied by the plural diffusion signals is stored in the storage means, it is not necessary to perform the fast Fourier transform for each diffusion code, so that the synchronization acquisition is performed with rapidity and without making the process of the synchronization acquisition with respect to each of the GPS signals from a plurality of satellites complicated, and the memory capacity is not increased for the fast Fourier transform operation of the GPS signal.

In addition, the GPS receiver according to still another aspect of the present invention comprises: a diffusion code generator for generating a diffusion code, which is the same as the diffusion code that is different for each satellite to be used for spectrum-diffusing the transmitted data at a satellite; a correlative value detector for detecting a correlative value between the diffusion code of the GPS signal as the received signal, whose carrier frequency is modulated by the transmitted data, which is spectrum-diffused by using a diffusion code that is different for each satellite, and each of the diffusion codes that are different for each signal from the diffusion code generator; and a selector for selecting a GPS signal to be used for positioning on the basis of a size of the correlative value to be detected by the correlation value detector.

According to the GPS receiver of the aspect of the present invention, the correlative value between the GPS signal and each of the diffusion codes, which are different for each satellite, is detected by the correlative value detector, and the GPS signal is selected by the selector so that the navigation message provided by the GPS signal having the high level correlative value is used. Thus, it is possible to perform the positioning operation with a high degree of accuracy by using a precise navigation message to be demodulated at a high degree of accuracy.

As described above, according to the present invention, by performing the synchronization acquisition effectively and at a high speed with respect to the signals from a plurality of GPS satellites, it is possible to acquire the navigation message from a plurality of GPS satellites with rapidity.

In addition, even in the case that the navigation message from a plurality of GPS satellites not less than the minimal amount are available, by using the navigation message from the GPS satellite having the higher correlative value, it is possible to measure the present position of the GPS receiver precisely by performing the positioning operation with a high degree of accuracy.

BRIEF DESCRIPTION OF THE DRAWINGS

The invention disclosed herein will become better understood as a detailed description is made of the preferred embodiments with reference to the appended drawings in which:

FIG. 8 is a view for showing mathematical expressions to be used for explaining the first embodiment of the present invention;

All figures are drawn for ease of explanation of the basic teachings of the present invention only; the extensions of the Figures with respect to number, position, relation ship, and dimensions of the parts to form the preferred embodiments will be explained or will be within the skill of the art after the following description has been read and understood.

DESCRIPTION OF THE PREFERRED EMBODIMENTS

With reference to the drawings, embodiments of a GPS receiver and a receiving method of a GPS signal according to the present invention will be described below.

[First Embodiment]

Figure 1:
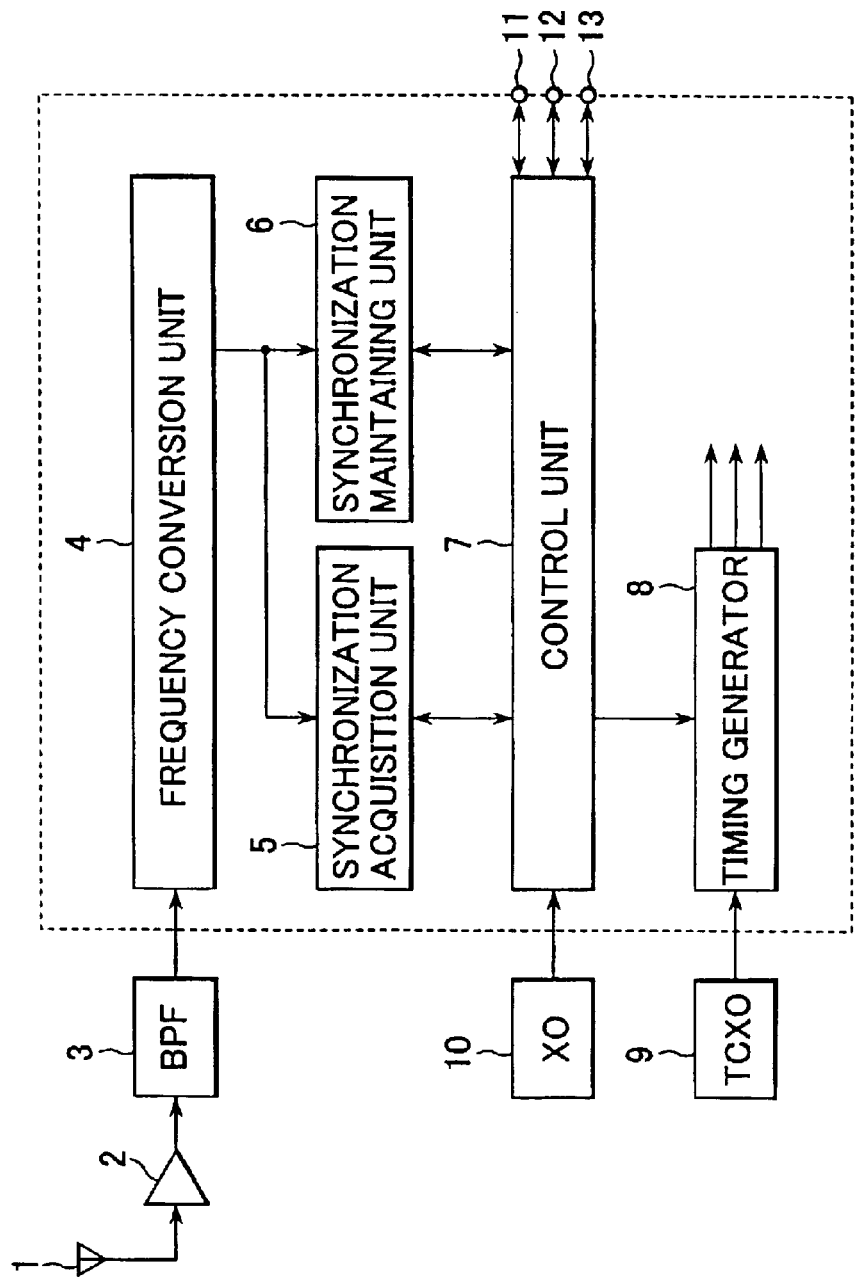
FIG. 1 is a block diagram for illustrating a first embodiment of a GPS receiver according to the present invention.

FIG. 1 is a block diagram for illustrating an embodiment of a GPS receiver, to which a GPS receiver and a receiving method according to the present invention are applied. As shown in FIG. 1, the GPS receiver according to the present embodiment includes an antenna 1, an amplifier 2, a BPF (Band Pass Filter) 3, a frequency conversion unit 4, a synchronization acquisition unit 5, a synchronization maintaining unit 6, a control unit 7, a timing generation unit 8 for generating a clock signal to be supplied to each unit, a crystal oscillator with a temperature compensating circuit (hereinafter, referred to as TCXO) 9, and a crystal oscillator 10 (represented by XO in FIG. 1). In FIG. 1, a portion enclosed by a broken line is configured as a single IC (integrated circuit).

Each GPS receiver from first to seventh embodiments to be described below is configured similar to that shown in FIG. 1, and each constitutional component is also configured in the similar way to FIG. 1, however, by changing the function and the operation of the synchronization acquisition unit 5, or the function of the control unit 7, an object of each embodiment may be achieved.

The configuration of each unit of the GPS receiver shown in FIG. 1 will be described below. A high frequency GPS signal from the GPS satellite is received by the antenna 1 and is supplied to the amplifier 2.

As described above, the high frequency GPS signal comprises a signal transmitted from each satellite. It is obtained by BPSK modulating a carrier wave having a frequency of 1575.42 MHz using a signal (C/A code) obtained by spectrum diffusing transmission data of 50 bps using a PN code (diffusion code) having a pattern assigned to each GPS satellite in a transmission signal rate at 1.023 MHz and with a code length of 1023.

The amplifier 2 amplifies the high frequency GPS signal supplied thereto to a predetermined level and supplies it to the BPF 3. The BPF 3 removes unnecessary components from the high frequency GPS signal supplied thereto and supplies the high frequency GPS signal, of which unnecessary components have been removed, to the frequency conversion unit 4.

[Frequency Conversion Unit 4]

The frequency conversion unit 4 low-pass converts (down convert) the high frequency GPS signal supplied thereto into an intermediate frequency GPS signal as a signal at an intermediate frequency, forms the intermediate frequency data (hereinafter, referred to as the IF data) by analog/digital converting (binarization processing) this intermediate frequency GPS signal, and supplies the IF data to the synchronization acquisition unit 5 and the synchronization maintaining unit 6.

Figure 2:
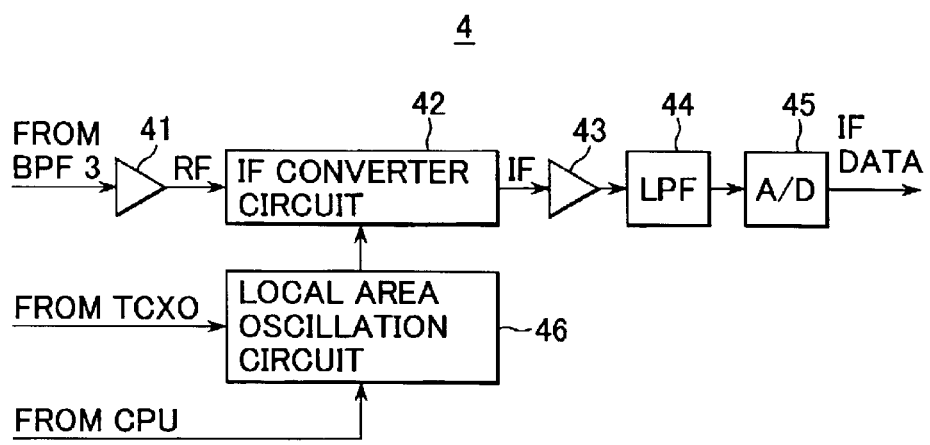
FIG. 2 is a block diagram for illustrating an example of a frequency conversion unit of the GPS receiver.

FIG. 2 is a block diagram for illustrating a constitutional example of the frequency conversion unit 4. As shown in FIG. 2, the frequency conversion unit 4 includes a first amplifier 41, an intermediate frequency converter circuit (hereinafter, referred to as an IF converter circuit) 42, a second amplifier 43, a LPF (Low Pass Filter) 44, an analog/digital converter (hereinafter, abbreviated to an A/D converter) 45, and a local area oscillator circuit 46 configured as a frequency synthesizer.

Then, the high frequency GPS signal from the BPF 3 is supplied to the IF converter circuit 42 through the amplifier 41. In addition, the output from the TCXO 9 is supplied to the local area oscillator circuit 46. Accordingly, the local oscillation output in which the output frequency of the TCXO 9 and the frequency ratio are fixed can be obtained.

The local oscillation output from the local area oscillator circuit 46 is supplied to the IF converter circuit 42, and a high frequency GPS signal (RF) with a carrier frequency of 1575.42 MHz is low-pass converted into an intermediate frequency GPS signal (IF) with a carrier frequency of 1.023 MHz. After being amplified by the second amplifier 43 and band-limited by the LPF 44, the intermediate frequency GPS signal is supplied to the A/D converter.

The A/D converter 45 converts the intermediate frequency GPS signal supplied thereto into a digital signal by binarizing it or making it into multiple values to form the IF data, and then, this is supplied to the synchronization acquisition unit 5 and the synchronization maintaining unit 6. In a case of binarization, the IF data are data of one-bit unit. As described above, the A/D converter 45 converts its inputted signal into a digital signal of two and more bits (making into multiple values) to output it.

[Synchronization Acquisition Unit 5]

The synchronization acquisition unit 5 accumulates the IF data supplied thereto during a predetermined interval; performs the processing for acquiring the synchronization of the carrier frequency and the phase synchronization of the C/A code at a high speed with respect to this IF data; detects the C/A code phase, the carrier frequency, the correlation peak level and the satellite number; and supplies these to the control unit 7.

Then, as described above, the synchronization acquisition unit 5 according to the present embodiment may enable a plurality of PN codes to be generated in an exact timing, and by adding and using them, it is possible to acquire the phase synchronization of the C/A code of the GPS signal from a plurality of GPS satellites at the same time.

Figure 3:
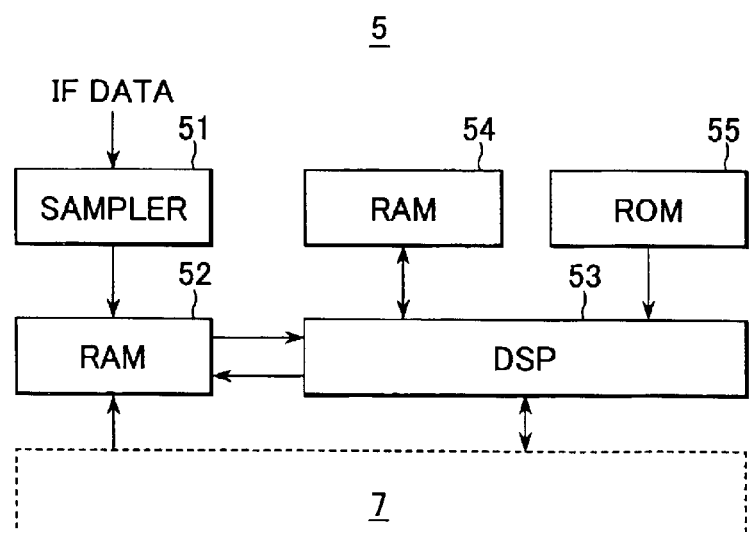
FIG. 3 is a block diagram for illustrating an example of a synchronization acquisition unit of the GPS receiver.

FIG. 3 is a block diagram for illustrating a constitutional example of a synchronization acquisition unit 5. As shown in FIG. 3, the synchronization acquisition unit 5 includes a sampler 51, a RAM (Random Access Memory) 52, a DSP 53, a RAM 54, and a ROM (Read Only Memory) 55.

Then, the IF data from the frequency conversion unit 4 may be supplied to the sampler 51. The sampler 51 takes a sample of the IF data supplied thereto by a signal of a predetermined frequency, and stores the IF data of a predetermined amount in the RAM 52 by writing the sampled IF data into the RAM 52.

The RAM 54 is used as a working area of the processing to be performed mainly by the DSP 53, and the ROM 55 stores a program to be executed in the DSP 53 and the data necessary for the processing.

Then, the DSP 53 performs the synchronization acquisition processing by means of FFT (Fast Fourier Transform) with respect to the IF data stored in the RAM 52 and the PN code to be generated by the DSP 53 itself, so that, as described above, the DSP 53 detects the carrier frequency, the C/A code phase and the correlation peak level.

[Specific Configuration and Specific Operation of the Synchronization Acquisition Unit 5]

Figure 4:
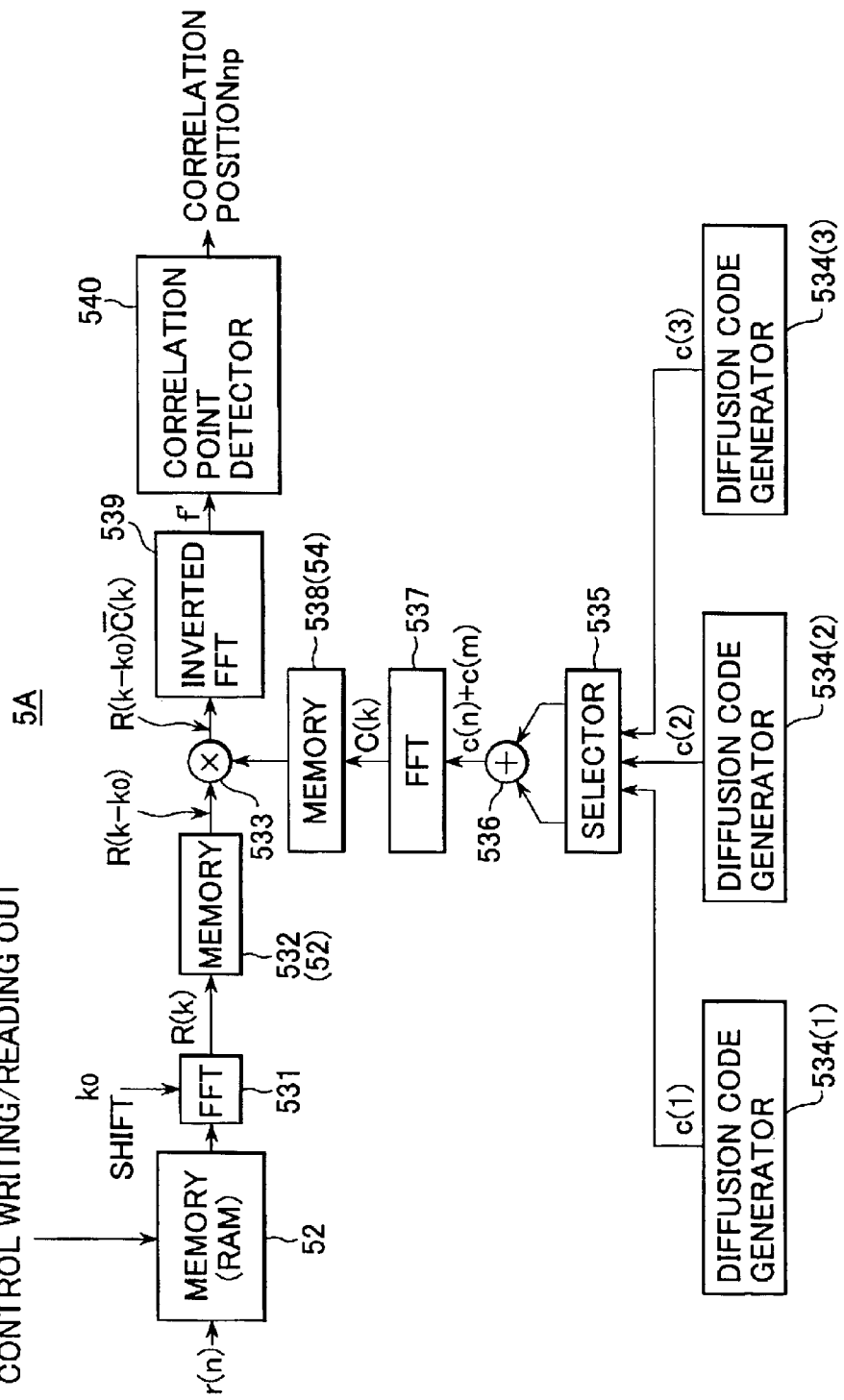
FIG. 4 is a block diagram for illustrating a configuration and a function of the synchronization acquisition unit according to the first embodiment.

FIG. 4 is a block diagram for illustrating a specific configuration and a specific operation of a synchronization acquisition unit 5A according to the first embodiment, which are realized mainly by the function of the DSP 53. The DSP 53 includes a first FFT processor 531, a multiplier 533, a diffusion code generator 534, a selector 535, an adder 536, a second FFT processor 537, an inverse FFT processor 539, and a correlation point detector 540 so as to make up a so-called digital matched filter.

A signal written in the RAM 52 of the synchronization acquisition unit 5A (i.e., the preprocessed IF data (received signal)) is read out for each frequency of the C/A code (1023 chips), FFT-processed by the first FFT processor 531, and its FFT processing result is written in a memory 532. As this memory 532, as shown in parentheses in FIG. 4, for example, a vacant area of the RAM 52 may be used. Then, the FFT processing result of the IF data written in the memory 532 is read out with its reading position controlled, and is supplied to the multiplier 533 as described in detail later.

Further, in the preprocessed IF data written in the RAM 52 of the synchronization acquisition unit 5A, the IF data worth M pieces of frequencies is used as the data worth a predetermined number of chips corresponding to one frequency by this preprocess. It is a matter of course that the IF data that has not been preprocessed itself can also be used.

On the other hand, the DSP 53 according to this embodiment may enable a plurality of PN codes that are different for each GPS satellite to be generated in an exact timing all at once, for example, on the basis of the information stored and held in the ROM 55.

In this example shown in FIG. 4, in order to simplify the explanation thereof, it is assumed that the diffusion code generator 534 may generate three kinds of different PN codes c(1), c(2) and c(3) worth an frequency (1023 chips) in an exact timing all at once. In other words, the diffusion code generator 534 is equivalent to a unit provided with three diffusion code generators 534(1), 534(2) and 534(3) as shown in FIG. 4.

Then, each of the three kinds of PN codes generated in the DSP 53 is supplied to the selector 535. The selector 535 selects two kinds of PN codes from among the three kinds of PN codes to be supplied thereto, and supplies these selected two kinds of PN codes to the adder 536.

The adder 536 adds the two kinds of PN codes supplied thereto, and supplies these to the first FFT processor 537. The first FFT processor 537 carries out FFT-process on the addition result from the adder 536 supplied thereto, and writes its result in the memory 538. As this memory 538, as shown in parentheses in FIG. 4, for example, the RAM 54 is used. From this memory 538, as same as the normal case, the frequency is read out from the one having a lower FFT processing result by rotation to be supplied to the multiplier 533.

In the multiplier 533, the FFT processing result of the IF data from the memory 532 is multiplied by the FFT processing result of the addition result of the two kinds of PN codes, and the correlation degree between the IF data in the frequency area and the two kinds of PN codes generated in this GPS receiver may be calculated. In this case, according to the multiplication in the multiplier 533, a complex conjugate of any one of a discrete Fourier transform result of the received signal and a discrete Fourier transform of the PN code is multiplied by the other one of them. Then, its multiplication result is supplied to the inverse FFT processor 539, and a signal in a frequency area is returned to a signal in a time area.

The inverse FFT processing result obtained from the inverse FFT processor 539 comprises a correlation detection signal in a time area between the IF data and the PN code generated in the GPS receiver according to this embodiment, and this correlation detection signal is supplied to the correlation point detector 540. In the correlation point detector 540, it is detected whether or not the IF data is synchronized with the PN code generated in the GPS receiver, and in a case that that the IF data is detected to be synchronized with the PN code generated in the GPS receiver, the phase of the peak value of the correlation detection signal is detected as the correlation point.

Figure 5:
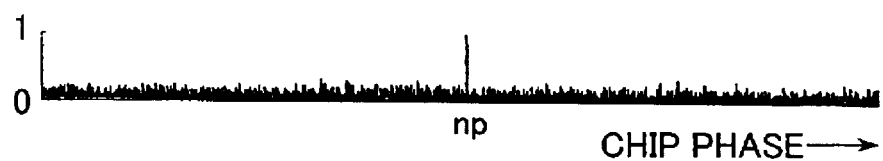
FIG. 5 is a view for showing an example of a spectrum of a correlation detection output.

This correlation detection signal indicates a correlative value in each chip phase worth one frequency of the PN code (diffusion code). In a case that the diffusion code in the IF data is synchronized with the PN code (diffusion code) from the diffusion code generator 534, as shown in FIG. 5, a correlation waveform showing a peak value which exceeds a predetermined threshold value is obtained. The chip phase of this peak value becomes a phase at the correlation point (C/A code phase). In other words, a position of this peak value is identical to a head position of the PN code.

On the other hand, in a case that the diffusion code among the IF data is not synchronized with the diffusion code from the diffusion code generator 534, the correlation waveform of the peak value as shown in FIG. 5 can not be obtained, so that, even in any chip phase, there is no peak exceeding a predetermined threshold value in any chip phase.

The correlation point detector 540 detects whether or not the IF data as the received signal is synchronized with the PN code generated in this GPS receiver to be generated in this GPS receiver, for example, depending on that there is a peak value exceeding a predetermined value in the correlation detection signal to be supplied to this correlation point detector 540. Then, in a case that the synchronization is detected, the correlation point detector 540 detects the phase of the above mentioned peak value as the correlation point.

In the case of this embodiment, as shown in FIG. 4, the two different PN codes are added, and are FFT-processed to be multiplied by the FFT processing result of the IF data. Accordingly, receiving the GPS signals from a plurality of GPS satellites, as described above, if there is the IF data that is synchronized with each of the added two PN codes, this results in that there are two peaks as shown in FIG. 5.

In addition, even in a case that there is only one peak, when a peak value is detected by changing the combination of the PN codes to be added, and detecting a peak value again with multiplying the addition result of these PN codes whose combination is changed, by the FFT processing result of the IF data once again, it is possible to detect with which PN code the IF data is synchronized.

In the case of this embodiment, the three kinds of PN codes c(1), c(2) and c(3) having different code patterns are used. Then, at first, (i) by using the addition of the PN code c(1) and the PN code c(2), the processing for detecting the above described correlation point is performed; and (ii) by using the addition of the PN code c(2) and the PN code c(3), the above described correlation point is detected.

Then, when there is only one peak at the same position both in the case of (i), that is, using c(1)+c(2) and in the case of (ii), that is, using c(2)+c(3), it is found that the IF data is synchronized with the PN code c(2). In addition, when there are two peaks at the different positions both in the case of (i) and in the case of (ii), it is found that the IF data is synchronized with two PN codes, namely, the PN code c(1) and the PN code c(3).

In addition, when there is a peak only in the case of (i), it is found that the IF data is synchronized with the PN code c(1), and when there is a peak only in the case of (ii), it is found that the IF data is synchronized with the PN code c(3).

In this way, by performing the detection processing of the correlation point twice, namely, the above mentioned (i) and (ii), the correlation point with respect to the three different PN codes is detected. As a result, it is possible to synchronize the IF data with the diffusion signal of the GPS signals from the different three GPS satellites.

In this case, in order to simplify the explanation, the case of using the three kinds of PN codes c(1), c(2) and c(3) is taken as an example. However, the PN code is not limited to three kinds. For example, even in a case of using four kinds of PN codes c(1), c(2), c(3) and c(4), the detection processing of the correlation point can be performed at three times, namely, (i) a case of using the addition of the PN code c(1) and the PN code c(2); (ii) a case of using the addition of the PN code c(2) and the PN code c(3) and (iii) a case of using the addition of the PN code c(3) and the PN code c(4).

Then, considering all results of the detection processing of the correlation point at three times, if the correlation point can be detected only in the case of (i), that is, using c(1)+c(2), it is found that the IF data is synchronized with the PN code c(1). On the other hand, if the correlation point can be detected only in the case of (vi), that is, using c(3)+c(4), it is found that the IF data is synchronized with the PN code c(4).

In addition, when only one correlation point can be detected at the same position both in the case of (i) and the case of (ii), that is, using c(2)+c(3), it is found that the IF data is synchronized with the PN code c(2). On the other hand, when only one correlation point can be detected at the same position both in the case of (ii) c(2)+c(3) and the case of (iii), that is, using c(3)+c(4), it is found that the IF data is synchronized with the PN code c(3).

In addition, when different three correlation points can be detected at the different positions both in the case of (i) and the case of (ii), it is found that the IF data is synchronized with the three PN codes c(1), c(2) and c(3). In this way, in accordance with the combination of the results of the detection processing of the correlation point, it is possible to detect which PN code among the four PN codes is synchronized with the IF data.

Thus, by detecting the correlation point by means of the addition of the PN codes used in the different GPS satellites, compared to the case that the IF data is synchronized with the PN code with respect to the GPS signals from a plurality of GPS satellites one by one, it becomes possible that the number of the FFT processing is decreased so that the IF data is synchronized with the PN code and the transmitted data is demodulated quickly.

According to the above explanation, a carrier component of the IF data as the received signal is not considered, however, in a practical sense, a received signal r(n) includes a carrier wave as shown in a mathematical expression (3) in FIG. 8. In this mathematical expression (3), a reference mark A denotes an amplitude, a reference mark d(n) denotes data, a reference mark $f_0$ denotes a carrier angle frequency in an intermediate frequency signal, and a reference mark n(n) denotes a noise.

Assuming that a sampling frequency in the sampler 51 is fs, and the number of sampling is N (accordingly, $0 \leq n < N$, $0 \leq k < N$), a relation between a discrete frequency k after a discrete Fourier transform and a real frequency f is represented as $f = k \cdot fs/N$ where $0 \leq k < N/2$, and $f = (k-N) \cdot fs/N (f<0)$ where $N/2 < k < N$. In this case, according to a nature of the discrete Fourier transform, R(k) and C(k) indicate circularity where $k<0$, $k \geq N$.

In order to obtain the data d(n) from the received signal r(n), it is necessary to synchronize the diffusion code c(n)

with a carrier cos $2\pi nf_0$ and to remove the carrier component therefrom. In other words, in a case that a carrier component is only included in R(k) in the mathematical expression (2) shown in FIG. 8 to be described later, a correlation waveform as shown in FIG. 5 can not be obtained.

According to this embodiment, depending on a simple configuration, namely, only the processing in the frequency area by the FFT, it is possible to synchronize the diffusion code c(n) with a carrier cos $2\pi nf_0$ and to delete the carrier component therefrom.

In other words, the FFT processing result of the IF data as the received signal from the GPS satellite, which is obtained from the FFT processor 531, is read out from the memory 532 in an order from the frequency having a lower frequency component of the received signal by rotation to be supplied to the multiplier 533. However, according to this embodiment, the DSP 53 functions as the read out address control unit, the read out address is shift-controlled in accordance with the control from the DSP 53, and the FFT processing result of the IF data is sequentially read out from the memory 532.

The information of the carrier frequency of the received signal detected on the basis of the accurate estimation of the Doppler shift amount with respect to the GPS satellite, from which the received signal is received, and the accurate calibration of the oscillation frequency and the time information within the GPS receiver is supplied to the DSP 53. This information of the carrier frequency is formed only within the GPS receiver, however, for example, this information is acquired from the outside through the communication network or the like.

Then, on the basis of this obtained information of the carrier frequency, the DSP 53 shifts the read out address corresponding to the carrier frequency thereof, namely, the DSP 53 shifts the read out address by the frequency corresponding to the deviation according to the Doppler shift amount from the original carrier frequency, and sequentially reads out the FFT processing result of the IF data as the received signal from the memory 532 so as to supply it to the multiplier 533.

Thus, by reading out the FFT processing result of the received signal r(n) from the memory 532 as shifting it by an amount corresponding to the carrier frequency of the received signal, as described later, it is possible to acquire the FFT processing result, which is equivalent to the FFT processing result of the received signal, from which the carrier component is removed. Further, by inverse-diffusing the multiplication result between this FFT processing result, from which the carrier component is removed, and the FFT processing result corresponding one frequency of the diffused signal, it is possible to acquire the correlation detection output having a peak at the correlation point for certain as shown in FIG. 5.

By the way, a complex conjugate of any one of the FFT result of the IF data and the diffusion code thereof may multiplexed by the other one of them. In addition, as described later, by controlling the read out address of the FFT processing result not from the memory 532 but from the memory 538, a part corresponding to the carrier frequency of the received signal r(n) is added to the FFT processing result of the diffusion code, so that it is also possible to substantially remove the carrier component according to the multiplication in the multiplier 533.

Hereinafter, the removal of the carrier component by synchronizing the carrier of the received signal with the PN code (diffusion code) by means of controlling the reading address from the memory 532 or the memory 538 will be described further in detail together with the description of the processing operation of the digital matched filter in the DSP 53.

According to this embodiment, in the DSP 53, the processing of the digital matched filter is performed, however, a principle of the processing of this digital matched filter is based on a proposition that a folding Fourier transform in a time area is made into the multiplication in the frequency area as shown in the mathematical expression (1) shown in FIG. 8.

According to this mathematical expression (1), a reference mark r(n) denotes a received signal in a time area, and a reference mark R(k) denotes a discrete Fourier transform thereof. In addition, a reference mark c(n) denotes a diffusion code from the diffusion code generation unit, and a reference mark C(k) denotes a discrete Fourier transform thereof. A reference mark n denotes a discrete time, and a reference mark k denotes a discrete frequency. Then, a reference mark F[ ] denotes a Fourier transform.

Further defining the correlation functions of two signals r(n) and c(n) as f(n), a discrete Fourier transform F(k) of f(n) is represented as the mathematical expression (2) shown in FIG. 8. Accordingly, assuming that r(n) is a signal from the A/D converter 45 shown in FIG. 2 and c(n) is a diffusion code from the diffusion code generator 534, a correlation function f(n) between r(n) and c(n) is calculated by the above mentioned mathematical expression (2) without depending on a normal definitional equation in the following procedures:

1. Calculate a discrete Fourier transform R(k) of the received signal r(n).
2. Calculate a complex conjugate of the discrete Fourier transform C(k) of the diffusion code c(n).
3. Calculate F(k) of the mathematical expression (2) using the R(k) and the complex conjugate of C(k).
4. Calculate a correlation function f(n) using the inverse discrete Fourier transform of F(k).

As described above, if the diffusion code included in the received signal r(n) is identical to the diffusion code c(n) from the diffusion code generator 534, the correlation function f(n) calculated by the above described procedures forms a time waveform having a peak at the correlation point as shown in FIG. 5. As described above, according to this embodiment, since the speeding up algorithms of the FFT and the inverse FFT are applied to the discrete Fourier transform and the inverse Fourier transform, it is possible to calculate the correlation at quite a higher speed than the calculation of the correlation on the basis of the proposition.

In the next place, the synchronization of the carrier frequency included in the received signal r(n) and the diffusion code will be described below.

As described above, the received signal r(n) includes the carrier wave as shown in the mathematical expression (3) of FIG. 8. In order to obtain the data d(n) from the received signal r(n), it is necessary to synchronize the diffusion code c(n) with the carrier cos $2\pi nf_0$ and to remove the carrier component therefrom. In other words, in a case that a carrier component is only included in R(k) in the mathematical expression (2) shown in FIG. 8, a correlation waveform as shown in FIG. 5 can not be obtained.

Figure 6:
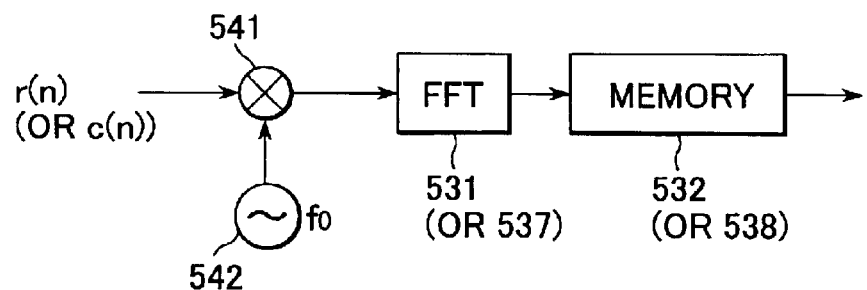
FIG. 6 is a diagram for illustrating the other example of the synchronization acquisition unit.

If the Doppler shift amount is accurately estimated, and the oscillation frequency and the time information within the GPS receiver are accurate, the carrier frequency $f_0$ of the received signal r(n) is given. In this case, as shown in FIG. 6, a multiplier 541 is provided at a front stage of the FFT processor 531 and in this multiplier 541, the received signal r(n) is multiplied by the carrier wave of the frequency $f_0$ from a signal generator 542 to convert the frequency. As a result, it is possible to remove the carrier component from the received signal r(n) before performing the FFT.

In this case, the FFT processing result of the received signal r(n), from which its carrier component is removed, is obtained from the memory 532. This FFT processing result is multiplied by the FFT processing result of the diffusion code c(n) by the multiplier 533, so that, as the output of the inverse FFT processor 539, a time waveform having a peak at the correlation point as shown in FIG. 5 can be acquired for certain.

Further, the same may be applied to a case that the carrier component is not removed from the received signal r(n) as shown in parentheses in FIG. 6, the multiplier 541 is provided at a front stage of the FFT processor 537 with respect to the diffusion code c(n), and the diffusion code c(n) is multiplied by the carrier wave having the carrier frequency $f_0$ from the signal generator 542 in this multiplier 541 to convert the frequency, and the carrier component may be added to the diffusion code.

In other words, according to the above case, since the carrier component included in the FFT processing result of the received signal, which is read out from the memory 532, is synchronized with the added carrier component included in the FFT processing result of the diffusion code, which is read out from the memory 538, as shown in FIG. 5, the correlation detection output having a peak at the correlation point can be acquired from the inverse FFT processor 539.

However, according to the above described method for multiplying the signal in the time area by the signal of the carrier frequency as shown in FIG. 6, a multiplier for removing the carrier component is particularly required, so that this involves a disadvantage that the configuration becomes complicated, and the processing rate becomes lower by the multiplication operation.

By the way, as a nature of the FFT, the above described frequency multiplication can be represented by the mathematical expression (4) shown in FIG. 8. In this mathematical expression (4), a reference mark F[ ] denotes a discrete Fourier transform, a reference mark $\phi_0$ denotes a phase difference between the diffusion code c(n) and the carrier, a reference mark $k_0$ denotes k corresponding to $f_0$, and $f_0 = k_0 \cdot fs/N$ is satisfied. From this mathematical expression (4), in the FFT of the signal obtained by converting the frequency of the received signal r(n) as shown in FIG. 6, R(k) as the FFT of r(n) is shifted by an amount corresponding to the carrier frequency $k_0$.

Figure 7:
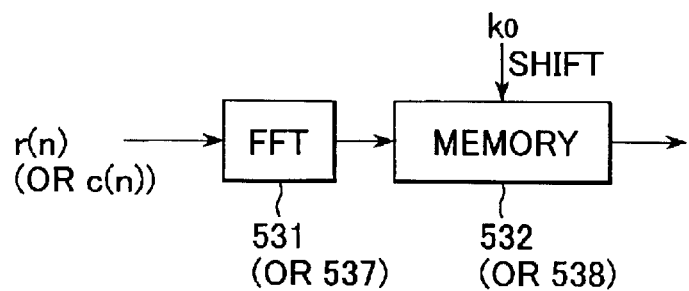
FIG. 7 is a diagram for illustrating the other example of the synchronization acquisition processing.

As described above, the configuration of FIG. 6 can be replaced with the configuration as shown in FIG. 7. In other words, in place of multiplying the received signal r(n) or the diffusion code c(n) by the carrier frequency, the read out address upon reading out the FFT processing result of the received signal or the FFT processing result of the diffusion code from the memory 532 or the memory 538 may be shifted by the amount corresponding to the carrier frequency.

In this case, in FIG. 7, when the received signal r(n) is shifted, $k_0 > 0$ is satisfied by means of down conversion, and when the diffusion code c(n) is shifted, $k_0 < 0$ is satisfied by means of up conversion.

As described above, when the characteristic features of the FFT shown in the mathematical expression (4) are used, the signal generator 542 shown in FIG. 6 becomes unnecessary, and as shown in FIG. 7, shifting the read out address phase from the memory of the FFT processing result is only required, so that this makes the configuration simple and this leads to speeding up of the processing.

Further, since the phase difference $\phi_0$ in the above described mathematical expression (4) is not known, it is ignored in FIG. 4, however, a correlation function f'(n) (0≦n<N) obtained as the inverse FFT operation result of F'(k), which is calculated by the mathematical expression (5) in FIG. 8, becomes a complex number. Assuming that its real part is defined as $f'_R(n)$, and its imaginary part is defined as $f'_I(n)$, an amplitude of a correlation peak |f'(n)| may be acquired as shown in the mathematical expression (6) in FIG. 8, and the phase $\phi_0$ can be obtained as shown in the mathematical expression (7) in FIG. 8. Therefore, the multiplication of a right side member in the mathematical expression (4), namely, the multiplication of exp (j$\phi_0$) may be omitted. In addition, the phase $\phi$ is defined in such a manner that the phase difference $\phi\Phi_0$ of the mathematical expression (4) is added to two values, which are different by π corresponding to a code of the data d(n) in the mathematical expression (3).

Then, as the output of each block shown in FIG. 4, the above described signal outputs r(n), c(n) and the operation results R(k), C(k), and f'(n) are represented.

In this way, in the GPS receiver according to the present embodiment, in the case of configuring a digital matched filter by using the FFT, if a correlation point np is acquired as a waveform, for example, as shown in FIG. 5, by the configuration as shown in FIG. 4 in which, in the FFT processing result of the received signal, the address of the memory is shifted by the amount corresponding to the carrier frequency to be multiplied with the diffusion code, and the correlation point np (C/A code phase) is found with respect to three GPS satellites, namely, three kinds of diffusion codes c(1), c(2), and c(3), it becomes possible to calculate a two-dimensional positioning of the GPS receiver. Further, if the correlation point np (C/A code phase) is found with respect to four GPS satellites, namely, four kinds of diffusion codes c(n), it becomes possible to calculate a three-dimensional positioning of the GPS receiver.

In other words, according to the present embodiment, in a case of performing the digital matched filter processing by means of the FFT, the carrier component of the received signal can be removed, according to a simple method, in which, in order to synchronize the carrier wave of the received signal with the diffusion code, without performing the multiplication in the time area, and upon multiplication the FFT processing result of the received signal by the FFT processing result of the diffusion code in the frequency area, one FFT processing result among the FFT processing result of the received signal and the FFT processing result of the diffusion code is shifted.

According to an example shown in FIG. 4, the read out address of the memory of the FFT processing result R(k) of the received signal is shifted, however, the read out address of the memory of the FFT processing result C(k) of the diffusion code may be shifted in the opposite direction of the case of using the FFT processing result R(k) of the received signal (it becomes the up conversion in the multiplier).

In addition, according to the description of the above described embodiment, the diffusion code generator 534 and the FFT processing unit 537 are provided separately, however, by storing the diffusion codes corresponding to respective GPS satellites, which have been provided with FFT in advance, in the memory, the FFT calculation of the diffusion code C(n) upon receiving the satellite signal can be omitted.

In this way, the synchronization acquisition unit 5 of the GPS receiver according to the present embodiment performs the synchronization acquisition process at a high speed by means of the FFT and detects the C/A code phase, the carrier frequency, the correlation peak level and the satellite number to notify the control unit 7 of these. The control unit 7 supplies these to the synchronization maintaining unit 6.

In addition, in FIG. 1, the C/A code phase, the carrier frequency, the correlation peak level and the satellite number to be detected in the synchronization acquisition unit 5 may be directly notified from the synchronization acquisition unit 5 to the synchronization maintaining unit 6.

[Synchronization Maintaining Unit 6]

Figure 9:
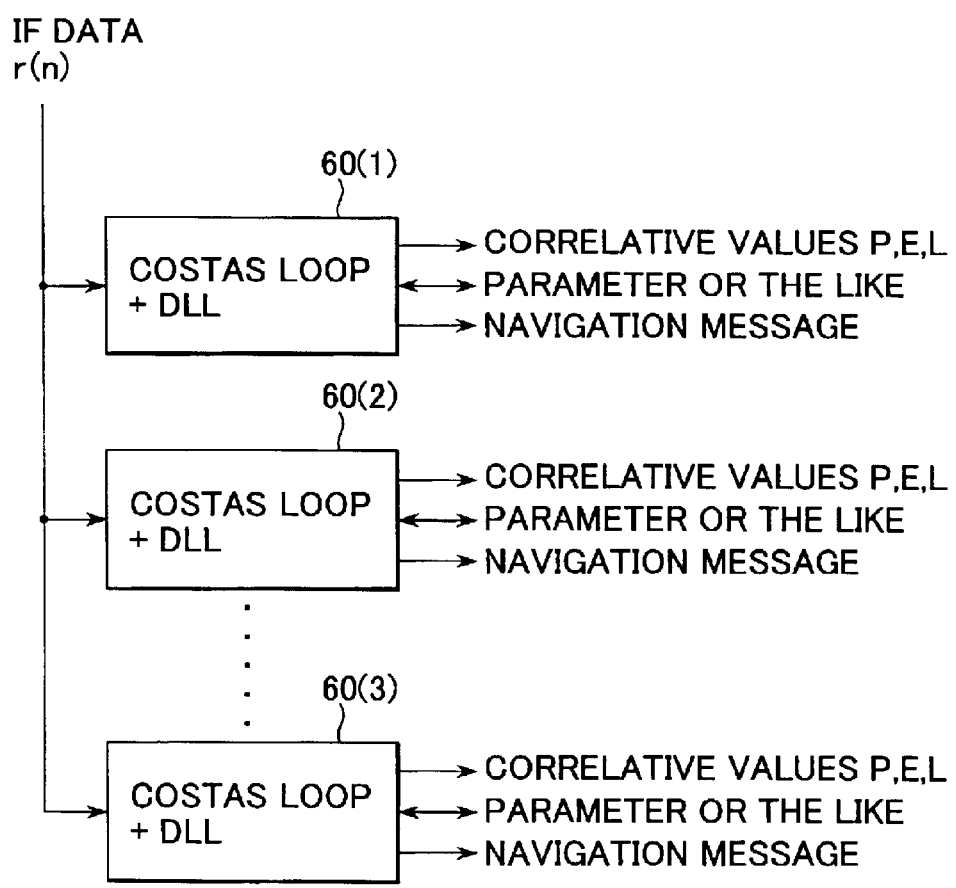
FIG. 9 is a block diagram for illustrating an example of a synchronization maintaining unit of the GPS receiver.

In the next place, the synchronization maintaining unit 6 will be described below. As shown in FIG. 9, the synchronization maintaining unit 6 includes n pieces of the synchronization maintaining circuits 60(1), 60(2), . . . 60(n) so as to perform the processing with respect to the GPS signals from the different GPS satellites separately.

In accordance with the C/A code phase, the carrier frequency, the correlation peak level and the satellite number from the synchronization acquisition unit 5, which are supplied through the control unit 7, each of the synchronization maintaining circuits 60(1), 60(2), . . . 60(n) sets these information, draws in the synchronization of the carrier frequency and the phase synchronization of the C/A code at once with respect to the IF data from the frequency conversion unit 4, and operates so as to maintain these synchronization of the carrier frequency and phase synchronization of the C/A code, which have been drawn in.

Then, each of the synchronization acquisition circuits 60(1), 60(2), . . . 60(n) of the synchronization maintaining unit 6 acquires a navigation message by demodulating the transmitted data to be provided by the GPS signal maintaining the synchronization to have this navigation message available by the control unit 7. The control unit 7 uses the navigation message, for example, from four synchronization maintenance circuits and obtains the position of this GPS receiver by means of the positioning operation.

According to this embodiment, each of the synchronization maintaining circuits 60(1), 60(2), . . . 60(n) of the synchronization maintaining unit 6 is configured by a costas loop and a DLL (Delay Locked Loop).

Figure 10:
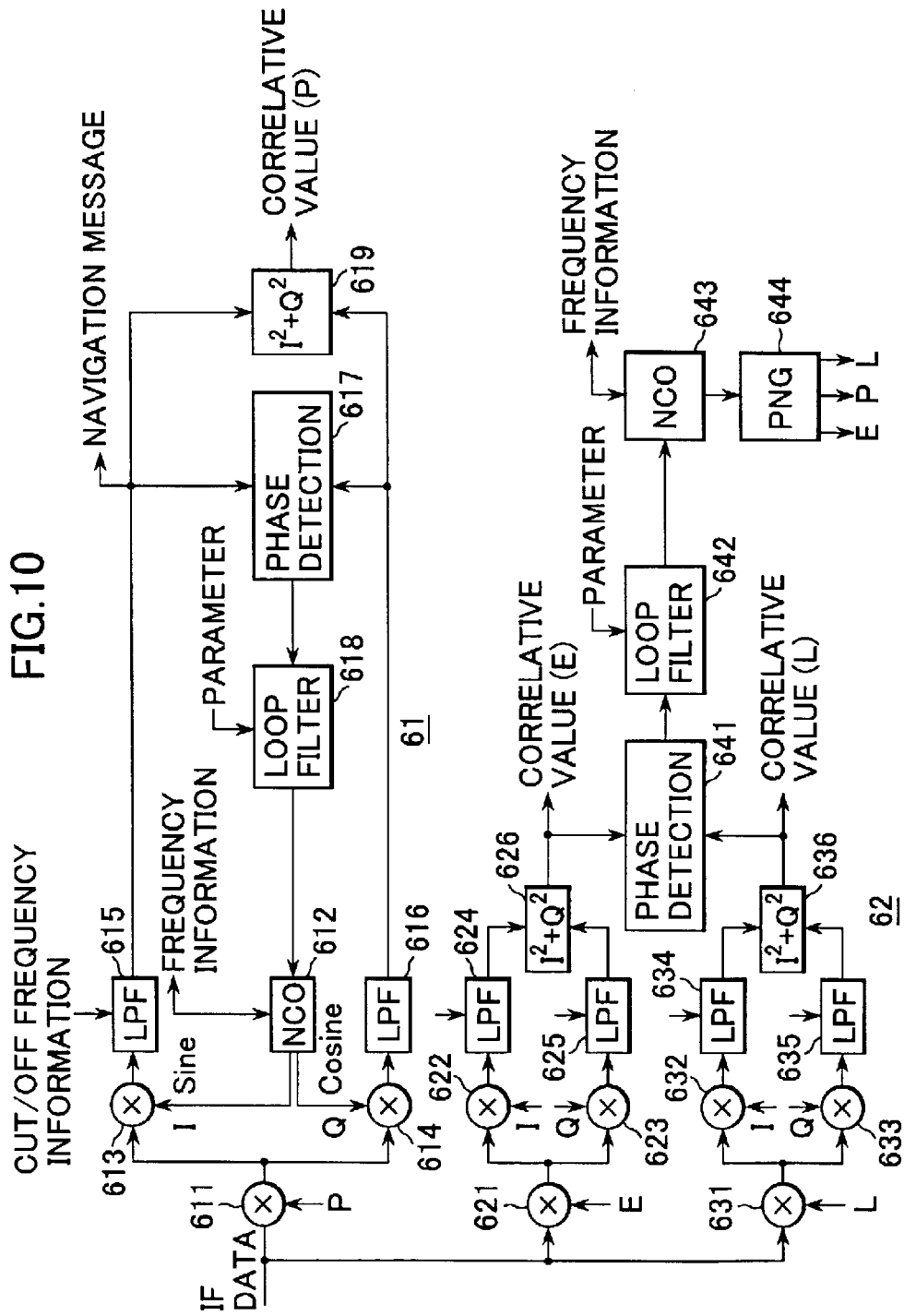
FIG. 10 is a block diagram for illustrating an example of each synchronization maintaining circuit consisting the synchronization maintaining unit shown in FIG. 9.

FIG. 10 is a block diagram for illustrating a constitutional example of each of the synchronization maintaining circuits 60(1), 60(2), . . . 60(n). In FIG. 10, a portion applied with reference numerals 612 to 619 is a costas loop 61. In addition, in FIG. 22, a portion applied with reference numerals 621 to 622 is a DLL 62.

The costas loop 61 serves to maintain the synchronization of the carrier frequency and to extract the navigation message as the transmitted data, and the DLL 62 serves to maintain the phase synchronization of the C/A code. Further, the costas loop 61 and the DLL 62 collaborate with each other and perform the inverse spectrum diffusion by using the PN code as same as the PN code, in which the IF data as the received signal is spectrum-diffused to obtain the signal before the spectrum diffusion. At the same time, they demodulate the signal before this spectrum diffusion, acquire the navigation message, and supply it to the control unit 7. The operation of the costas loop 61 and the DLL 62 will be specifically described.

[Costas Loop 61]

The IF data from the frequency conversion unit 4 is provided to multipliers 611, 621, and 631 of the synchronization maintaining unit 6. As shown in FIG. 10, each of a prompt PN code p, an early PN code E, and a late PN code L from a PN code generator 644 (it is depicted as PNG in FIG. 10) is provided to each of these multipliers 611, 621, and 631.

As also described later, the PN code generator 644 may generate a prompt PN code p, an early PN code E, and a late PN code L on the basis of the signal from an NCO (Numerically Controlled Oscillator) 643. In this case, the NCO 643 is provided with the frequency information set in the control unit 7 on the basis of the acquisition result of the synchronization acquisition unit 5, forms a signal for controlling the PN code generator 644 so as to generate a PN code without lag and lead, which is the same as the PN code of a target of the synchronization maintaining, in which the IF data as the received signal is spectrum-diffused, and of which phase is identical to that of the foregoing PN code, and provides it to the PN code generator 644.

As described above, on the basis of the signal from the NCO 643, the PN code generator 644 forms a prompt PN code P without lag and lead, which is the same as the PN code, in which the IF data as the received signal of a target of the synchronization maintaining is spectrum-diffused, and of which phase is identical to that of the foregoing PN code, an early PN code E comprising the PN code configured so that its phase gets advance than the prompt PN code P by a predetermined amount, and a late PN code L comprising the PN code configured so that its phase gets behind with regard to the prompt PN code P by a predetermined amount to provide them to the multipliers 611, 621 and 631, respectively.

The multiplier 611 provided at the front stage of the costas loop 61 performs the spectrum inverse diffusion by multiplying the IF data from the frequency conversion unit 4 by the prompt PN code P from the PN code generator 644, and provides the signal after the inverse diffusion to the costas loop 61.

As shown in FIG. 10, the costas loop 61 is configured with a numerically controlled oscillator (NCO) 612, multipliers 613, 614, LPFs (Low Pass Filters) 615, 616, a phase detector 617, a loop filter 618, and a correlation detector 619.

The signal that is inverse-diffused in the multiplier 611 is provided to the multipliers 613, and 614 of the costas loop 61. As shown in FIG. 10, in accordance with the carrier frequency as the frequency information from the control unit 7, from among an I (Sine) signal and a Q (Cosine) signal having the orthogonal phases formed in the NCO 612, the I signal is provided to the multiplier 613 and the Q signal is provided to the multiplier 614.

In the multiplier 613, the IF data which is inverse-diffused is multiplied by the I signal from the NCO 612, and its result is provided to the phase detector 617 through the LPF 615. In addition, in the multiplier 614, the inverse-diffused IF data is multiplied by the Q signal from the NCO 612, and its result is provided to the phase detector 617 through the LPF 616.

The LPFs 615 and 616 are provided with the cut/off frequency information from the control unit 7 to remove an out-band noise of the signal provided thereto. The phase detector 617, on the basis of the output signals from the LPFs 615, 616, detects the phase error between the carrier wave of the received signal and the signal generated by the NCO 612, for example, at one-millisecond intervals, and provides this phase error to the NCO 612 through the loop filter 618. Thereby, the NCO 612 is controlled so that the phase of the output carrier signal from the NCO 612 may track the carrier component of the received signal.

Further, the loop filter 618 of the costas loop 61 performs integration of the phase error information from the phase detector 617 in response to a parameter provided from the control unit 7 to form an NCO control signal for controlling the NCO 612. As described above, the NCO 612 is controlled by the NCO control signal from the loop filter 618 so that the phase of the output carrier signal from the NCO 612 may track the carrier component of the received signal.

In addition, the outputs from the LPFs 615, 616 of the costas loop 61 are provided to the correlation detector 619. The correlation detector 619 squares the outputted signals from the LPFs 615, 616 provided thereto, adds them, and outputs them. This output from the correlation detector 619 represents a correlative value. (P) between the IF data and the prompt PN code P from the PN code generator 644. This correlative value (P) is stored in, for example, a register (not illustrated) so as to allow the control unit 7 to use the correlative value (P).

The control unit 7 determines whether the synchronization of the carrier frequency is locked or unlocked from the correlative value (P) from the correlation detector 619. When it is unlocked, the control 7 controls the costas loop 61 so that the costas loop 61 draws in the carrier frequency and locks it.

Then, the demodulation output of the transmitted data is acquired from the LPF 615, and this demodulation output is decoded to be used in the control unit 7 as the navigation message.

[DLL 62]

On the other hand, the multiplier 621 performs the spectrum inverse diffusion by multiplying the IF data from the frequency conversion unit 4 by the early PN code E from the PN code generator 644, and provides this inverse-diffused signal provided to the multipliers 622, 623 of the DLL 62. As described above, the I signal generated in the NCO 612 is provided to the multiplier 622, and the Q signal generated in the NCO 612 is provided to the multiplier 623.

The multiplier 622 multiplies the inverse-diffused IF data by the I signal from the NCO 612, and provides its result to a correlation detector 626 through the LPF 624. In the same way, the multiplier 623 multiplies the inverse-diffused IF data by the Q signal from the NCO 612, and provides its result to the correlation detector 626 through the LPF 625. The LPFs 624, 625 are provided with the cut/off frequency information from the control unit 7, similarly to the LPFs 615, 616 of the costas loop 61, to remove the out-band noise of the signal provided thereto.

The correlation detector 626 multiplies the outputted signals from the LPFs 624, 625 provided thereto by itself, adds them, and outputs them. This output from the correlation detector 626 represents a correlative value (E) between the IF data and the prompt PN code P from the PN code generator 644. This correlative value (E) is provided to a phase detector 641 to be stored in, for example, a register (not illustrated) so as to allow the control unit 7 to use the correlative value (E).

In the same way, the multiplier 631 performs the spectrum inverse diffusion by multiplying the IF data from the frequency conversion unit 4 by the late PN code L from the PN code generator 644, and then, provides this inverse-diffused signal to the multipliers 632 and 633 of the DLL 62. As described above, the I signal generated in the NCO 612 is provided to the multiplier 632, and the Q signal generated in the NCO 612 is provided to the multiplier 633.

The multiplier 632 multiplies the inverse-diffused IF data by the I signal from the NCO 612, and provides its result to a correlation detector 636 through the LPF 634. In the same way, the multiplier 633 multiplies the inverse-diffused IF data by the Q signal from the NCO 612, and provides its result to a correlation detector 636 through the LPF 635. The LPFs 634, 635 are provided with the cut/off frequency information from the control unit 7, similarly to the above described LPFs 624 and 625, to remove the out-band noise of the signal provided thereto.

The correlation detector 636 squares the outputted signals from the LPFs 634, 635 provided thereto, adds its result, and outputs it. This output from the correlation detector 636 represents a correlative value (L) between the IF data and the late PN code L from the PN code generator 644. This correlative value (L) is provided to a phase detector 641 to be stored in, for example, a register (not illustrated) so as to allow the control unit 7 to use the correlative value (L).

The phase detector 641 is provided with the correlative value (E) from the correlation detector 626 and the correlative value (L) from the correlation detector 636, and detects the phase error between these correlative values. Then, the phase detector 641, on the basis of this phase error, forms a signal to be provided to the PN code generator 644 for regulating the outputted signal from the NCO 643, and provides this signal to the NCO 643 via the loop filter 642.

Figure 11:
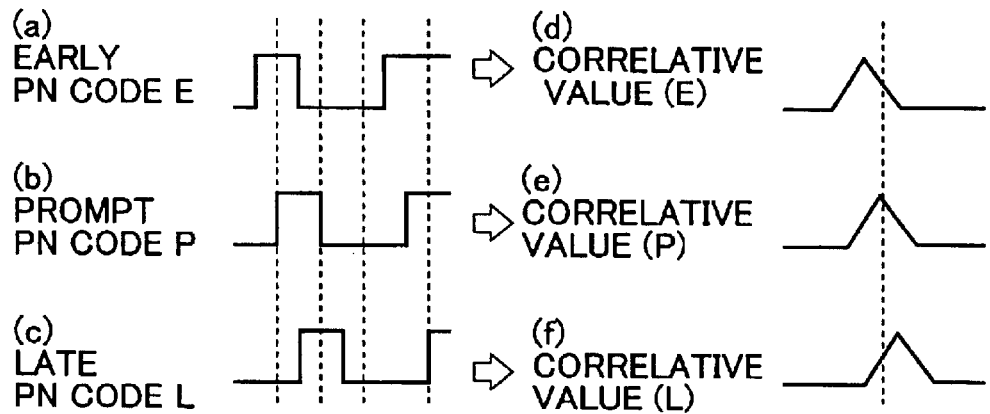
FIG. 11 is a diagram for explaining the operation of a DLL of each synchronization maintaining circuit shown in FIG. 10.

For example, as shown in FIG. 11, if there are the prompt PN code P (FIG. 11(*b*)), the early PN code E (FIG. 11(*a*)) of which phase is made advanced than the prompt PN code P by a predetermined amount, and the late PN code L (FIG. 11(*c*)) of which phase is made behind than the prompt PN code P by a predetermined amount, a correlative value between each of them and the IF data will be considered below.

According to the example shown in FIG. 11, by regulating the phase of the prompt PN code P so that the level of the correlative value (E) between the early PN code E shown in FIG. 11(*d*) and the IF data is identical to the level of the correlative value (L) between the late PN code L shown in FIG. 11(*f*) and the IF data, the correlative value (P) becomes the maximum as shown in FIG. 11(*e*), so that it is possible to generate the prompt PN code P synchronized with the PN code which is spectrum-diffusing the IF data (namely, the phases are identical with each other).

As described above, the NCO 643 is provided with the frequency information showing the initial frequency from the control unit 7 in response to the acquisition result of the synchronization acquisition unit 5, and generates a signal for operating the PN code generator 644 so as to generate a PN code synchronized with the PN code which is spectrum-diffusing the IF data and is a signal from the target GPS satellite. However, as described above, on the basis of a signal from the phase detector 641 via the loop filter 642, the NCO 643 regulates the phase of the signal to be provided to the PN code generator 644.

Thereby, in response to the signal from the NCO 643, the phase of the PN code to be generated in the PN code generator 644 is regulated, and the prompt PN code P to be generated in the PN code generator 644 traces the PN code which is spectrum-diffusing the IF data, so that it is possible to accurately perform the inverse spectrum diffusion with respect to the IF data by means of the prompt PN code P, and to demodulate the received data.

Further, in the similar way to the above described loop filter 618 of the costas loop 61, the loop filter 642 of the DLL 62 performs integration of the phase error information from the phase detector 641 on the basis of a parameter provided from the control unit 7 to form an NCO control signal for controlling the NCO 643.

In this way, the synchronization of the spectrum-diffusion-modulated IF data may be maintained in the synchronization maintaining unit 6, and the navigation message as the transmitted data may be demodulated by the costas loop 61 of the synchronization maintaining unit 6. Then, as described above, the demodulation output of the navigation message is acquired from the LPF 615, is provided to a data demodulation circuit (not illustrated), and is demodulated into the data capable of being provided to the control unit 7. After that, this data is provided to the control unit 7 to be used for the positioning calculation.

Such synchronization maintaining processing and the demodulation processing of the transmitted data are performed in the synchronization maintaining circuits 60(1), 60(2), . . . 60(n), respectively. As described above, the navigation messages from four different GPS satellites are used and the positioning operation is performed in the control unit 7 to specify the position of the GPS receiver.
[Control Unit 7]

The control unit 7 serves to control each unit of the GPS receiver according to this embodiment, to receive the navigation message from the synchronization maintaining unit 6, to perform the positioning operation and to detect various times (time measurement).

Figure 12:
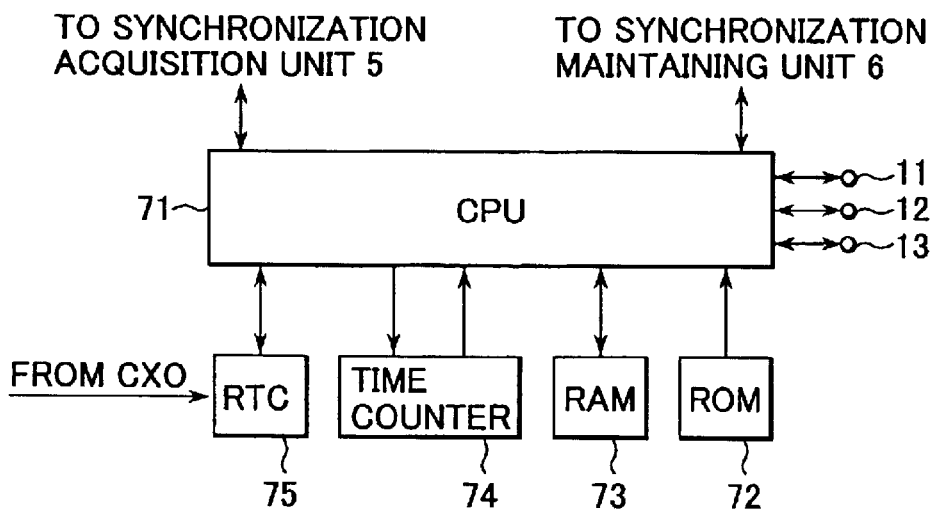
FIG. 12 is a block diagram for illustrating an example of a controller of the GPS receiver.

FIG. 12 is a block diagram for illustrating a constitutional example of the control unit 7. As shown in FIG. 12, the control unit 7 includes a CPU (Central Processing Unit) 71, a ROM (Read Only Memory) 72, a RAM (Random Access Memory) 73, a time counter 74, and a RTC (Real Time Clock) 75.

In this case, in the ROM 72, a program to be executed in the CPU 71 and various data to be used for the processing are stored. The RAM 73 is mainly used as a working area, for example, for temporally storing a halfway result of various processes. In addition, the time counter 74, and the RTC 75 are used to detect various time (time measurement).

As described above, the control unit 7 of the GPS receiver according to the present embodiment shown in FIG. 1 controls the synchronization acquisition unit 5 so as to acquire the synchronization of the carrier frequency of the received signal and the phase synchronization of the C/A code at a high speed. Then, on the basis of this acquisition result, the control unit 7 may control the synchronization maintaining unit 6, draw in the synchronization of the carrier frequency of the received signal and the phase synchronization of the C/A code at once to maintain them, acquire the bit data as the navigation message to perform the positioning operation, and accurately calculate the present position of this GPS receiver to output it via a host IO terminal 31.

In FIG. 1, the timing generator 8 is provided with a fundamental frequency signal from the TCXO 9, then, the timing generator 8 multiplies/divides it to form a clock signal to be provided to each unit such as the CPU, the synchronization acquisition unit 5, and the synchronization maintaining unit 6 so as to allow the target portion of each unit to operate.

Then, as described above with reference to FIG. 4, since the synchronization acquisition unit 5A of the GPS receiver according to this embodiment performs the synchronization acquisition by using the PN codes to which plural kinds of PN codes generated in this GPS receiver are added, it is possible to decrease the number of the FFT processing, and it is possible to perform the synchronization acquisition more rapidly compared to the case of performing the synchronization acquisition for each signal from each GPS satellite.

According to the above described first embodiment, two (two kinds of) PN codes from among a plurality of PN codes to be used by any one of GPS satellites are added, and these two PN codes are used for performing the detection processing of the correlation point in the synchronization acquisition unit 5. However, the present invention is not limited to this embodiment. Plural kinds of PN codes, such as three kinds of PN codes or four kinds of PN codes to be used in any one of GPS satellites may be added, and these PN codes may be used for performing the detection processing of the correlation point in the synchronization acquisition unit 5.

In addition, according to the above described first embodiment, while changing a combination of the PN codes to be added, the detection processing of the correlation point is repeated. However, the present invention is not limited to this embodiment. For example, in a case that n pieces of GPS satellites transmitting the GPS signal to be received are decided, with respect to the signals from these n pieces of GPS satellites, it is also possible to acquire the phase synchronization of the C/A code and the synchronization of the carrier frequency at the same time.

Figure 13:
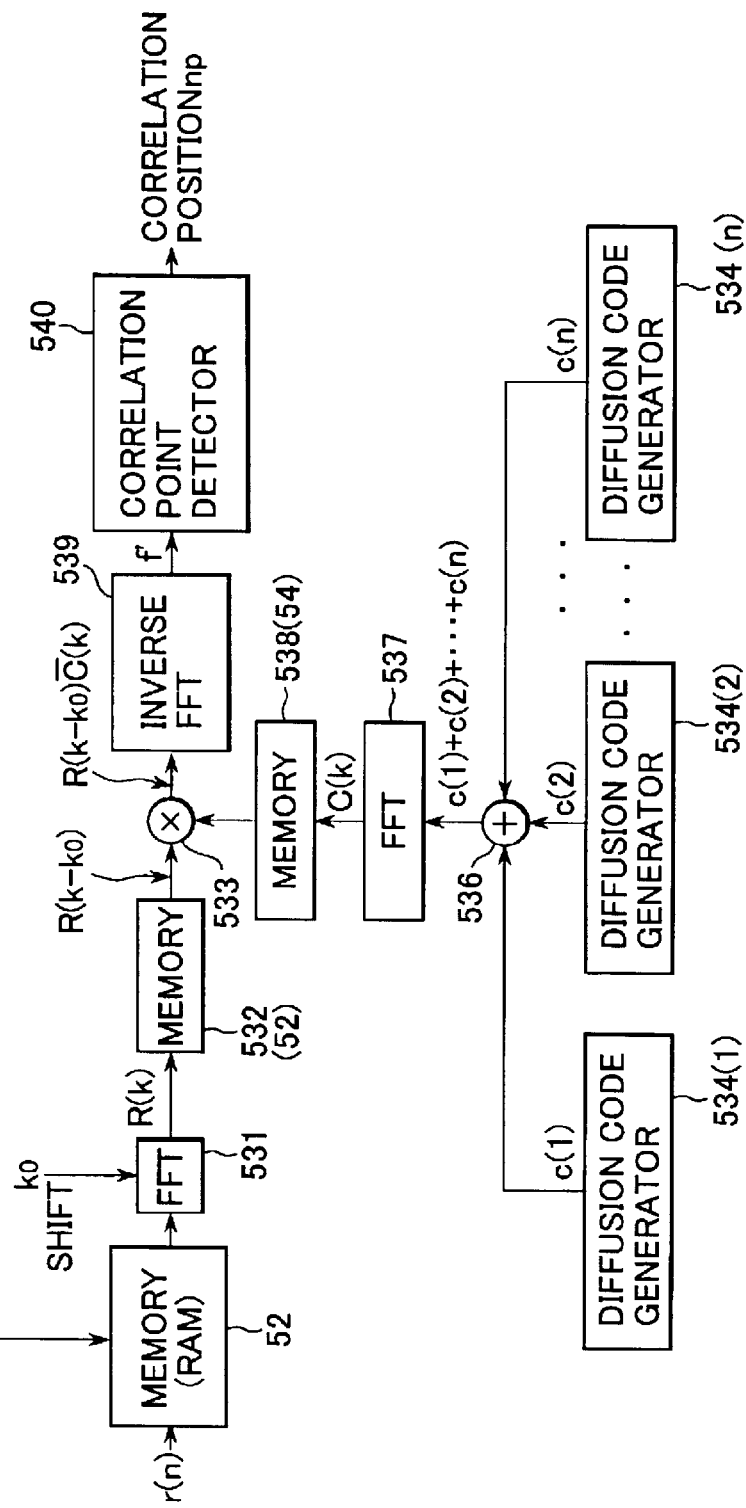
FIG. 13 is a block diagram for illustrating another example of a configuration and a function of the synchronization acquisition unit according to the first embodiment.

FIG. 13 is a block diagram for illustrating a configuration and the operation of a synchronization acquisition unit 5B of the GPS receiver of this embodiment, which enables the phase synchronization of the C/A code and the synchronization of the carrier frequency to be acquired at the same time with respect to the signals from the predetermined n pieces of GPS satellites.

As shown in FIG. 13, the synchronization acquisition unit 5B according to this example includes n pieces of diffusion code generators 534(1), 534(2), . . . , 534(n) and it is configured in the similar way to the synchronization acquisition unit 5A shown in FIG. 4 excluding that the synchronization acquisition unit 5B can generate n kinds of PN codes at the same time and that it does not include the selector 535.

This synchronization acquisition unit 5B shown in FIG. 13, without selecting the PN code to be added, adds all of the PN codes c(1), c(2), . . . , c(n) generated in the diffusion code generators 534(1), 534(2), . . . , 534(n), respectively, in an adder 536, performs the FFT processing with respect to them in an FFT processor 537, and writes them in a memory 538.

Accordingly, in a multiplier 533, the FFT processing results of all addition result of the PN codes c(1), c(2), . . . , c(n) are multiplied by the FFT processing result of the IF data in the multiplier 533, so that, if n pieces of correlation points are detected after the inverse FFT processing, it results in synchronizing of all of the PN codes c(1), c(2), . . . , c(n) at once.

In this way, according to a single detection processing of the correlation point, it is possible to acquire the phase synchronization of the C/A code and the synchronization of the carrier frequency with respect to the GPS signals from a plurality of GPS satellites.

Further, the number of kinds of the PN code to be added, namely, "n" is, for example, in a range from four and above to the number of all GPS satellites, and the number of kinds of the PN code to be added specifically corresponds to the number of the synchronization maintaining circuit 60 of the synchronization maintaining unit 6.
[Second Embodiment]

According to the GPS receiver of the above described first embodiment, in the synchronization acquisition unit 5, by using the addition of plural kinds of PN codes, the detection processing of the correlation point is performed to acquire the synchronization with rapidity. However, the addition of plural kinds of PN codes may have a risk that the PN codes are counteracted with each other to lower the detection level of the correlation point to some degree.

Therefore, according to the GPS receiver of a second embodiment, in the similar way to the case of the GPS receiver of the first embodiment, by using addition of plural kinds of PN codes, the detection processing of the correlation point is performed, however, the GPS receiver of the second embodiment is configured so as to avoid lowering of the detection level of the correlation point.

As described above, the GPS receiver of this second embodiment is configured in the similar way to the GPS receiver of the first embodiment shown in FIGS. 1 to 3, FIG. 9, FIG. 10, and FIG. 12. However, a specific configuration of the synchronization acquisition unit 5 is different. On this account, each portion other than the synchronization acquisition unit 5 of this second embodiment is herein omitted.

In addition, also according to this second embodiment, in the similar way to the synchronization acquisition unit 5A in the first embodiment described above with reference to FIG. 4, a diffusion code generator 534 will be described below as a diffusion code generation unit for generating three different kinds of PN codes c(1), c(2), c(3) in an amount corresponding to one frequency (1023 chips) in exact timing all at once.

Figure 14:
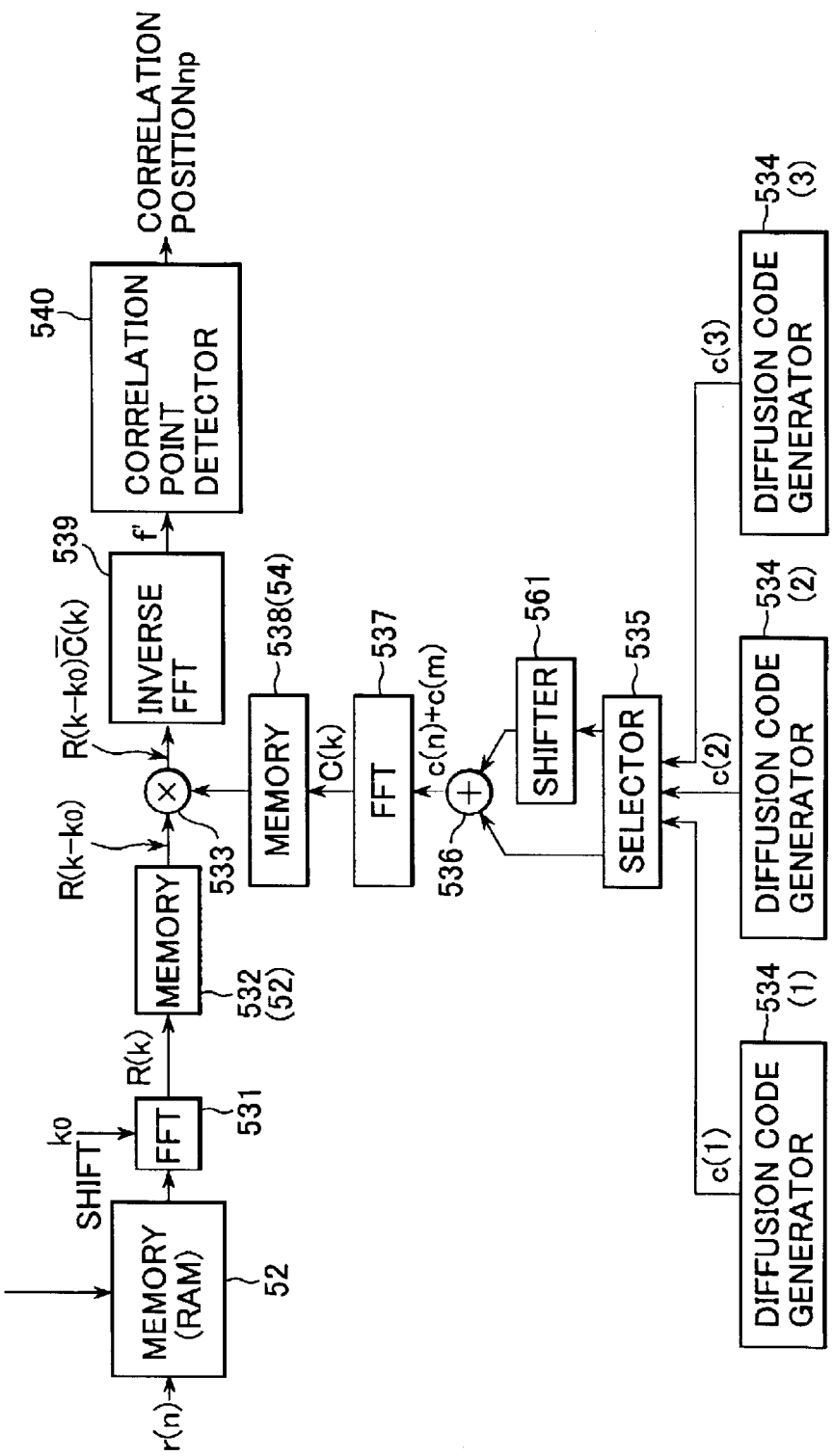
FIG. 14 is a block diagram for illustrating a configuration and a function of a synchronization acquisition unit according to a second embodiment.

FIG. 14 is a block diagram for illustrating a synchronization acquisition unit 5C of the GPS receiver according to the second embodiment. As shown in FIG. 14, the synchronization acquisition unit 5C of the GPS receiver according to this second embodiment is configured in the similar way to the synchronization acquisition unit 5A according to the first embodiment shown in FIG. 4 excluding that a shifter 561 is provided for deviating the phase of one PN code among two (two kinds of) PN codes to be provided to an adder 536. Therefore, the similar parts as those of the synchronization acquisition unit 5A according to the first embodiment shown in FIG. 1 are provided with the same reference numerals, and its explanation is herein omitted.

Then, the shifter 561 may deviate the phase of one P/N code between two PN codes generated in diffusion code generators 534(1), 534(2), 534(3), respectively, and selected in a selector 535 with respect to the phase of the other PN code by ¼ chip.

The adder 536 may add the PN code from the selector 535 to the PN code of which phase has been shifted by ¼ chip by means of the shifter 561. In this case, in the PN codes to be added in the adder 536, the phases thereof are shifted with each other by ¼ chip, so that it is possible to prevent the portions counteracted with each other from being generated by adding the PN code with each other.

Figure 15:
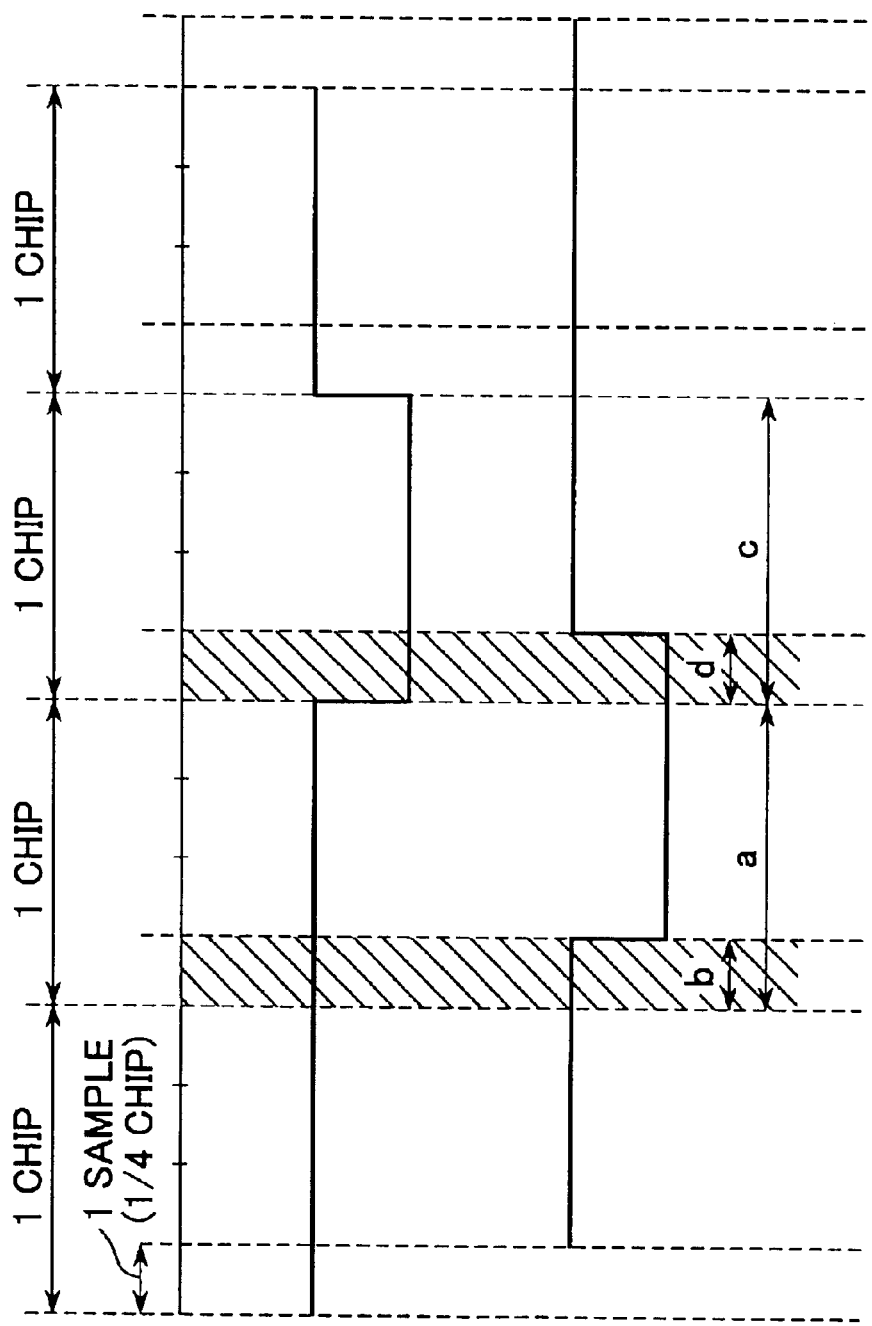
FIGS. 15A and 15B are a view for explaining the processing of the synchronization acquisition unit shown in FIG. 14.

FIGS. 15A and 15B are a view for explaining the addition of the PN codes having different phases. In this case, FIG. 15A shows a PN code 1 whose phase is not shifted, and FIG. 15B shows a PN code 2 whose phase is shifted by ¼ chip. In the case of adding the PN code 1 to the PN code 2, when the phase of the PN code 1 accords with that of the PN code 2, in a section b and a section d marked with diagonal lines in a chip section a and a chip section c to be counteracted with each other, it is possible to leave the components of the PN code 1 and the PN code 2.

The addition result of the PN code from the adder 536 is provided to a second FFT processor 537 to be FFT-processed here. The FFT processing result is provided to a memory 538 from the second FFT processor 537. After that, in a multiplier 533, the FFT processing result of the IF data from a memory 532 is multiplied by the FFT processing result of the added PN code from a memory 538, and this multiplication result is provided to an inverse FFT processor 539 to be inverse-FFT processed.

In this case, as described above with reference to FIG. 15, the added PN code is added with its phase shifted by ¼ chip, thereby, it is possible to minimize the portion where the PN codes to be added are counteracted with each other, and to detect the correlation point between the PN code in which the IF data is spectrum-diffuses and each of two added PN codes with high sensitivity and with rapidity, so that the phase synchronization of the C/A code is capable of being acquired.

According to this second embodiment, the shifter 561 of the synchronization acquisition unit 5C is described as it shifts the phase of the PN code provided thereto by ¼ chip. This is the same as a case that the number of samples per chip is four, and the phase is shifted by the chip worth one sample. However, the shift amount is not limited to ¼ chip. Assuming that the number of samples per chip is defined as N, the shift amount can be set in a range of 1/N to (N−1/N). In addition, after shifting the phase by integral multiple of one chip, the shift amount may be set in the range of 1/N to (N−1/N).

In addition, also according to this second embodiment, in the similar way to the case of the first embodiment, two (two kinds of) PN codes are added from among a plurality of PN codes to be used in any GPS satellite to be used for the detection processing of the correlation point in the synchronization acquisition unit. However, the present invention is limited to this case.

According to the above described example, the phases of the plural kinds of PN codes such as three kinds of PN code or four kinds of PN codes to be used in any GPS satellite may be added by shifting the phases by ¼ chip thereof to be used for the detection processing of the correlation point in the synchronization acquisition unit 5.

In addition, also according to this second embodiment, by changing a combination of the PN codes to be added and repeating the detection processing of the correlation point, it becomes possible to acquire the phase synchronization of the C/A codes from a plurality of GPS satellites in the small number of FFT processing. However, the present invention is not limited to this. For example, in a case that the n pieces of GPS satellites transmitting the GPS signal to be received are decided, the phase synchronization of the C/A code and the synchronization of the carrier frequency may be also acquired with respect to the signals from these n pieces of GPS satellites at the same time.

Figure 16:
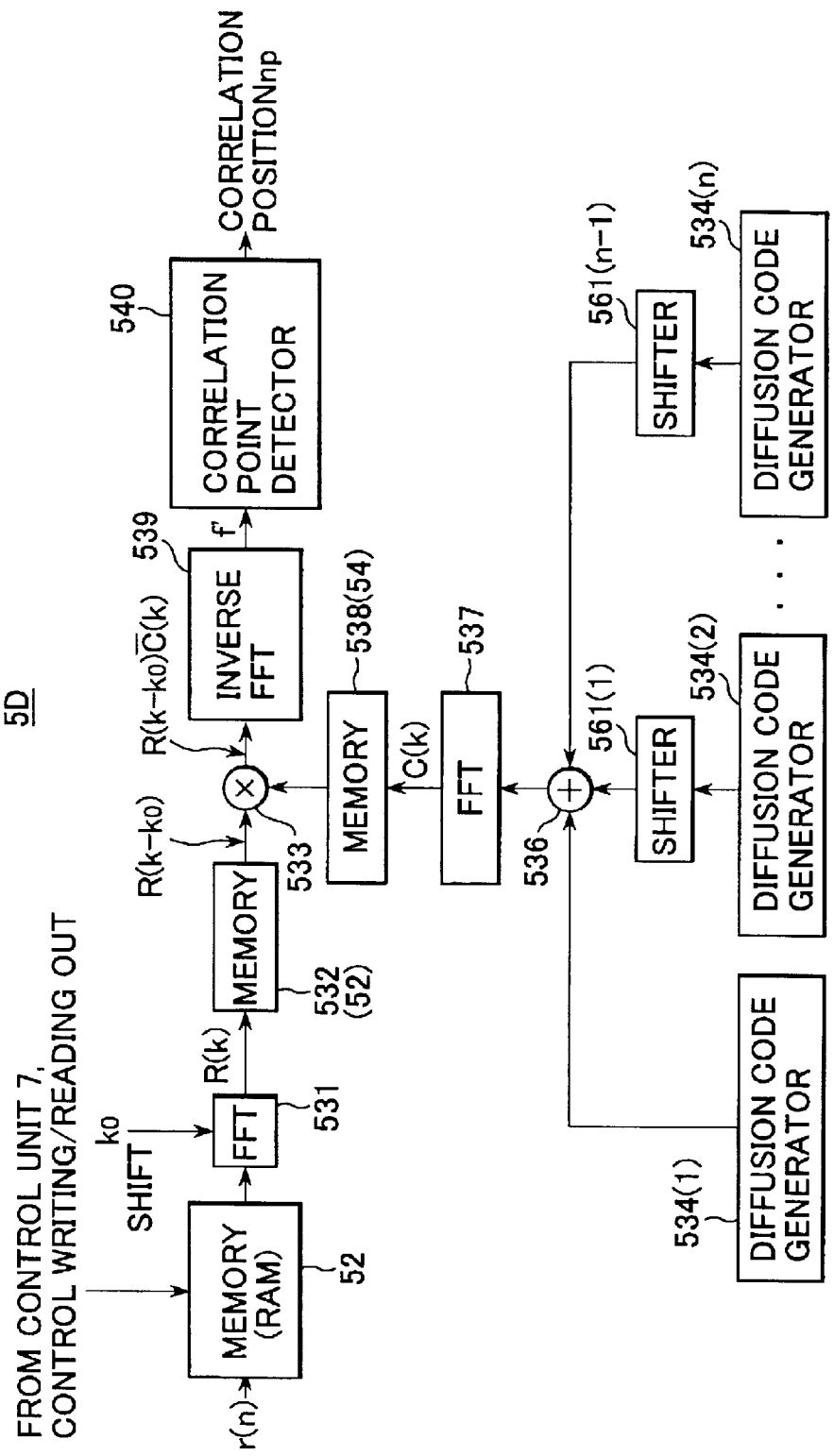
FIG. 16 is a block diagram for explaining another example of a configuration and a function of the synchronization acquisition unit according to the second embodiment.

FIG. 16 is a block diagram for explaining a configuration and the operation of a synchronization acquisition unit 5D of the GPS receiver according to this embodiment, whereby the phase synchronization of the C/A code and the synchronization of the carrier frequency can be acquired with respect to the GPS signals from the predetermined n pieces of GPS satellites at the same time.

As shown in FIG. 16, the synchronization acquisition unit 5D according to this embodiment includes n pieces of diffusion code generators 534(1), 534(2), . . . , 534(n) and it is configured in the similar way to the synchronization acquisition unit 5B shown in FIG. 13 excluding that the synchronization acquisition unit 5B can generate n kinds of PN codes at the same time, that it does not include a selector 535, and that it includes shifters 561(1) to 561(n−1) in response to each of diffusion signal generators 534(2) to 534(n) other than the first diffusion code generator 534(1).

This synchronization acquisition unit 5D shown in FIG. 16, without selecting the PN code to be added, adds all of the PN codes c(1), c(2), . . . , c(n) generated in the diffusion code generators 534(1), 534(2), . . . , 534(n), respectively, in an adder 536, however, prior to the addition, the synchronization acquisition unit 5D shifts each PN code by ¼ chip.

In other words, the synchronization acquisition unit 5D according to the present embodiment is configured so that there is a phase difference of ¼ chip between the different kinds of PN codes, for example, the phase of the PN code c(1) and the phase of the PN code c(2) are shifted by ¼ chip with each other, the phase of the PN code c(2) and the phase of the PN code c(3) are shifted by ¼ chip with each other, and the phase of the PN code c(3) and the phase of the PN code c(4) are shifted by ¼ chip with each other.

Then, in a multiplier 533, the FFT processing results of all addition result of the PN codes c(1), c(2), . . . , c(n) whose phases are shifted by ¼ chip, are multiplied by the FFT processing result of the IF data in the multiplier 533, so that, if n pieces of correlation points are detected after the inverse FFT processing, it results in synchronizing of all of the PN codes c(1), c(2), . . . , c(n) at once.

In this way, according to the single detection processing of the correlation point, it is possible to acquire the phase synchronization of the C/A code and the synchronization of the carrier frequency with respect to the GPS signals from a plurality of GPS satellites.

Incidentally, the number of kinds of the PN code to be added, namely, "n" is, for example, in the range from four to the number of all GPS satellites, and the number of kinds of the PN code to be added specifically corresponds to the number of the synchronization maintaining circuit 60 of the synchronization maintaining unit 6.

[Third Embodiment]

Figure 17:
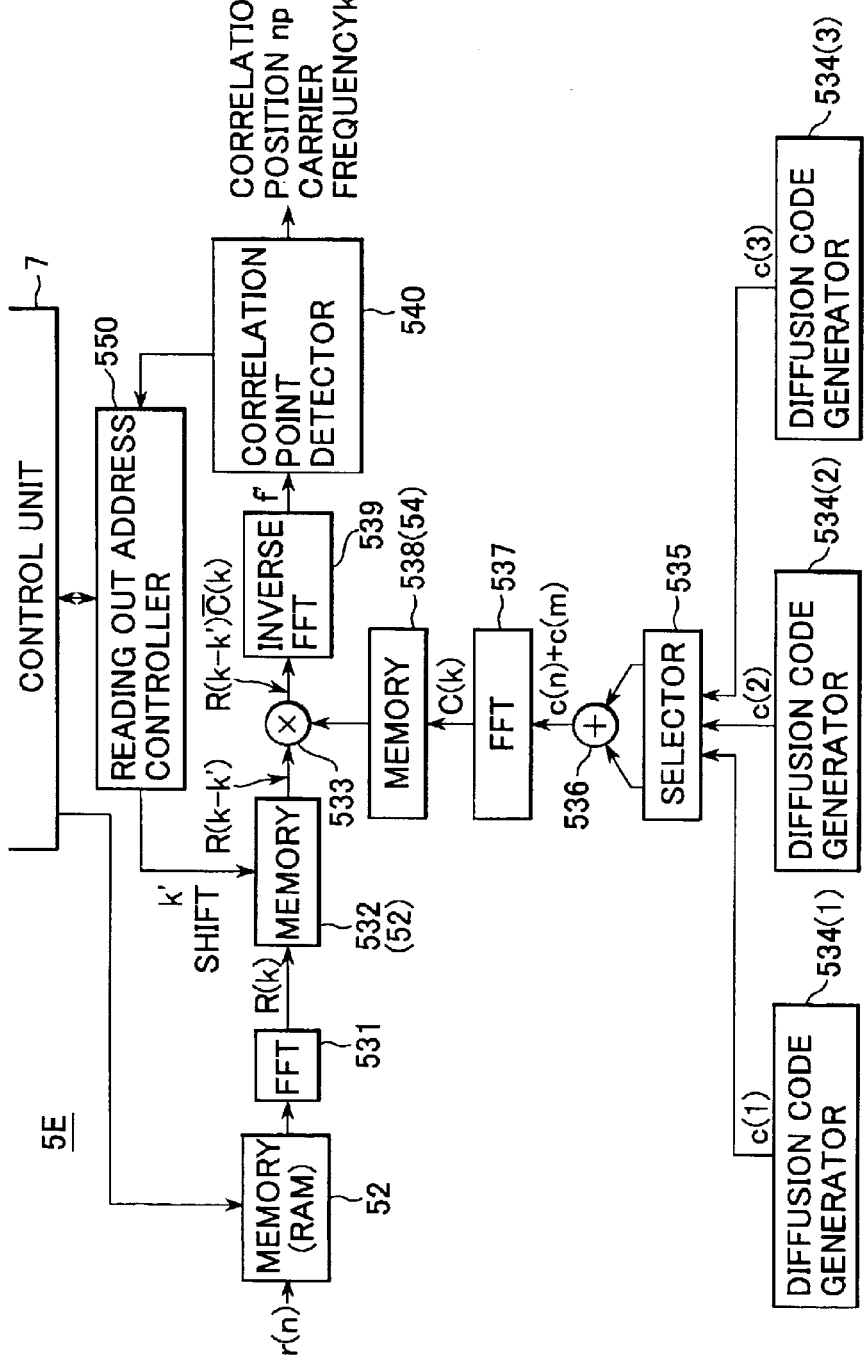
FIG. 17 is a block diagram for explaining a configuration and a function of a synchronization acquisition unit according to a third embodiment.

In the case of the above described first and second embodiments, in view of the Doppler shift amount, the carrier frequency of the received signal from the GPS satellite is not given. However, according to the other embodiment to be described below, the carrier frequency has not been known. FIG. 17 is a block diagram for explaining a specific configuration and the specific operation of a synchronization acquisition unit 5E according to this embodiment. In this FIG. 17, the similar parts to those of the synchronization acquisition unit 5A of the above described GPS receiver with reference to FIG. 4 are provided with the same reference numerals.

According to this embodiment, as shown in FIG. 17, the correlation detection output of a correlation point detector 540 is provided to a read out address controller 550. The read out address controller 550 controls the above described shift amount of a read out address (mainly, an estimated address decided from the past data) from a memory 532 of the FFT processing result of the received signal r(n) to be changed on the basis of the correlation detection output of the correlation point detector 540, so that a peak shown in FIG. 5 can be obtained in the correlation point detector 540. When the peak shown in FIG. 5 can be obtained in the correlation point detector 540, the read out address controller 550 stops the shift control of the read out address at the shift amount at that time.

A flow of the processing in the DSP 53 of the synchronization acquisition unit 5E will be explained with reference to flow charts shown in FIG. 18 and FIG. 19. The flow charts shown in FIG. 18 and FIG. 19 correspond to the software processing in the DSP 53.

At first, the IF signal (the received signal) which is converted into the digital signal by the A/D converter 45 of the frequency conversion unit 4 is taken into the memory (RAM) 52 as the signal r(n) (step S1). Then, this signal r(n) is provided with FFT by a first FFT processor 531, and its FFT processing result R(k) is written into the memory 532 (step S2). Then, the FFT processing result C(k) of the addition result of the predetermined two kinds of diffusion codes is set in a memory 538 (step S3).

In the next place, an initial value $k_0'$ of a shift amount of the read out address of the FFT processing result of the received signal r(n) from the memory 532 is decided on the basis of the past data (step S4). Then, this decided initial value $k_0'$ is set as a shift amount k' of the read out address of the FFT processing result from the memory 532, and at the same time, the changing number m of the shift control is set as an initial value m=0 (step S5).

In the next place, from the memory 532, the FFT processing result R(k) of the received signal r(n) is read out with the read out address shifted by k' (step S6). Then, a complex conjugate of the read out FFT processing result R(k−k') is multiplied by the complex conjugate of the FFT processing result C(k) of the diffusion code to obtain a correlation function F'(k) (step S7).

In the next place, a function f'(n) of a time area is obtained by performing the inverse FFT processing on this correlation function F'(k) (step S8). Then, a peak value f'(np) is obtained with respect to this function f'(n) (step S9) and it is determined whether or not this peak value f'(np) is larger than a predetermined threshold value fth (step S11).

As a result of the determination in the step S11, if the peak value f'(np) is smaller than the predetermined threshold value fth, the correlation point may not be detected, and it is determined whether or not the changing number of the shift control m is smaller than the predetermined maximum value $m_{max}$ (step S16). This maximum value $m_{max}$ corresponds to 1 kHz when it is converted into a frequency.

Then, when it is determined that the changing number of the shift control m is smaller than the predetermined maximum value $m_{max}$, the changing number of the shift control m is incremented by one (m=m+1) and, at the same time, a new shift amount k' is set to be $k'=k'+(-1)^m \times m$ (step S17). After that, the procedure returns to the step S6. Then, the above described processes on and after the step S6 will be repeated.

In addition, in the step S16, when the changing number of the shift control m is determined to be larger than the predetermined maximum value $m_{max}$, it is judged whether or not the re-fetch of the IF data by the predetermined number of times has been completed (step S18).

Figure 18:
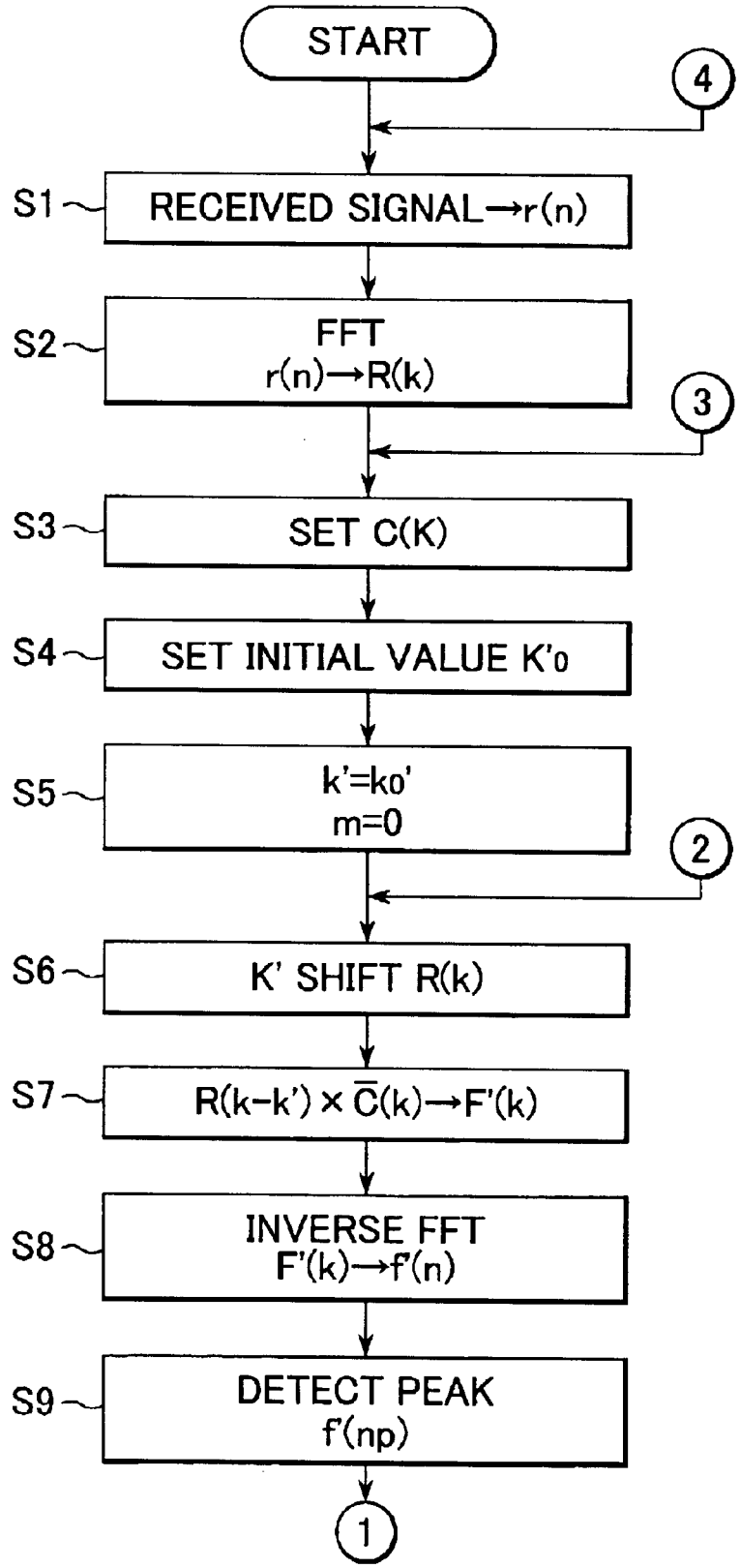
FIG. 18 is a partial flow chart for explaining an operation of a DSP having the function shown in FIG. 17.
Figure 19:
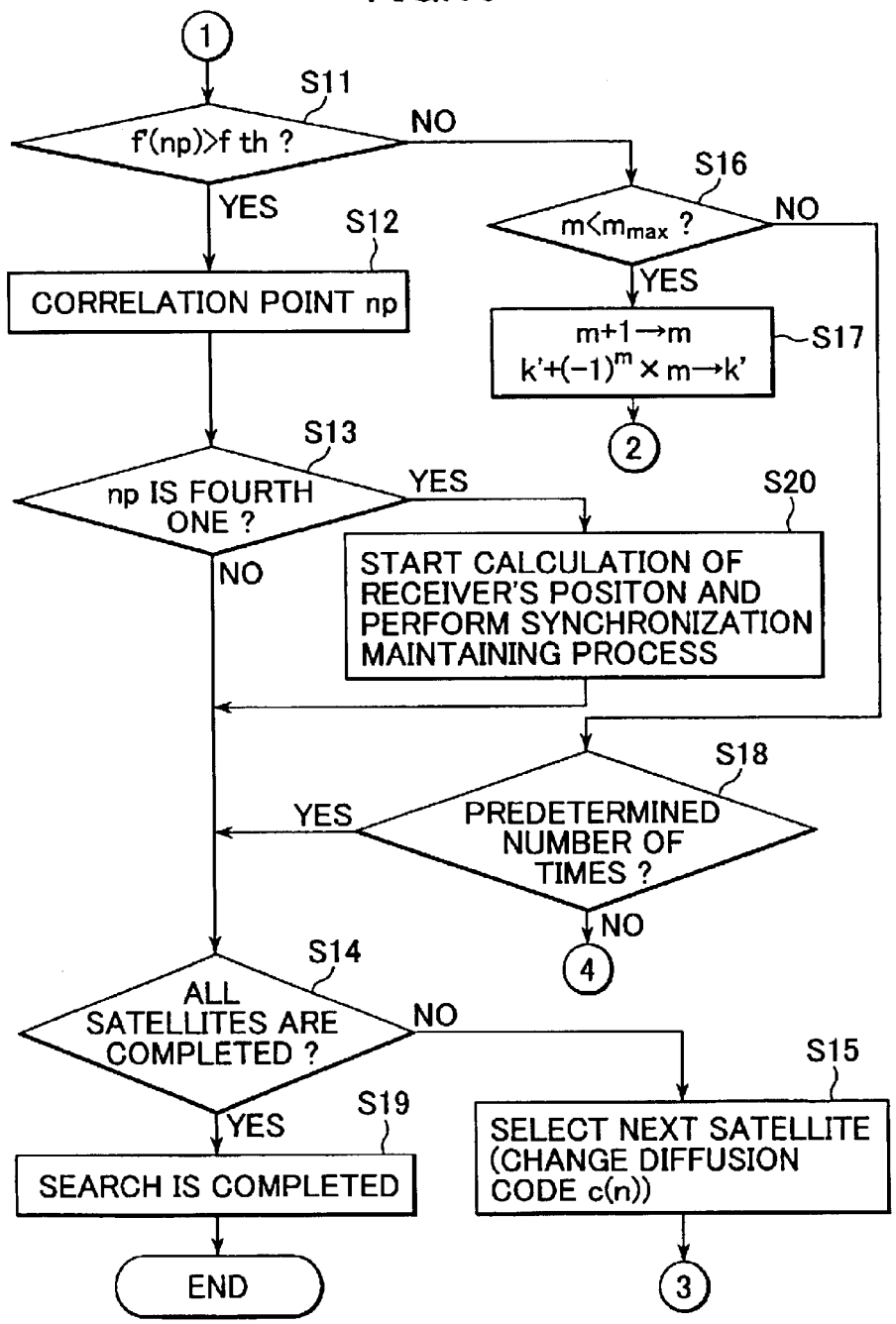
FIG. 19 is another partial flow chart for explaining the operation of the DSP having the function shown in FIG. 17.

In the step S18, when it is judged that re-fetch of the IF data corresponding the predetermined number of times has not been completed, the process goes back to the step S1 shown in FIG. 18, and newly re-fetching the IF data in the memory, the detection processing of the correlative value is repeated.

When it is judged that re-fetch of the IF data as the received signal has not been completed by the predetermined number of times in the step S18, the synchronization may not be acquired even by re-fetching the IF data and performing the detection of the correlation point with respect to the same added PN codes in plural times, so that it is determined whether or not the above described diffusion code synchronization search processing has been completed with respect to all satellites (step S14). Then, when it is determined that the diffusion code synchronization search processing has been completed with respect to all satellites, the search operation will be terminated (step S19).

In addition, in the step S14, when it is determined that there is a satellite, of which diffusion code synchronization search processing has not been completed, then, a combination of the satellites for performing the diffusion code synchronization search is selected, and an added PN code, in which the PN codes to be used by the satellites of the selected combination are added with each other, is obtained so as to change the PN code to be used (step S15). Then, returning to the step S3, the processes on and after above described step S3 are carried out.

In addition, in the step S11, if it is determined that the peak value f'(np) is larger than the predetermined threshold value fth, a discrete time (i.e., a phase of a diffusion code) np taking this peak value f' (np) is detected as a correlation point (step S12).

Then, whether or not the detected correlation point np is the fourth point is determined (step S13). If it is determined to be the fourth point, the receiver position calculation processing is started, and the synchronization maintaining processing is performed in a synchronization maintaining unit 6 (step S20). After that, the procedure will shift to step S14. The processing of the step S20 may be performed on and after the fourth point.

It is possible to estimate the Doppler shift amount with respect to the present receiving GPS satellite and the error of the oscillation frequency of the GPS receiver on the basis of the read out address shift amount k' when the correlation point np is obtained, which is detected in the step S12. In other words, it is possible to detect a carrier frequency of the received signal.

When the detected correlation point np is detected to be the fourth point in the step S13, it is determined whether or not the above described diffusion code synchronization search processing has been completed with respect to the all satellites (step S14). Then, when it is determined that the diffusion code synchronization search processing has been completed with respect to the all satellites, the search operation is ended (step S19).

In addition, in the step S14, when it is determined that there is a satellite whose diffusion code synchronization search processing has not been completed, then, a combination of the satellites for performing the diffusion code synchronization search is selected, and an added PN code, in which the PN codes to be used by the satellites of the selected combination are added with each other, is obtained so as to change the PN code to be used (step S15). Then, the process goes back to the step S3, the steps succeeding to the above described step S3 will be performed. Further, the above described signal output and the operation result are also shown in FIG. 17.

As described above, according to this example, even if the carrier frequency of the received signal from the GPS satellite is not known, by positively using the processing in the frequency area depending on the FFT and performing the synchronization detection of the carrier of the received signal and the diffusion code, it is possible to remove the carrier component. Accordingly, it is possible to detect the correlation point between the GPS received signal and the diffusion code by means of the digital matched filter by the use of the FFT at a high speed and with a simple configuration.

Further, also according to this example, by storing the diffusion code corresponding to each satellite, which has been FFT-processed in advance, in the memory, the FFT calculation of the diffusion code c(n) upon receiving the satellite signal may be omitted.

[Fourth Embodiment]

As described above, in the case of detecting the correlation point between the received signal and the diffusion code by the digital matched filter, a unit data length for detecting this correlation point is usually defined as one period length of the diffusion code.

However, in the received signal from the GPS satellite, as described above, one bit of the data is worth twenty frequencies of the diffusion code, and in this twenty frequencies, the diffusion codes have the same patterns. According to this fourth embodiment, depending on this characteristic, the unit data length for detecting the correlation point between the received signal and the diffusion code by the digital matched filter is defined as plural periods length of the diffusion code.

In this way, by performing the FFT calculation processing in units of plural periods of the diffusion code with respect to the received signal, the reception sensitivity has been improved, and compared to a method for accumulating and adding the signal in the same time area, the carrier frequency may be searched more simply. This fourth embodiment will be further described in detail below.

According to a prior example, a correlation point is detected with respect to the data corresponding to one period length, in which the accumulation and addition are carried out across the diffusion codes corresponding to the M periods (M is an integer of two or more), in the time area (for example, refer to a specification of U.S. Pat. No. 4,998,111 or "An Introduction to Snap Track™ Server-Aided GPS Technology, ION GPS-98 Proceedings").

Figure 20:
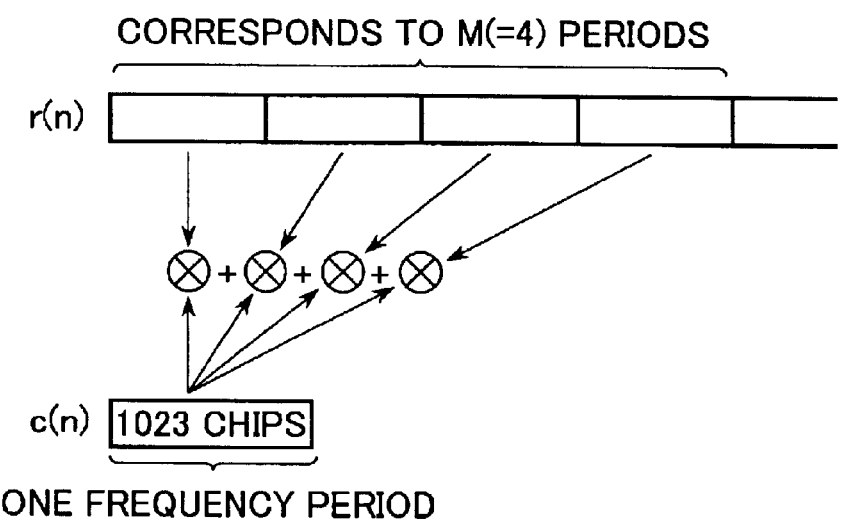
FIG. 20 is a view for explaining a synchronization acquisition processing of a synchronization acquisition unit according to a fourth embodiment.

In other words, as shown in FIG. 20, according to the method of the above prior example, with respect to the received signal r(n), the multiplication result with the diffusion code is accumulated and added across the diffusion codes corresponding to the M periods. According to the method of this prior example, by using a periodicity of the received signal from the GPS satellite and a statistical nature of a noise, C/N (carrier to noise ratio) is heightened, and the C/N is improved by M-times if the carrier of the received signal is synchronized with the diffusion code in advance. Accordingly, the reception sensitivity (the detection sensitivity of the correlation point) may be improved by M-times.

However, if the carrier of the received signal is not synchronized with the diffusion code, the M pieces of carriers whose phases are different are added and synthesized, and in a result of accumulation and addition thereof, a main GPS signal is balanced out, so that the correlation peak may not be detected.

Thus, in the case that the carrier frequency of the received signal is not given, it is necessary to search the carrier frequency, so that an inefficient operation such as the accumulation and addition for each frequency to be searched is obliged to be performed.

On the contrary, according to the examples above described with reference to FIG. 4 and FIG. 17, as described above, the carrier of the received signal may be synchronized with the diffusion code in the frequency area according to the simple method for shifting the reading out address of the FFT processing result from the memory. Therefore, it is possible to have the maximum effect of the accumulation and addition.

According to this example, similarly to the system that is described above with reference to FIG. 17, the carrier frequency is searched while the carrier frequency of the received signal from the GPS satellite remains as unknown. In this case, with respect to the received signal r(n), the FFT will be performed for each M periods of the diffusion code. Then, for each M periods of the diffusion code, the carrier frequency of the received signal is searched by controlling the shift amount of the reading out address of the FFT processing result of the received signal from the memory.

Since the data d(n) in the above described mathematical expression (3) shown in FIG. 8 takes a fixed value, namely, 1 or −1 in the M periods of the diffusion code assuming that $M \leq 20$, it can be ignored. Then, the mathematical expression (3) comes to be $r(n)=A \cdot c(n) \cos 2\pi n f_0 + n(n)$. If this is provided with discrete Fourier transform at the M period length, the number of the data becomes N×M (N is the number of data for one period of the diffusion code). Therefore, a relation between k after the discrete Fourier transform and a real frequency f becomes f=kfs/MN when $0 \leq k \leq MN/2$ may be established with respect to the sampling frequency fs, and it becomes f=(k−MN) fs/MN (f<0) when $MN/2 < k < MN$ is established with respect to the sampling frequency fs. As a result, a resolving power comes to be M-times thereof.

Figure 21:
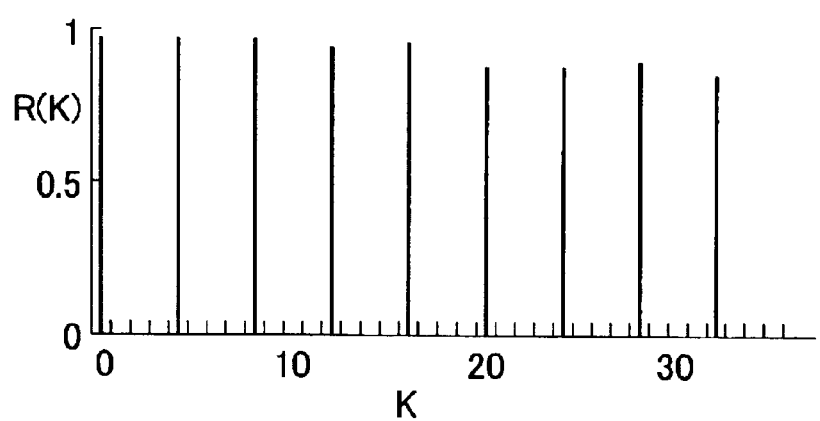
FIG. 21 is a view for explaining the synchronization acquisition processing of the synchronization acquisition unit according to the fourth embodiment.

However, the diffusion code c(n) is a period signal, and assuming that a time of one period length thereof is T (T=one millisecond in a C/A code of the GPS), there is no frequency component with an accuracy not more than f=1/T. Accordingly, the frequency component of the diffusion code c(n) in the FFT processing result R(K) after the discrete Fourier transform of the received signal r(n) (where, $0 \leq k < MN$) is concentrated every other M, namely, it may be concentrated on the N pieces of points among the MN pieces of data, and its amplitude increases by M-times as much as the same frequency component at one period length, since the data corresponding to the M periods is accumulated and added. FIG. 21 shows a spectrum example in a case of M=4.

According to the example shown in FIG. 21, the spectrums of the signal are found every other four, and there is no signal component between them. Except the N points, the frequency component of the diffusion code c(n) comes to be zero. On the other hand, a noise n(n) is an asynchronous signal in many cases, so that the energy is distributed in MN pieces of the all frequency components. Accordingly, in the sum of the N pieces of frequency components of the diffusion code c(n) in the FFT processing result R(k) of the received signal r(n), in the similar way to the accumulation and the addition in the time area, the C/N is improved by M-times.

If there is no carrier component $\cos 2\pi n f_0$, which is shown in the mathematical expression (3) shown in FIG. 8, in the received signal r(n), although the frequency component of the diffusion code c(n) in the FFT processing result R(k) is concentrated on k=i×M ($0 \leq i < N$), there is a carrier component. Therefore, according to this example, the read out address of the FFT processing result R(K) from the memory is shifted circularly by the amount $k_0$ of the carrier frequency component assuming that k=(i×M)−$k_0$ per each period of the diffusion code.

Figure 22:
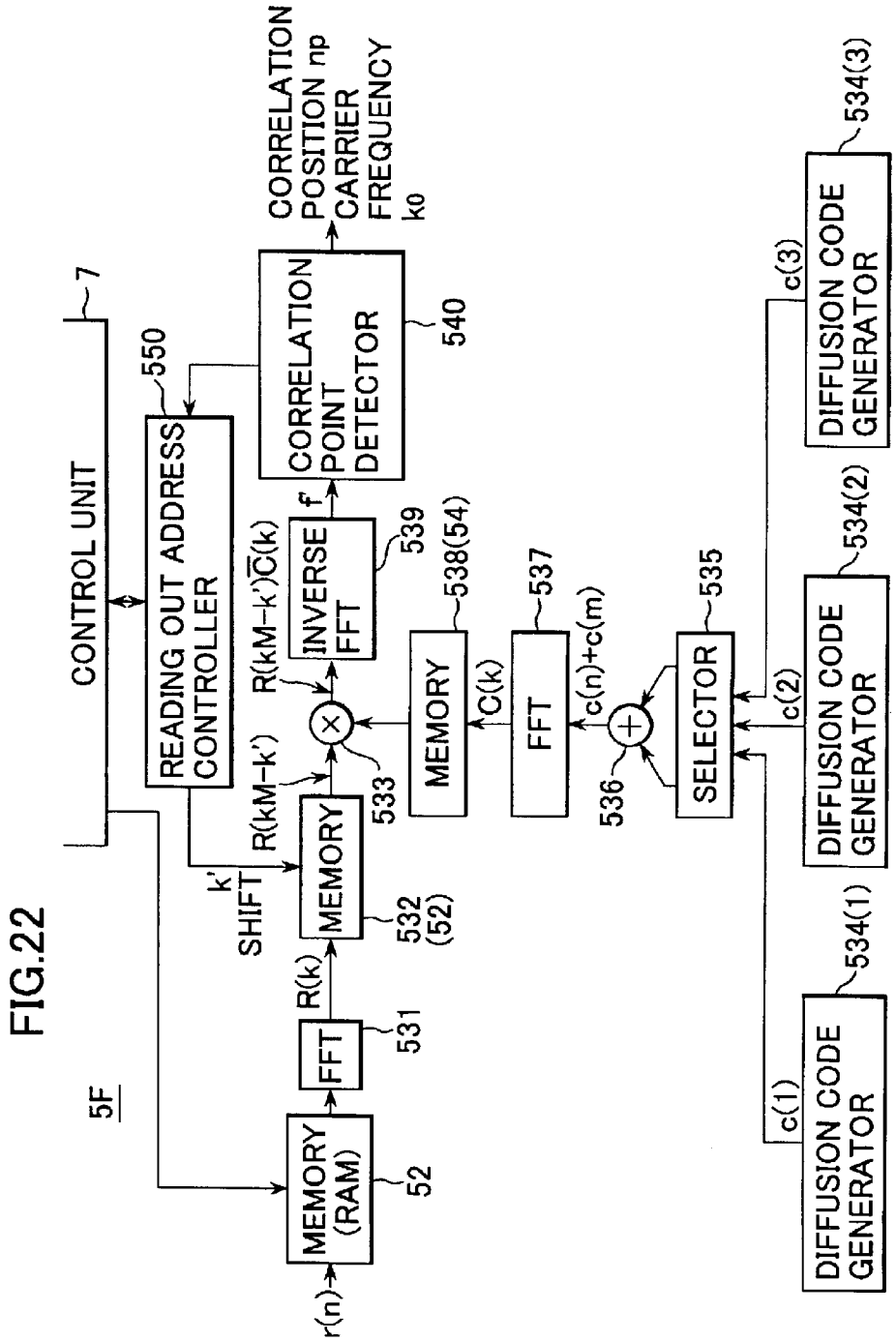
FIG. 22 is a block diagram for explaining a configuration and a function of the synchronization acquisition unit according to the fourth embodiment.
Figure 23:
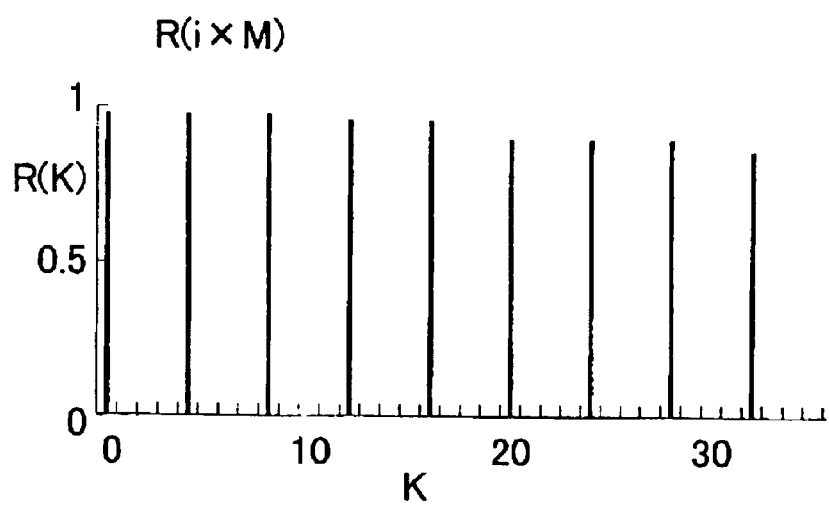
FIG. 23 is a view for explaining a synchronization acquisition processing of a synchronization acquisition unit according to a fifth embodiment.
Figure 24:
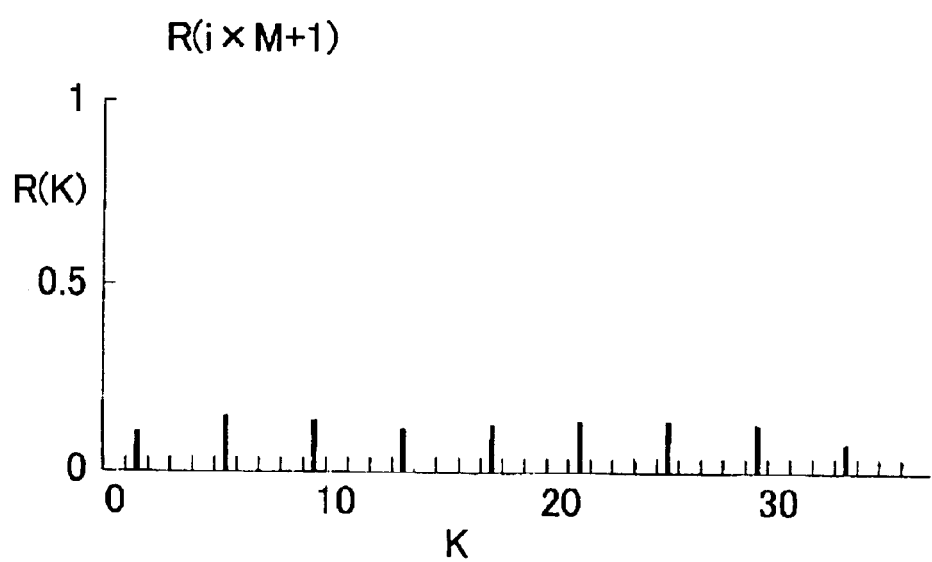
FIG. 24 is a view for explaining the synchronization acquisition processing of the synchronization acquisition unit according to the fifth embodiment.
Figure 25:
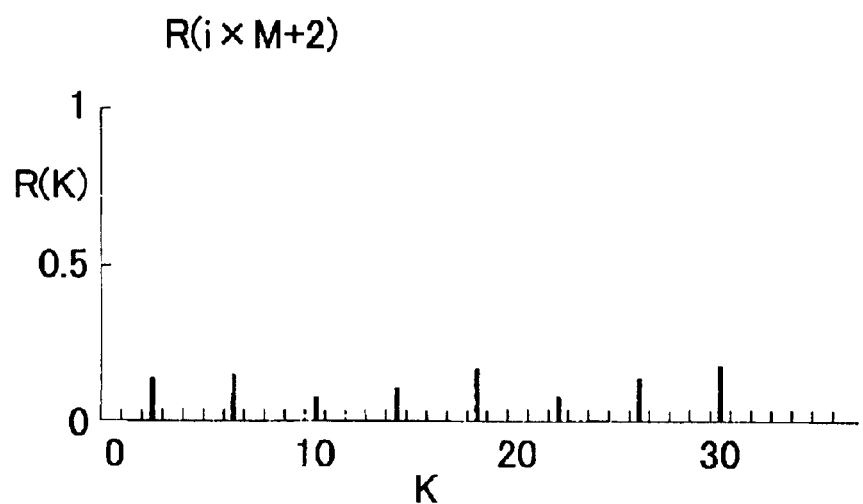
FIG. 25 is a view for explaining the synchronization acquisition processing of the synchronization acquisition unit according to the fifth embodiment.
Figure 26:
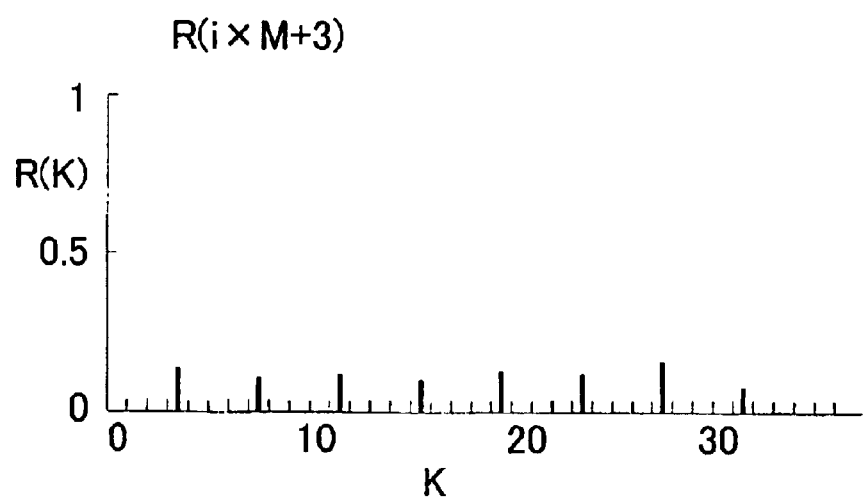
FIG. 26 is a view for explaining the synchronization acquisition processing of the synchronization acquisition unit according to the fifth embodiment.

Although the entire configuration of the above described example is identical to that shown in FIG. 17, FIG. 22 shows a constitutional view, in which the above described processing operation such that the IF data to be taken into the memory (RAM) 52 is worth M periods of the diffusion code is reflected on the inner configuration of the DSP 53. In FIG. 22, it is assumed that $0 \leq K < MK$, and $0 \leq k < N$.

In other words, from the FFT processing unit 531 of the synchronization acquisition unit 5F according to this fourth embodiment, the FFT processing result R(K) with the M periods of the diffusion code as the FFT operation processing unit is acquired to be written into the memory 532. Then, from this memory 532, the read out address is shifted and controlled, and the FFT processing result is read out and is provided to the multiplier 533. After that, this FFT processing result is multiplied by the FFT processing result of the diffusion code c(n) from the memory 538.

In the case of this example, a correlation function F(k) to be acquired from this multiplier 533 is defined as represented as the mathematical expression (8) in FIG. 8. Further, in the mathematical expression (8), a reference mark k denotes k in the complex conjugate of the FFT processing result C(k) of the diffusion code, and with respect to $k_0$, $f_0 = k_0 \cdot fs/MN$ is satisfied.

In this case, in FIG. 22, since the R(K) includes the diffusion codes of M periods, there are M pieces of peaks of the correlation function f′(n) to be acquired from the inverse FFT processor 539 within the range of $0 \leq n < MN$. However, only one peak in one period of the diffusion code is required in the detection of the correlation point, so that, is the similar way to the examples described with reference to FIG. 4 and FIG. 17, the calculation at the inverse FFT processor 539 is required only within the range of $0 \leq n < N$, and the calculation in $N \leq n < MN$ is not necessary.

As described above, according to this example, by increasing the FFT of the received signal r(n) by M-times as much as one period of the diffusion code, the detection sensibility of the correlation point may be improved, and this will result in improvement of the reception sensibility.

Further, also according to this example, by storing the diffusion code corresponding to each satellite, which has been FFT-processed in advance, in the memory, the FFT calculation of the diffusion code c(n) upon receiving the satellite signal may be omitted.

[Fifth Embodiment]

In the specific configuration and operation of the synchronization acquisition unit according to the above described fourth embodiment, by FFT-processing the received signal r(n) including the M periods (M>1) of the diffusion code, the search of the unknown carrier is enabled, and at the same time, the reception sensibility may be improved. However, the number of data samples increases from N in a case of one period of the diffusion code to MN, which is M-times as much as N, so that the calculation time of the FFT and the capacity of the memory 532 shown in FIG. 22 may increase. In this fifth embodiment, a problem of this memory capacity may be solved.

As shown in the example shown in FIG. 21, since the frequency components in the FFT processing result R(K) when the M periods of the diffusion code (M>1) is defined as unit of FFT processing are found every other M, the components between these frequency components every other M are not necessary.

In this case, the FFT processing results R(K) (where, $0 \leq K < MN$) are divined into M groups such as R (i×M), R(i×M+1), R(i×M+2), . . . , R (i×M+M−1), ($0 \leq i < N$). The examples of a divided spectrum in respective groups are shown in FIG. 23 to FIG. 26 in a case of dividing them into four groups (M=4). Although the carrier frequency is not known, one group among M groups has energy of the GPS signal that is a target for detecting the correlation. According to the examples shown in FIG. 23 to FIG. 26, it is shown that the frequency component of the received signal r(n) is included in the R (i×M) group in FIG. 23, and it is shown that only a noise is present in the other three divided spectrums.

Further, in an actual signal, the carrier frequency $k_0$ is not equal to k' for certain. Therefore, assuming that $k_0$ exists between $k_0$' and $k_0$'+1, the correlation may be detected both in k'=$k_0$' and k'=$k_0$'+1, and the correlation becomes larger as k' is closer to $k_0$.

In the case of dividing the FFT processing results R(K) into the M groups as described above, if M is a power of 2, on the basis of the nature of the FFT calculation procedure, each group may be calculated independently.

Figure 27:
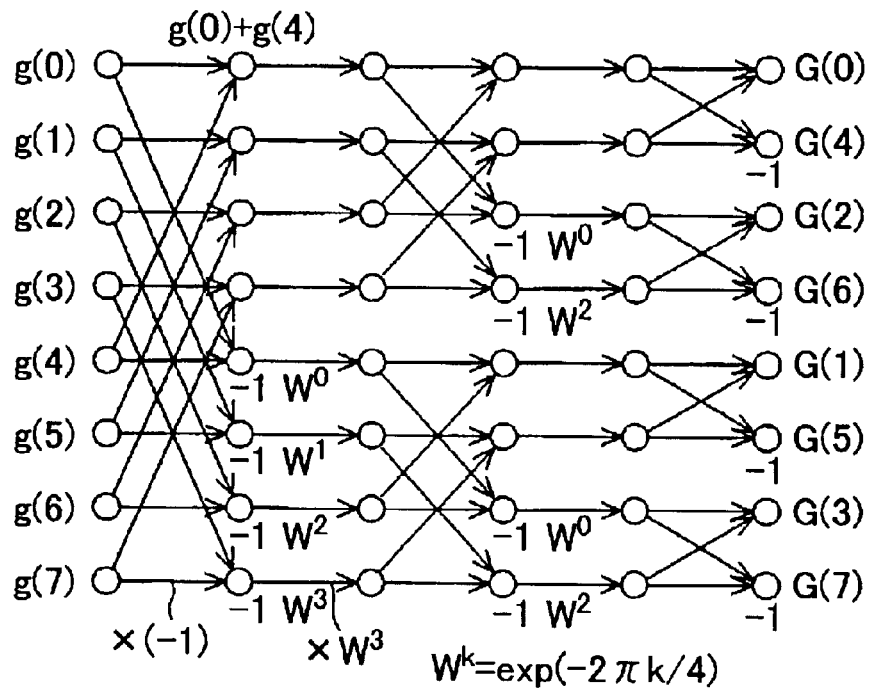
FIG. 27 is a view for explaining a substantial part of the synchronization acquisition processing performed in a DSP of the synchronization acquisition unit according to the fifth embodiment.
Figure 28:
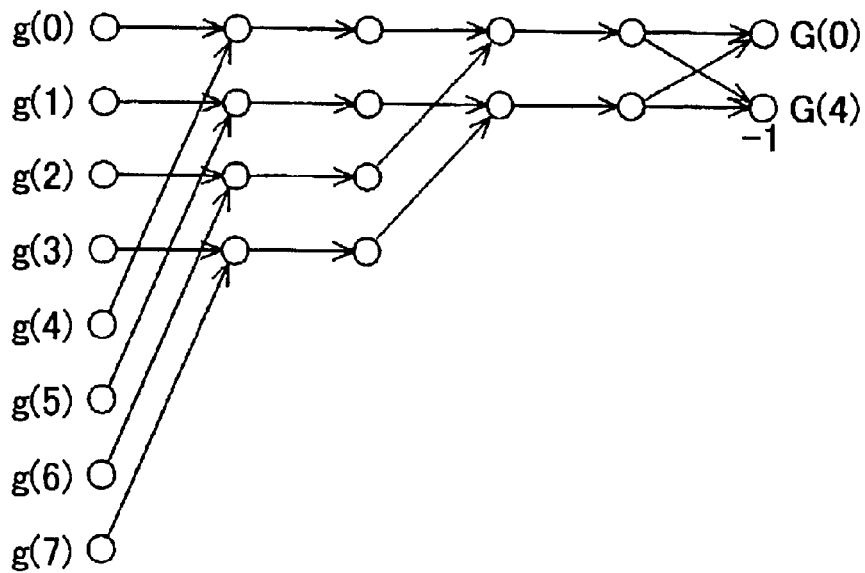
FIG. 28 is a view for explaining the substantial part of the synchronization acquisition processing performed in the DSP of the synchronization acquisition unit according to the fifth embodiment.

FIG. 27 is a flow chart of a signal in the FFT calculation of eight data g(0) to g(7). If the FFT processing results G(K) shown in FIG. 27 are divided into the data every other four, they may be divided into four groups, namely, (G(0), G(4)), (G(1), G(5)), (G(2), G(6)), and (G(3), G(7)). Taking particular note of (G(0), G(4)) among these groups, it is found that the calculation in the portion shown in FIG. 28 is only required. Further, this calculation figure also applies to the other groups, namely, (G(1), G(5)), (G(2), G(6)), and (G(3), G(7)).

Upon checking these four groups of data, at first, (G(0), G(4)) is calculated. Then, when the check is over, releasing the memory having stored therein (G(0), G(4)), the procedure will proceed to a next group. By performing the operation such that (G(1), G(5)), (G(2), G(6)), and (G(3), G(7)) are sequentially calculated, and when the check is over, the memory is released, compared to obtaining the FFT as calculating G(0) to G(7) together, the memory capacity may be decreased by ¼. The number of multiplication in the case of dividing the FFT processing results G(K) into M groups comes to be the same as the case of performing the FFT calculation across the full FFT processing results G(K).

By making M a power of 2, the same case as the above described example can be applied to R(i×M), R(i×M+1), R(i×M+2), ..., R(i×M+M−1), and as the capacity of the memory having stored therein the FFT processing result, 1/M of MN, namely, N is only needed. In addition, upon detecting the correlation in the order of R(i×M), R(i×M+1), R(i×M+2), ..., R(i×M+M−1), if the correlation point can be detected in one group in the middle of the detection, it becomes unnecessary to check the remaining groups. Therefore, it can be expected that the processing time becomes shorter than a case of detecting the correlation as entirely FFT-processing the received signal for each M period of the diffusion code.

Figure 29:
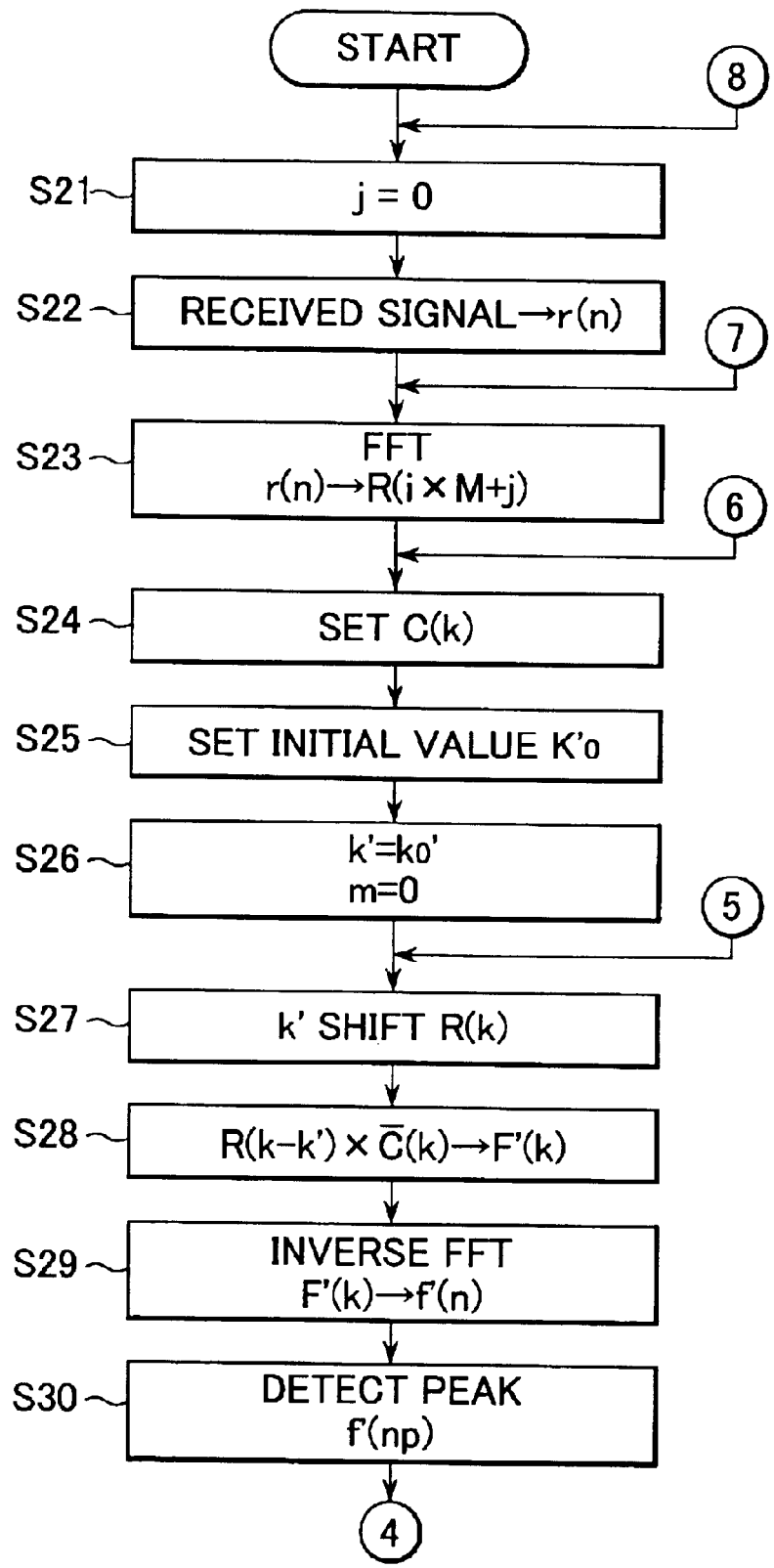
FIG. 29 is a partial flow chart for explaining an operation in the DSP of the synchronization acquisition unit according to the fifth embodiment.
Figure 30:
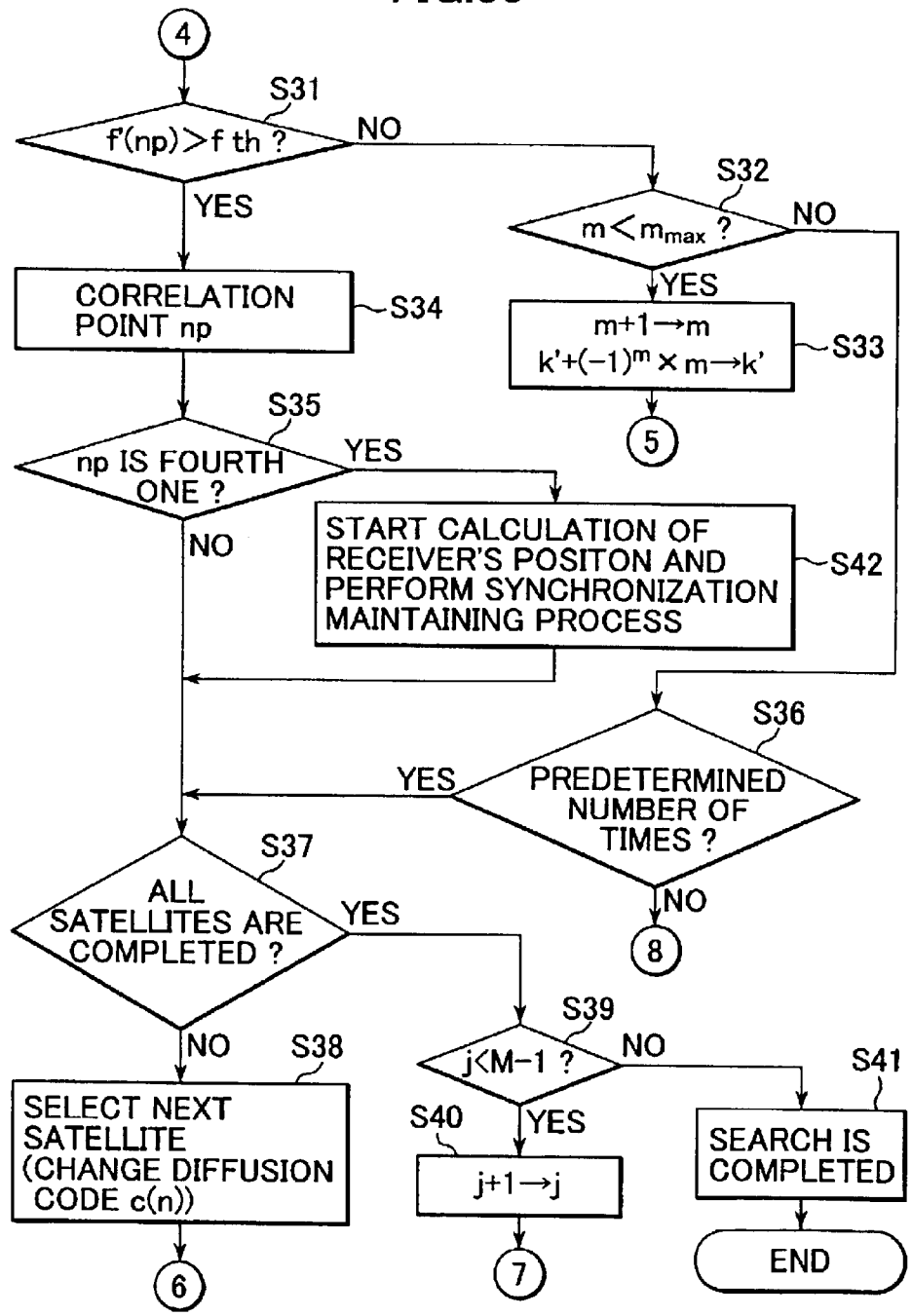
FIG. 30 is another partial flow chart for explaining the operation in the DSP of the synchronization acquisition unit according to the fifth embodiment.

Flow charts of the diffusion code and the carrier synchronization in the case of the above described example are shown in FIG. 29 and FIG. 30. According to the examples shown in FIG. 29 and FIG. 39, in order to make the number of FFT minimum, upon searching the carrier frequency, the correlation detection is performed with respect to all satellites of the target for each group of FFT. Further, these flow charts shown in FIG. 29 and FIG. 30 corresponds to the software processing in the DSP 53 of the synchronization acquisition unit 5.

At first, a variable j ($0 \leq j \leq M$) is initialized with respect to the number of divided groups of R(K) (where, $0 \leq K < NM$ and k=i×M+j) (step S21), and then, the received signal, which is converted into a digital signal by the A/D converter 45 of the frequency conversion unit 4, is taken into the memory (RAM) 52 as the signal r(n) (where, $0 \leq n \leq NM$) (step S22). After that, this signal r(n) is FFT-processed by the FFT processing unit 531, and its FFT processing result R(K) (where, K=i×M+j) is written into the memory 532 (step S23). Then, the FFT processing result C(k) of an addition result of the diffusion code corresponding to a target GPS satellite is set in the memory 538 (step S24).

In the next place, the initial value $k_0'$ of the shift amount of the read out address from the memory 532 of the FFT processing result R(K) of the received signal r(n) is decided, for example, on the basis of the past data (step S25). Then, the decided initial value $k_0'$ is set as the shift amount k' of the reading address of the FFT processing result from the memory 532, and at the same time, the changing number of the shift control m is set as the initial value m=0 (step S26).

In the next place, from the memory 532, the FFT processing result R(K) of the received signal r(n) is read out after shifting its read out address by an amount of k' (step S27). Then, by multiplying the read out FFT processing result R(k−k') by the complex conjugate of the FFT processing result c(k) of the diffusion code, a correlation function F'(k) is obtained (step S28).

Further, by performing the inverse FFT of this correlation function F'(k), a function f'(n) in a time area is obtained (step S29). Then, with respect to this function f'(n), a peak value f'(np) is obtained (step S30), and it is determined whether or not this peak value f'(np) is larger than a predetermined threshold value fth (step S31).

As a result of the determination in the step S31, if the peak value f'(np) is smaller than the predetermined threshold value fth, it is considered that the correlation point can not be detected, and whether or not the changing number m of the shift control is smaller than a predetermined maximum value $m_{max}$ (step S32) is determined. Then, when the changing number m of the shift control is determined to be smaller than the predetermined maximum value $m_{max}$, the changing number m of the shift control is incremented by 1 (m=m+1), and at the same time, defining a new shift amount k' to be $k'=k'+(-1)^m \times m$ (step S33), the procedure will return to the step S27. Then, the above described processes succeeding to the step S27 will be repeated.

In addition, in the step S32, when the changing number m of the shift control is determined to be larger than the predetermined maximum value $m_{max}$, whether or not this number m that is determined to be larger than the predetermined maximum value $m_{max}$ is not less than a predetermined number of times with respect to the data of the current RAM 52 is determined (step S36). Then, if it is smaller than the predetermined number of times, returning to the step S21, new data is taken into the RAM 52 and the above described processing is repeated.

In addition, when the number m that is determined to be larger than the predetermined maximum value $m_{max}$ is not less than the predetermined number of times, whether or not the above described diffusion code synchronization search processing has been ended with respect to the all satellites is determined (step S37). Then, when it is determined that the diffusion code synchronization search processing has been ended with respect to the all satellites, it is determined whether or not the variable j is smaller than M−1 (step S39). When it is smaller than M−1, the variable j is incremented (step S40), and after that, the process returns to the step S23, and the processes on and after this step S23 are repeated.

In addition, in the step S39, when the variable j is determined to be equal to M−1 or to be larger than M−1, the search operation comes to an end (step S41).

In addition, in the step S37, when it is determined that there is a satellite whose diffusion code synchronization search is not finished yet, a satellite to be provided with the diffusion code synchronization search is selected, and the diffusion code is changed to the diffusion code c(n) to be used by the selected satellite (step S38). In other words, a combination of the diffusion codes to be added is changed. Then, the process goes back to the step S24, the above described steps on and after the step S24 are executed.

In addition, in the step S31, when the peak value f'(np) is determined to be larger than the predetermined threshold value fth, a discrete time (a phase of the diffusion code) taking this peak value f'(np) is detected as a correlation point (step S34).

Then, determining whether or not the detected correlation point np is the fourth point (step S35). When it is determined to be the fourth point, the CPU 41 will start the receiver's position calculation processing and will perform the synchronization maintaining process in the synchronization maintaining unit 6 (step S42). After that, the process goes to step S37. The processing in step S42 may be performed on and after the fourth point.

Further, it is possible to estimate a Doppler shift amount with respect to the present receiving GPS satellite and an error of the oscillation frequency of the GPS receiver on the basis of the shift amount k' when the correlation point np, which has been detected in the step S34, is obtained.

When it is determined that the detected correlation point np is the fourth point in the step S35, the process proceeds to the step S37, the above described steps succeeding to the step S37 are repeated.

In a case that the carrier frequency has been already known as the case described with reference to FIG. 4, by calculating only the appropriate one from among R(i×M), R(i×M+1), R(i×M+2), ..., R(i×M+M−1), a method for FFT-processing the received signal with a time including many periods of the diffusion code as a unit can be applied in the similar way.

Thus, performing the calculation method according to this fifth embodiment in the synchronization acquisition units 5A, 5B, 5C, 5D, 5E, and 5F of the GPS receiver according to the above described first to fourth embodiments, it is possible to reduce the memory capacity and to perform the synchronization acquisition processing effectively.

While a sliding correlator as a conventional method requires time in principle, in the synchronization acquisition methods of the diffusion code of the GPS receiver and the carrier according to the five examples of the above described first to fifth embodiments, it is expected that the processing time is largely shortened by using a high speed DSP or the like.

In addition, in the above description, the third, fourth, and fifth embodiments are explained as applying the synchronization acquisition units of the GPS receiver according to the third, fourth, and fifth embodiments to the synchronization acquisition unit 5A of the GPS receiver according to the first embodiment. However, the present invention is not limited to this. It is a matter of course that the function of the synchronization acquisition units of the GPS receiver according to the above described third, fourth and fifth embodiment can be installed in the synchronization acquisition unit 5C of the GPS receiver according to the above described second embodiment.

[Sixth Embodiment]

According to the above described first to fifth embodiments, in order to acquire the synchronization of the carrier frequency and the phase synchronization of the C/A code with rapidity, plural kinds of PN codes are generated by the GPS receiver at the same time, and by adding these plural kinds of PN codes, the FFT processing for acquiring the synchronization is performed.

However, in a case that reception sensibility of a signal from the GPS satellite is not good due to an effect by a weather condition and a receiving environment, by acquiring the synchronization of the carrier frequency and the synchronization of the C/A code by means of each of PN codes that are different for each GPS satellite individually, it may be possible to acquire the synchronization of the carrier frequency and the synchronization of the C/A code quickly and certainly.

In this case, the FFT processing result of the IF data as the received signal is multiplied by the FFT processing result of the PN codes that are different for each GPS satellite. Then, the synchronization acquisition processing for detecting the correlation by inverse-FFT processing this multiplication result may be performed as changing the PN code sequentially without changing the IF data being the received signal. However, it is useless to perform the FFT processing with respect to the same IF data whenever the PN code is changed.

Therefore, according to this sixth embodiment, the synchronization of the carrier frequency and the synchronization of the C/A code are acquired for each of the diffusion codes that are different for each GPS satellite. However, it is possible to perform the synchronization acquisition processing quickly by promoting the efficiency of the synchronization acquisition processing.

In addition, in the synchronization acquisition unit to be described later, the parts similar to those of the synchronization acquisition unit 5 according to the above described first embodiment are provided with the same reference numerals, and its detail explanation is herein omitted. Further, in order to simplify the explanation, in the embodiment to be described below, a case such that the synchronization is acquired with respect to each of three kinds of PN code is taken as an example.

Figure 31:
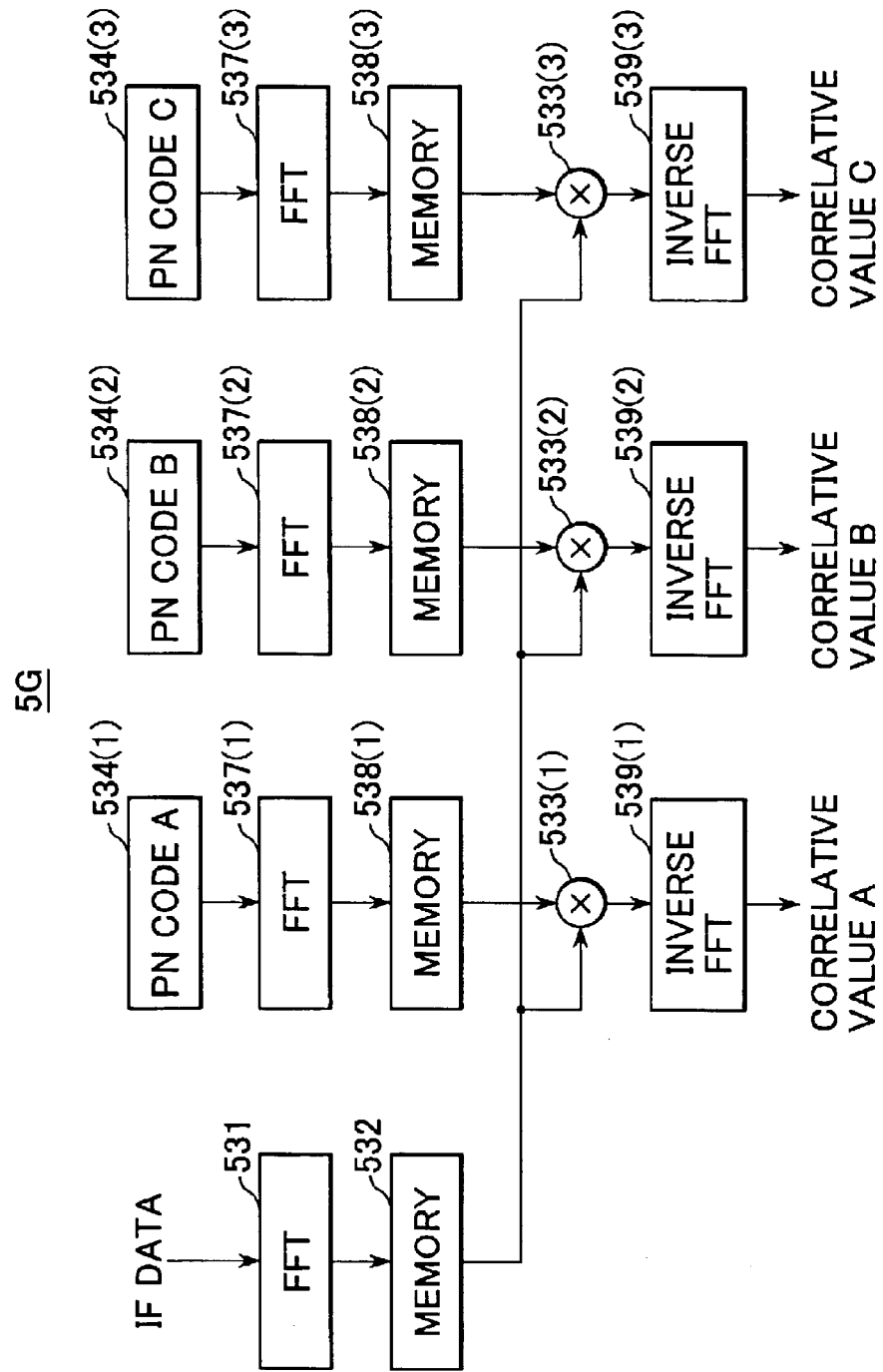
FIG. 31 is a block diagram for explaining a configuration and a function of a synchronization acquisition unit according to a sixth embodiment.

FIG. 31 is a block diagram for explaining a configuration and the operation of a synchronization acquisition unit 5G of the GPS receiver according to this sixth embodiment. As shown in FIG. 31, the synchronization acquisition unit 5G according to this sixth embodiment is provided with diffusion code generators 534(1), 534(2), and 534(3) for generating three kinds of PN codes, namely, A, B, and C, of which code patterns are different from each other.

Then, FFT processors 537(1), 537(2), and 537(3), memories 538(1), 538(2), and 538(3), multipliers 533(1), 533(2), and 533(3), and inverse FFT processors 539(1), 539(2), and 539(3) are provided corresponding to the diffusion code generators 534(1), 534(2), and 534(2).

Then, by using each of PN codes A, B, and C, the synchronization of the carrier frequency and the phase synchronization of the C/A code are acquired in parallel with respect to the IF data. At this time, the FFT processor 531 FFT-processes the IF data being the received signal, and the processed IF data is held in the memory 532. Then, this IF data held in the memory 532 is supplied to each of the multipliers 533(1), 533(2), and 533(3) to be commonly used in the synchronization acquisition processing that uses each of the PN codes A, B, and C.

Hereby, each of the different PN codes A, B, and C is required to be FFT-processed separately and be stored in the memory. However, if the IF data has been FFT-processed once, this FFT processing result can be used in the synchronization acquisition processing using any one of the different PN codes. Accordingly, the IF data is only required to be FFT-processed once with respect to a plurality of PN codes. Then, as shown in FIG. 31, the synchronization acquisition processing with a plurality of PN codes can be performed in parallel quickly with respect to each of these plural PN codes.

Figure 32:
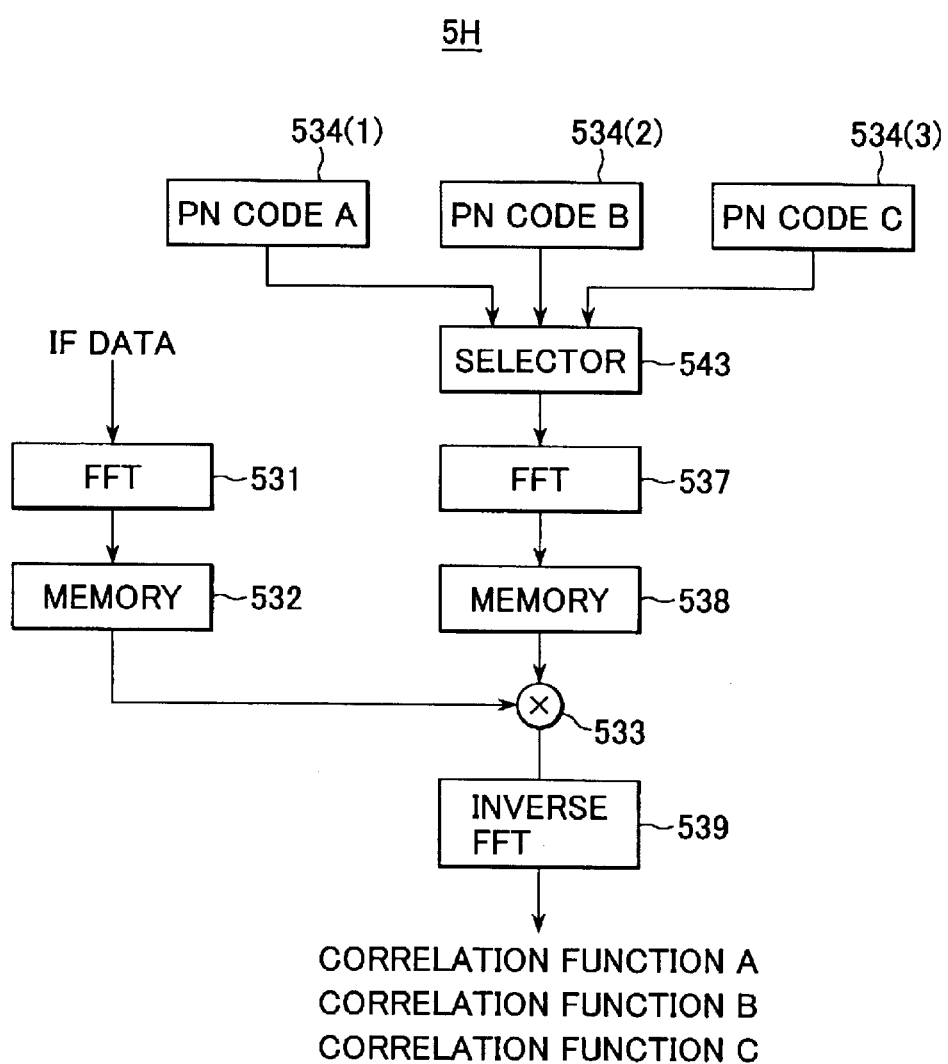
FIG. 32 is a block diagram for explaining another example of the configuration and the function of the synchronization acquisition unit according to the sixth embodiment.

In addition, in a case that the DSP to realize a main function of the synchronization acquisition unit is high, it is also possible to configure a synchronization acquisition unit 5H as shown in FIG. 32. The synchronization acquisition unit 5H shown in FIG. 32 has three diffusion code generators 534(1), 534(2), and 534(3) for generating the PN codes having the different code patterns. However, it has a single FFT processor 537 for a PN code, a single memory 538 for storing the FFT processing result of the PN code, and a single multiplier 533, singly.

Further, a selector 543 is provided between respective diffusion code generators 534(1), 534(2), and 534(3) and the FFT processor 537. This selector 543 selects from which diffusion code generator the PN code should be supplied to the FFT processor 537.

The PN code generated from the diffusion code generator, which is selected by the selector 543 from among the diffusion code generator 534(1), 534(2), and 534(3), is supplied to the FFT processor 537. Then, the FFT processor performs the FFT-process on the PN code supplied thereto and stores a result in the memory 538.

The FFT processing result of the PN code stored in the memory 538 is sequentially read out and supplied to the multiplier 533 to be multiplied by the FFT processing result of the IF data stored in the memory 532. Then, this multiplication result is supplied to an inverse FFT processor 539, and then, is provided with the inverse-FFT operation so as to detect the correlation value. Accordingly, it is determined whether or not the synchronization of the carrier frequency and the phase synchronization of the C/A code are acquired.

After that, by selecting the PN codes from the different diffusion code generators to repeat the above described processing, the selector 543 is capable of detecting which PN code to be generated by the present GPS receiver is synchronized with the carrier frequency of the IF data and the PN code.

If a processing power of the DSP of the synchronization acquisition unit is high so as to perform the FFT at a high speed, the synchronization acquisition unit 5H as shown in FIG. 32 may realize the same function as that of the synchronization acquisition unit shown in FIG. 31.

In addition, in the case of the synchronization acquisition units 5G, 5H shown in FIG. 31 and FIG. 32, in order to simplify the explanation, a case of using the three kinds of diffusion codes is taken as an example. However, the present invention is not limited to this. It is possible to use plural kinds of PN codes (one kind or more).

In addition, by applying the above described first embodiment to this sixth embodiment and performing FFT-operation with respect to the addition of the PN codes having the different code patterns, it is also possible to acquire the synchronization of the carrier frequency and the phase synchronization of the PN code with respect to a plurality of PN codes at the same time.

Figure 33:
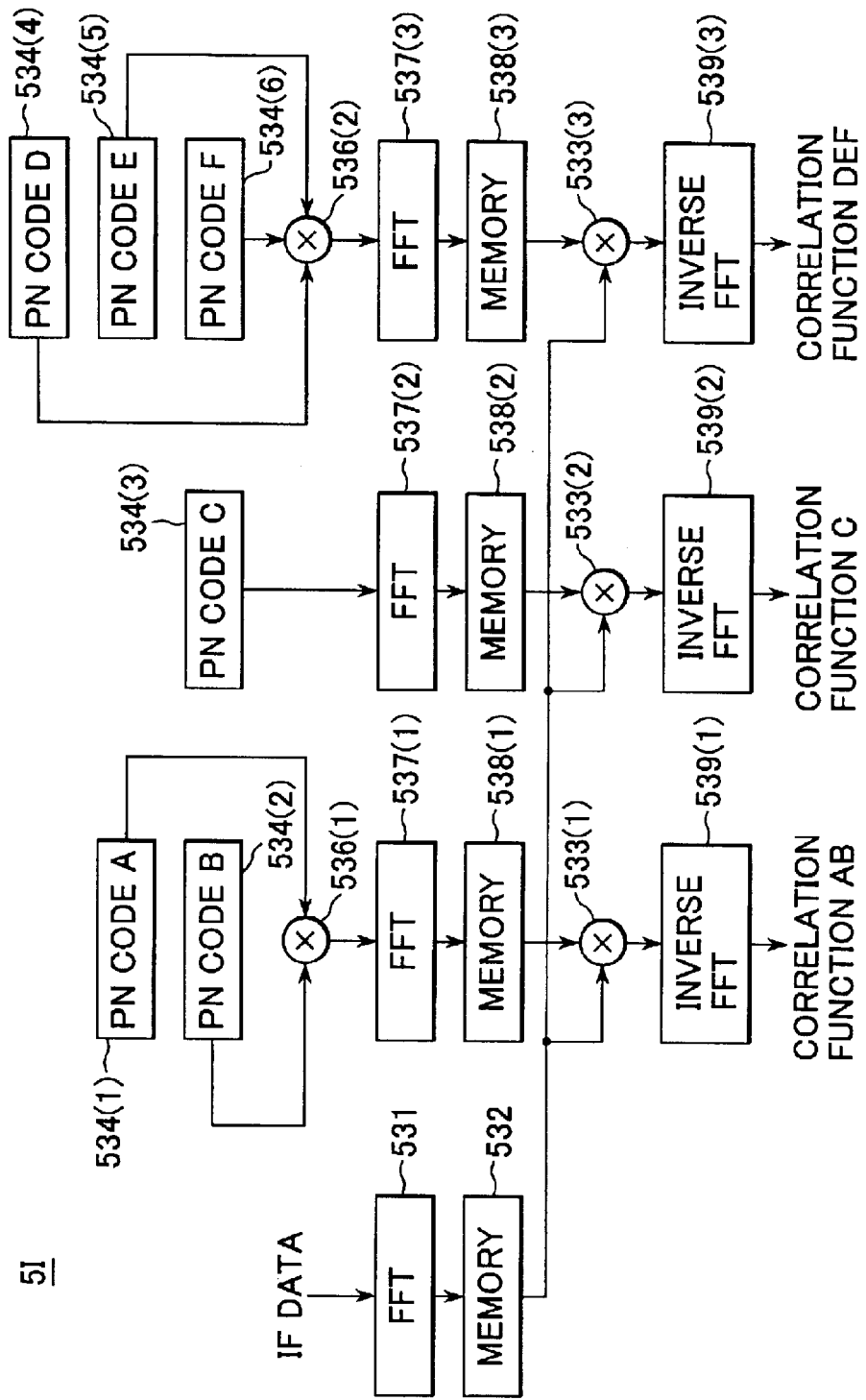
FIG. 33 is a block diagram for explaining still another example of the configuration and the function of the synchronization acquisition unit according to the sixth embodiment.

FIG. 33 is a block diagram for explaining a synchronization acquisition unit 5I that is configured so as to apply the concept of the synchronization acquisition unit according to the first embodiment to the synchronization acquisition unit shown in FIG. 31. As shown in FIG. 33, the synchronization acquisition unit 5I according to this example includes six diffusion code generators 534(1) to 534(6).

Then, the synchronization acquisition units 5I shown in FIG. 33 is provided with an adder 536(1) for adding the PN code A from the diffusion code generator 534(1) and the PN code B from the diffusion code generator 534(2), and an adder 536(2) for adding the PN code D from the diffusion code generator 534(4), the PN code E from the diffusion code generator 534(5) and the PN code F from the diffusion code generator 534(6).

Respective parts other than these diffusion code generators 534(1) to 534(6), and the addition units 536(1) and 536(2) are configured in the similar way to the corresponding parts of the synchronization acquisition units 5G shown in FIG. 31.

Further, in the case of the example shown in FIG. 33, by multiplying the FFT processing result of the addition result of the PN code A and the PN code B by the FFT processing result of the IF data by means of the multipliers 533(1), it is detected whether or not the synchronization of the carrier frequency and the phase the synchronization of the PN code are acquired with respect to the IF data for both of the PN code A and the PN code B at the same time.

In addition, by multiplying the FFT processing result of the PN code C by the FFT processing result of the IF data by means of the multiplier 533(2), it is detected whether or not the synchronization of the carrier frequency and the phase the synchronization of the PN code are acquired for the IF data by using the PN code C.

Further, by multiplying the FFT processing result of the addition result of the PN code D, the PN code E, and the PN code F by the FFT processing result of the IF data by means of the multiplier 533(3), it is detected whether or not the synchronization of the carrier frequency and the phase the synchronization of the PN code are acquired with respect to the IF data for three PN codes, namely, the PN code D, the PN code E, and the PN code F at the same time.

By detecting which PN code is synchronized with the carrier frequency of the IF data and the PN code of the C/A code on the basis of these detection results, it is possible to control the synchronization maintaining unit 6 by using this detection result.

In addition, in the case of the example shown in FIG. 33, a case that the FFT operations of the diffusion code are performed in parallel. However, as shown in FIG. 32, even in the case that the FFT operations of the diffusion code are sequentially performed, by performing the FFT operations of the diffusion code with respect to the addition result of a plurality of PN codes, it is possible to realize the same function as that of the synchronization acquisition unit 5I shown in FIG. 33.

Also in the case of the example shown in FIG. 33, the present invention is not limited to a case of using the six kinds of diffusion codes. It is possible to apply the present invention to a case of using plural kinds of, that is, one or more kinds of PN codes. There may be various cases depending on the number of the PN codes to be added and combinations. In addition, by taking various information such as the synchronization acquisition result or the like in consideration, it is possible to control the number of the PN codes to be added and combinations so as to be appropriately changed.

In addition, also in the case of the synchronization acquisition units 5G, 5H, 5I shown in FIG. 31, FIG. 32, and FIG. 33 respectively, by storing the diffusion codes corresponding to respective satellites, which have been FFT-processed in advance, in the memory, or, by storing the addition result of the target plural PN codes, which have been FFT-processed in advance, in the memory, the FFT calculation of the diffusion code upon receiving the satellite signal may be omitted. In other words, the FFT calculation is required to be performed only for the IF data, so that, the processing of the synchronization acquisition unit is simplified, and it is possible to perform the synchronization acquisition processing quickly.

In the explanations of the above described first to sixth embodiments, the present invention is applied to the case of the received signal from the GPS satellite. However, the present invention is not limited to the signal from the GPS satellite. The present invention may be applied to all cases of acquiring the synchronization of the diffusion code of the received signal whose carrier frequency is modulated by the signal, in which the data is spectrum-diffused by the diffusion code, and the synchronization of the carrier wave.

[Seventh Embodiment]

According to the above described first to sixth embodiments, the synchronization acquisition processing at the synchronization acquisition unit 5 is performed faster without increasing the storage capacity of the memory. However, unless the positioning operation is performed with a high degree of accuracy by using the navigation data with a higher degree of accuracy in addition to the faster synchronization acquisition processing, an advantage of speeding up of the synchronization acquisition processing can not be utilized sufficiently. Therefore, the GPS receiver according to this seventh embodiment selects and uses the navigation data that is extracted with a higher degree of accuracy, so as to perform the positioning operation with a high degree of accuracy.

The GPS receiver according to this seventh embodiment is configured in the similar way to the GPS receiver according to the above described first to sixth embodiments. In other words, the GPS receiver according to this seventh embodiment is also entirely configured as shown in FIG. 1, and the detailed particulars of respective parts are as described in the above described embodiments. Therefore, with reference to the drawings employed in the above described embodiments according to need, the GPS receiver according to this seventh embodiment will be described below.

As described above, the GPS receiver according to this seventh embodiment is configured similarly to the GPS receiver according to the above described embodiments. However, the CPU 71 of the control unit 7, which is configured as shown in FIG. 12 monitors the correlative value from each of the synchronization maintaining circuit 60(1) to 60(n) of the synchronization maintaining unit 6, which is configured as described with reference to FIG. 9 and FIG. 10. In accordance with a result of the monitoring, the navigation message, which is demodulated from the GPS signals having the higher levels of the correlative value (P), for example, four GPS signals, is selected and used.

In other words, as shown in FIG. 9, the synchronization maintaining unit 6 is provided with a plurality of synchronization maintaining circuits 60(1) to 60(n). On the basis of the acquisition result of the synchronization acquisition unit, the synchronization maintaining unit 6 draws in the synchronization of the carrier frequency and the phase synchronization of the C/A code with respect to the signal from a plurality of GPS satellites not less than four, for example, the signal from eight GPS satellites, to maintain them so as to acquire the navigation message.

Then, the CPU 71 of the control unit 7 monitors the correlative value (P) to be outputted from respective synchronization maintaining circuits 60(1) to 60(n) between the PN code of the C/A code and the prompt PN code P generated in the GPS receiver so as to use the navigation message to be outputted from the upper four or more synchronization maintaining circuits having a large correlative value (P) for the positioning calculation. Thereby, it is possible to perform the positioning calculation with a high degree of accuracy.

Figure 34:
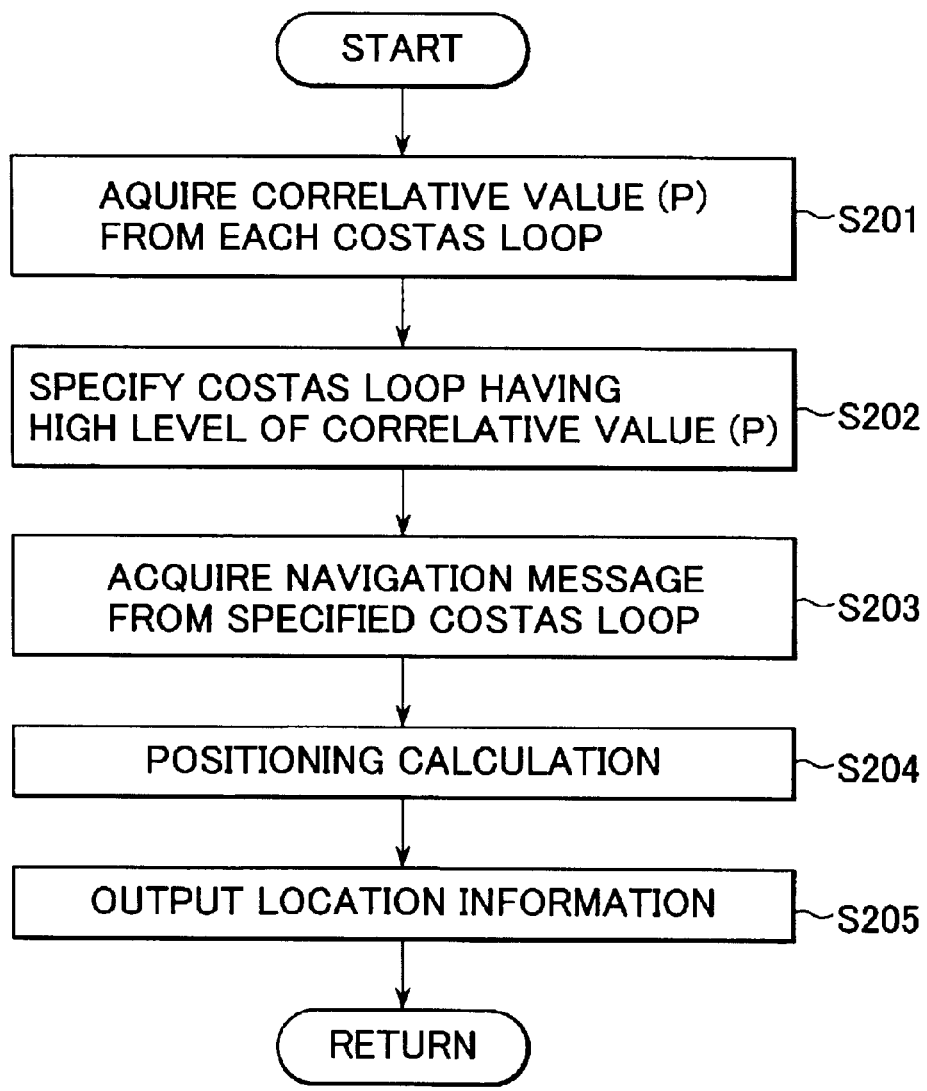
FIG. 34 is a flow chart for explaining the operation of a control unit of a GPS receiver according to a seventh embodiment.
Figure 35:
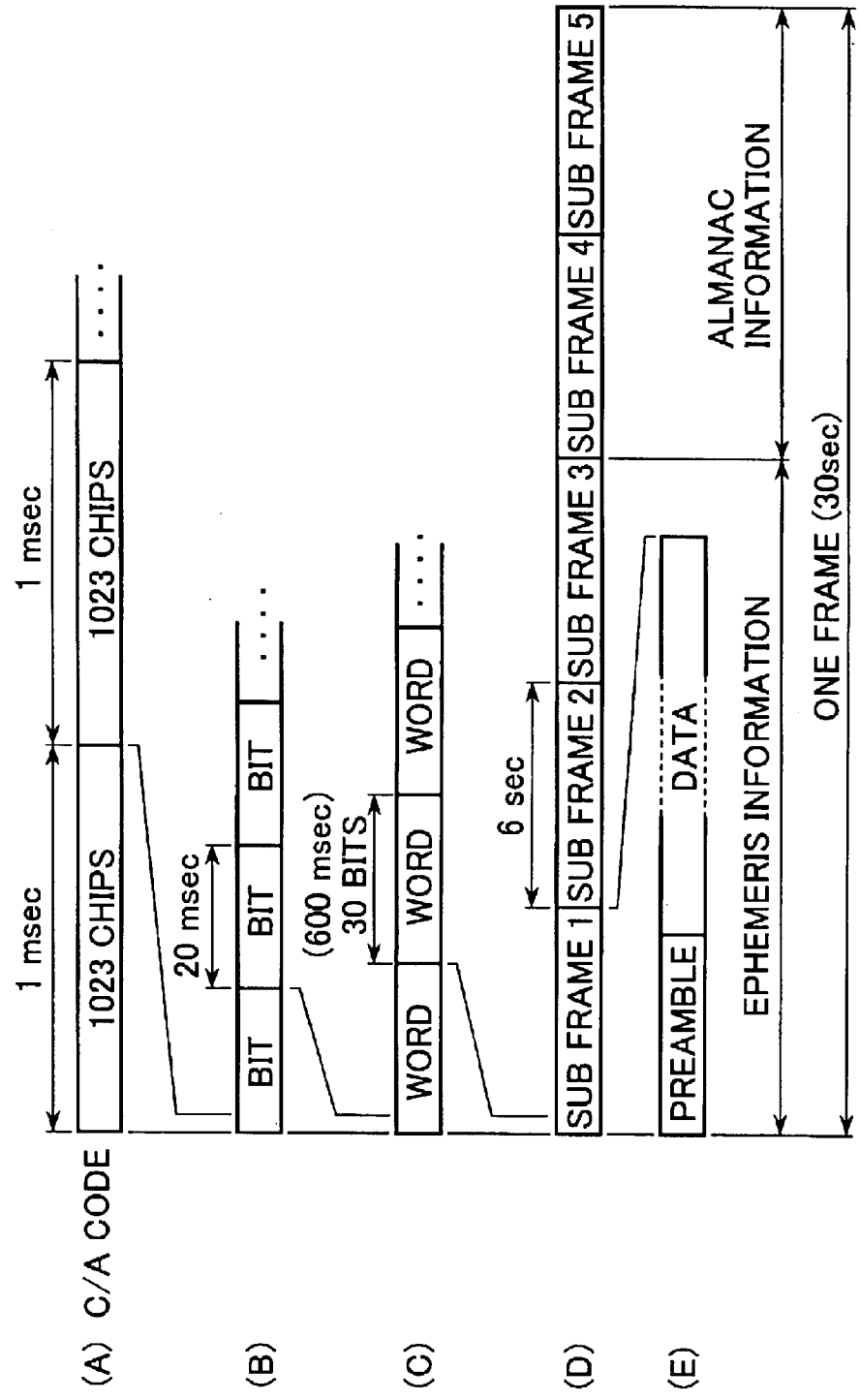
FIG. 35 is a view for showing a configuration of a signal from a GPS satellite.
Figure 36:
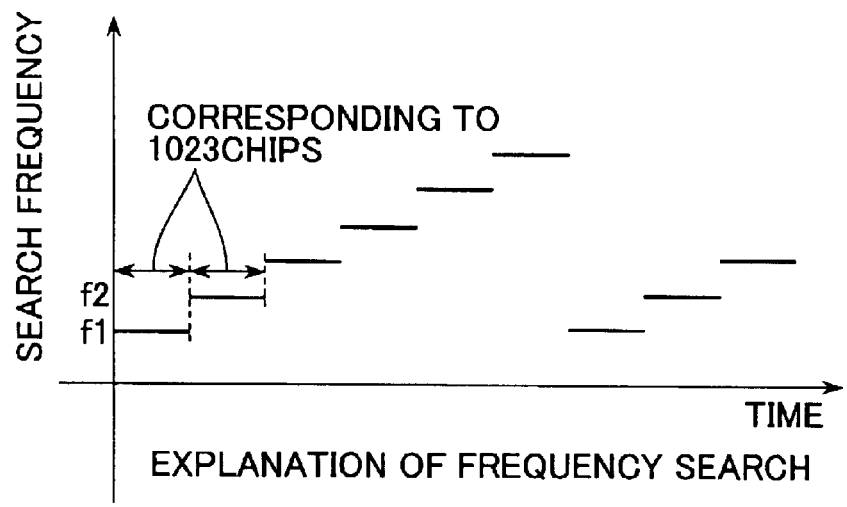
FIG. 36 is a view for explaining a conventional synchronization processing of a carrier frequency and a diffusion code.
Figure 37:
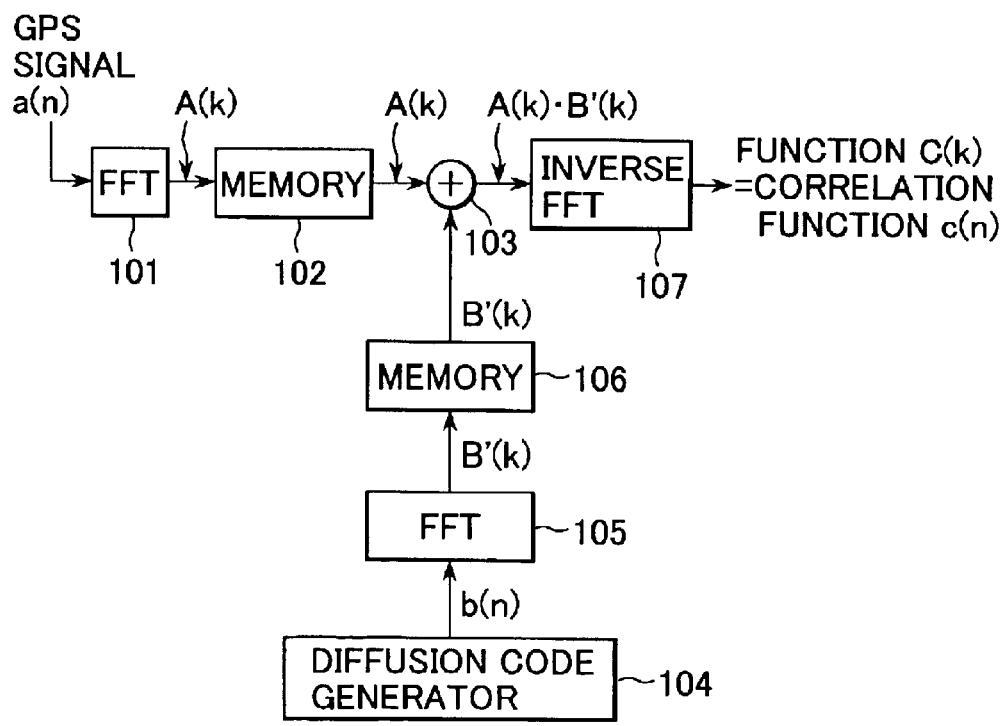
FIG. 37 is a block diagram for showing a constitutional example of a synchronization acquisition circuit, which is configured as a matched filter.

FIG. 34 is a flow chart for explaining the operation to be performed in a control unit 71 of a GPS receiver according to this seventh embodiment. As described with reference to FIG. 10, obtaining a prompt correlative value (P) to be outputted from each costas loop 61 of respective synchronization maintaining circuits 60(1) to 60(n) (step S201), and specifying four or more costas loops having a high correlative value (level) (P) (step S202), the navigation message, which is demodulated by the specified four costas loop, is acquired (step S203).

Then, by performing the positioning calculation by means of the navigation message from four GPS satellites obtained in the step S203 (step S204), as shown in FIG. 1, the location information showing a location of the positioned present GPS receiver is outputted via a host I/O terminal 11 (step S205).

It can be said that the navigation message from the costas loop of the synchronization maintaining circuit showing a high correlative value (P) comprises the accurate data having a small error, which is provided with the inverse spectrum diffusion with a high degree of accuracy to be demodulated. Therefore, by performing the positioning calculation by means of this accurate navigation message, it is possible to obtain the actual location of the GPS receiver with a high degree of accuracy.

Further, the GPS receiver according to this seventh embodiment may be applied to any one of GPS receivers according to the above described first to sixth embodiments.

In addition, it is a matter of course that respective GPS receivers according to the first to seventh embodiments can be used being combined with the necessary functions thereof combined. In the case of performing the synchronization acquisition at a high speed, namely, a so-called speed search, one and more functions from among the functions explained in the above described first to sixth embodiments are combined to be used.

In addition, in order to performing the positioning calculation at a high degree of accuracy, namely, a so-called high-precision search, the functions explained in the seventh embodiment is used. It is a matter of course that the speed search and the high-precision search can be switched according to need or they can be used in parallel.

In addition, in a case of turning on the GPS receiver, or in a case of resetting an active circuit in the GPS receiver, a rising mode is changed depending on which data exists within the GPS receiver among the necessary data. For example, whether or not respective information such as the ephemeris information, the almanac information, the initial position information and the time information exist in the memory within the GPS receiver decides the rising mode.

Here, the initial location information indicates the location of the target GPS satellite for the positioning calculation, and it is only required to indicate an approximate location of the GPS satellite. In addition, the time information indicates the current time that is grasped by the GPS receiver. It is best to be the exact time, however, even when the approximate time is indicated, there is no problem for the positioning.

Then, in a case that none of the ephemeris information, the almanac information, the initial location information and the time information exists within the GPS receiver, these information should be acquired from the first. As a result, it requires certain time for rising. In this case, the rising mode is a cold start mode.

In addition, in a case that the GPS receiver only lacks the ephemeris information, only the ephemeris information is required to be obtained. In this case, the rising mode is a warm start mode. Further, when all of the ephemeris information, the almanac information, the initial location information and the time information exist, the positioning calculation may be performed immediately on the basis of the information. Therefore, in this case, the rising mode is a hot start mode.

Then, a function may be selected and used in accordance with the rising mode as follows. In the case of the cold start mode, since the synchronization acquisition processing as quick as possible, is needed by using one and more functions that are explained in the above described first to sixth embodiments, speeding up of the synchronization acquisition processing is promoted. Further, in the case of the hot start mode, by using only the function according to the seventh embodiment, the high-precision positioning operation is promoted. In addition, in the case of the warm start mode, one or more functions that are explained in the above described first to sixth embodiments and the single function according to the seventh embodiment are used.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A GPS receiver, comprising:

first fast Fourier transform means for fast-Fourier transforming a received GPS signal having a carrier frequency modulated by transmitted data that is spectrum-diffused by using a diffusion code that is different for each of a plurality of satellites;

a diffusion code generator for generating a plurality of said diffusion codes that is different for each signal;

a diffusion code adder for adding at least two of the different diffusion codes from among said plurality of diffusion codes generated by said diffusion code generator;

second fast Fourier transform means for fast-Fourier transforming an addition result from said diffusion code adder;

a multiplier for multiplying a transform result of said first fast Fourier transform means by a complex conjugate of a transform result of said second fast Fourier transform means;

inverse fast Fourier transform means for inverse-fast Fourier transforming a multiplication result from said multiplier;

a correlation point detector for detecting a correlation point between said GPS signal and at least two of the different diffusion codes in accordance with a transform result from said inverse fast Fourier transform means; and a detector for detecting said carrier frequency of said received GPS signal and said diffusion code used for said spectrum diffusion in accordance with a detection result from said correlation point detector.

2. The GPS receiver according to claim 1, further comprising:

a combination changer for changing a combination of at least two of the different diffusion codes added by said diffusion code adder; and a controller for controlling said combination changer to change the combination of the diffusion codes added by said diffusion code adder and to repeat a detection of the correlation point that is performed by said multiplier, said inverse fast Fourier transform means, and said correlation point detector, wherein:

said detector detects said carrier frequency and said diffusion code in accordance with a plurality of detection results of the correlation point.

3. The GPS receiver according to one of claim 1 or claim 2, further comprising a diffusion code shifter for shifting phases by a predetermined amount of the diffusion codes added by said diffusion code adder.

4. The GPS receiver according to any one of claim 1 or 2, further comprising:

storage means where the transform result of said GPS signal, from said first fast Fourier transform means, is to be written; and a read out address controller for controlling a reading out an address of the data from said storage means, wherein:

said multiplier causes the transform result of said GPS signal to be read from said storage means, under the control of said read out address controller, as the transform result of said first fast Fourier transform means; and said read out address controller, when said correlation point detector can not detect said correlation point, changes the read out address of the data from said storage means.

5. The GPS receiver according to claim 4, further comprising a processing target controller for controlling a GPS signal, that is newly received, to be a processing target when the change of said read out address by said read out address controller exceeds a unit interval of a predetermined frequency.

6. A GPS receiver, comprising:

fast Fourier transform means for fast-Fourier transforming a received GPS signal having a carrier frequency modulated by transmitted data that is spectrum-diffused by using a diffusion code that is different for each by a plurality of satellites;

storage means where a transform result of said GPS signal from said fast Fourier transform means is written;

a multiplier for multiplying a transform result of said GPS signal that is read from said storage means by each of fast Fourier transform results of a plurality of different diffusion codes to be individually used by each of said plural satellites;

inverse fast Fourier transform means for inverse-fast Fourier transforming a multiplication result from said multiplier;

a correlation point detector for detecting a correlation point for a transform result from said inverse fast Fourier transform means; and a detector for detecting said carrier frequency of said received GPS signal and the diffusion code used for said spectrum diffusion in accordance with a detection result from said correlation point detector.

7. A GPS receiver, comprising:

a diffusion code generator for generating a diffusion code that is the diffusion code used for spectrum-diffusing data transmitted to a plurality of satellites, where said transmitted data is different for each of the plurality of satellites;

a correlative value detector for detecting a correlative value between said diffusion code of a received GPS signal where the signal carrier frequency is modulated by transmitted data, that is spectrum-diffused by using a diffusion code that is different for a plurality of satellites, and each of said diffusion codes that are different for each signal from said diffusion code generator; and a selector for selecting a GPS signal used for positioning and with a size of said correlative value detected by said correlation value detector.

8. A method of receiving a GPS signal, comprising:

fast-Fourier transforming a received GPS signal whose carrier frequency is modulated by transmitted data, that is spectrum-diffused by using a diffusion code that is different for each of a plurality of satellites;

generating and adding at least two or more different diffusion codes among a plurality of said diffusion codes that is different for each signal;

fast-Fourier transforming addition results of said two or more different diffusion codes;

obtaining multiplication result by multiplying a fast Fourier transform result of said GPS signal by a complex conjugate of a fast Fourier transform result of the addition results of said at least two or more different diffusion codes;

inverse-fast Fourier transforming said multiplication result to obtain an inverse fast Fourier transform result and detecting a correlation point in accordance with the inverse transform result; and detecting said carrier frequency of said received GPS signal and a diffusion code used for said spectrum diffusion in accordance with a detection result of said correlation point.

9. The method of receiving a GPS signal according to claim 8, further comprising:

changing a combination of at least two of the different diffusion codes to be added;

detecting said plural diffusion points by using an addition result of the diffusion codes in different combinations; and detecting said carrier frequency and said diffusion code in accordance with a detection result of plural correlation points.

10. The method of receiving a GPS signal according to one of claim 8 or claim 9, further comprising shifting phases of at least two diffusion codes to be added by a predetermined amount.

11. The method of receiving a GPS signal according to any one of claim 8 or 9, further comprising:

recording the fast Fourier transform result of said GPS signal in a memory;

enabling control of a read out address of data from said memory;

using the data that is read from said memory as a result of controlling the read out address, as a fast Fourier transform result of said GPS signal used for multiplication with the fast Fourier transform result of the addition result of said diffusion code; and repeating the detection of the correlation point while changing the read out address of the data from said memory, in a case that said correlation point can not be detected.

12. The method of receiving a GPS signal according to claim 11, further comprising controlling the GPS signal that is newly received to be a processing target when the change of said read out address exceeds an interval of a predetermined frequency.

13. A method of receiving a GPS signal, comprising:

fast-Fourier transforming a GPS signal formed where a signal carrier frequency is modulated by transmitted data, that is spectrum-diffused by using a diffusion code that is different for each of a plurality of satellites, and transmitted from each of a plurality of satellites;

recording of a fast Fourier transform result of said GPS signal in a memory;

multiplying a fast Fourier transform result of said GPS signal that is read out from said memory by each of fast Fourier transform results of a plurality of different diffusion codes used individually by each of said plurality of satellites;

inverse-fast Fourier transforming each multiplication result obtained by the individual multiplication;

detecting a correlation point from said inverse fast Fourier transform result; and detecting said carrier frequency of said received GPS signal and the diffusion code used for said spectrum diffusion in accordance with a detection result of said correlation point.

14. A method of receiving a GPS signal, comprising:

generating a diffusion code for inverse diffusion, is the same as a diffusion code that is different for each signal used for spectrum-diffusing transmitted data to a satellite;

detecting a correlation value between said generated diffusion code used for inverse diffusion and said diffusion code of a GPS signal where a signal carrier frequency is modulated by the transmitted data, that is spectrum-diffused by using a diffusion code that is different for each of a plurality of satellites, and transmitted from each of said plurality of satellites; and selecting a GPS signal used for positioning in accordance with a size of said correlative value to be detected.

* * * * *